(12) United States Patent
Cunha et al.

(10) Patent No.: US 12,143,511 B2
(45) Date of Patent: Nov. 12, 2024

(54) PRIVACY-PRESERVING DELIVERY OF ACTIVATION CODES FOR PSEUDONYM CERTIFICATES

(71) Applicants: LG ELECTRONICS, INC., Seoul (KR); UNIVERSITY OF SAO PAULO, Sao Paulo (BR)

(72) Inventors: Helmiton Cunha, Santa Clara, CA (US); Thomas E. Luther, Santa Clara, CA (US); Jefferson E. Ricardini Fernandes De Oliveira, Santa Clara, CA (US); Henrique S. Ogawa, Santa Clara, CA (US); Marcos A. Simplicio, Jr., São Paulo (BR); Harsh Kupwade Patil, Palo Alto, CA (US)

(73) Assignees: LG ELECTRONICS, INC., Seoul (KR); UNIVERSITY OF SAO PAULO, Sao Paulo (BR)

( * ) Notice: Subject to any disclaimer, the term of this patent is extended or adjusted under 35 U.S.C. 154(b) by 189 days.

(21) Appl. No.: 17/787,403

(22) PCT Filed: Dec. 4, 2020

(86) PCT No.: PCT/US2020/063359
§ 371 (c)(1),
(2) Date: Jun. 20, 2022

(87) PCT Pub. No.: WO2021/126554
PCT Pub. Date: Jun. 24, 2021

(65) Prior Publication Data
US 2023/0029523 A1 Feb. 2, 2023

Related U.S. Application Data

(60) Provisional application No. 62/952,049, filed on Dec. 20, 2019.

(51) Int. Cl.
*H04L 9/32* (2006.01)
*H04W 12/069* (2021.01)

(52) U.S. Cl.
CPC ......... *H04L 9/3268* (2013.01); *H04W 12/069* (2021.01); *H04L 2209/42* (2013.01); *H04L 2209/84* (2013.01)

(58) Field of Classification Search
CPC ..... H04L 9/3268; H04L 9/3263; H04L 12/06; H04L 12/069; H04L 2209/42; H04L 2209/84; H04W 12/08
See application file for complete search history.

(56) References Cited

U.S. PATENT DOCUMENTS

| | | | |
|---|---|---|---|
| 6,615,166 B1 * | 9/2003 | Guheen | G06Q 10/06 703/27 |
| 8,171,283 B2 * | 5/2012 | Pietrowicz | H04L 9/3268 713/156 |

(Continued)

OTHER PUBLICATIONS

M. Khodaei et al., "The Key to Intelligent Transportation: Identity and Credential Management in Vehicular Communication Systems," IEEE Vehicular Technology Magazine, vol. 10, No. 4. Dec. 2015. pp. 63-69.

(Continued)

*Primary Examiner* — Hosuk Song
(74) *Attorney, Agent, or Firm* — Duane Morris LLP

(57) ABSTRACT

In a vehicle-to-everything (V2X) technology environment, systems and methods are provided for extending the distribution of activation codes (ACs) in an Activation Codes for Pseudonym Certificates (ACPC) system, in a privacy-preserving manner, to a unicast mode of communication. In this unicast ACPC (uACPC), in some embodiments, the ACs are distributed by the back-end system via a unicast channel upon the receipt of the vehicle's direct request for its respective ACs. In some embodiments, uACPC can leverage (Continued)

edge computing architecture for low latency delivery of certificate revocation lists (CRLs) and higher availability for the distribution of ACs.

18 Claims, 23 Drawing Sheets

(56) References Cited

U.S. PATENT DOCUMENTS

| | | | |
|---|---|---|---|
| 9,300,473 B2* | 3/2016 | Nix | H04W 80/04 |
| 10,778,659 B2* | 9/2020 | Tola | H04L 43/08 |
| 11,277,395 B2* | 3/2022 | Leblond | H04L 12/2816 |
| 11,297,111 B2* | 4/2022 | Buckley | H04M 15/57 |
| 2013/0254469 A1 | 9/2013 | Miyake et al. | |
| 2019/0245703 A1 | 8/2019 | Simplicio, Jr. et al. | |

OTHER PUBLICATIONS

Simplicio JR. et al., "ACPC: Efficient revocation of pseudonym certificates using activation codes", Published by t:: lsevier B.V., Ad Hoc Networks, 2018, p. 1-23.

M. Simplicio et al., "The Unified Butterfly Effect: Efficient Security Credential Management System for Vehicular Communications," International Association of Cancer Registries (IACR). Available at: https:l/eprint.iacr.org/2018/089.pdf, Nov. 13-15, 2018. pp. 1-9.

William Whyte et al., "A Security Credential Management System for V2V Communications", 2013 IEEE Vehicular Networking Conference, U.S.A., IEEE, Dec. 16, 2013, p. 1-8.

\* cited by examiner

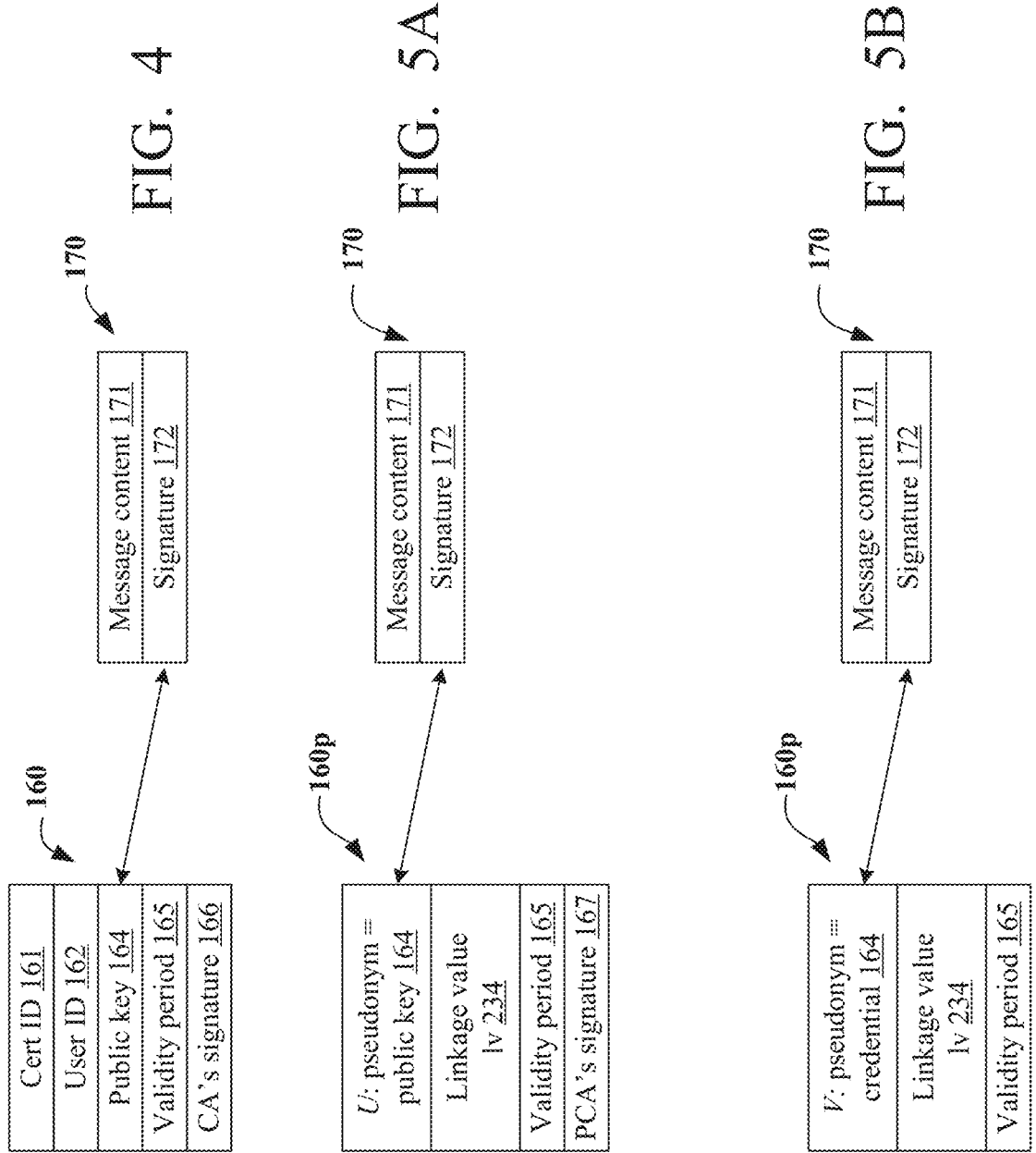

```
input: X ∈ VID_g ⊆ {0,1}^m ← Vehicle ID (VID), sequence
of bits with length m
input: RN ⊂ VID_g ← List of Revoked Nodes (RN)
output: rls ← released node of interest by X
────────────────────────────────────────────────
r ∈ RN ← a revoked node of the RN list
n ∈ ℤ | n ≤ m ← integer numbers, such that n is less or equal
than m
i, t ∈ ℤ ← integer numbers /* Find the released node needed by X */
procedure FIND_RELEASED_NODE(X, RN)
    i ← 0
    /* Find the maximum number of common prefix bits, i */
    for each r ∈ RN do
        t ← number of common prefix bits between X and r
        if t ≥ i then
            i ← t
    rls ← the most i + 1 significant bits of X
```

FIG. 17

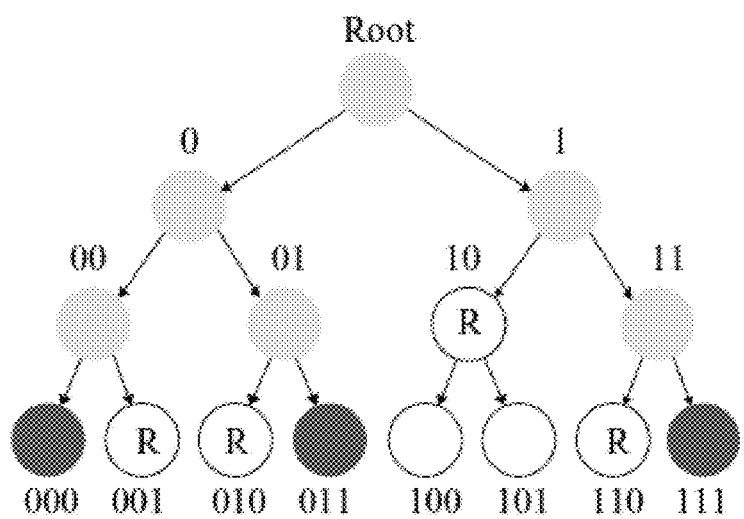

FIG. 18

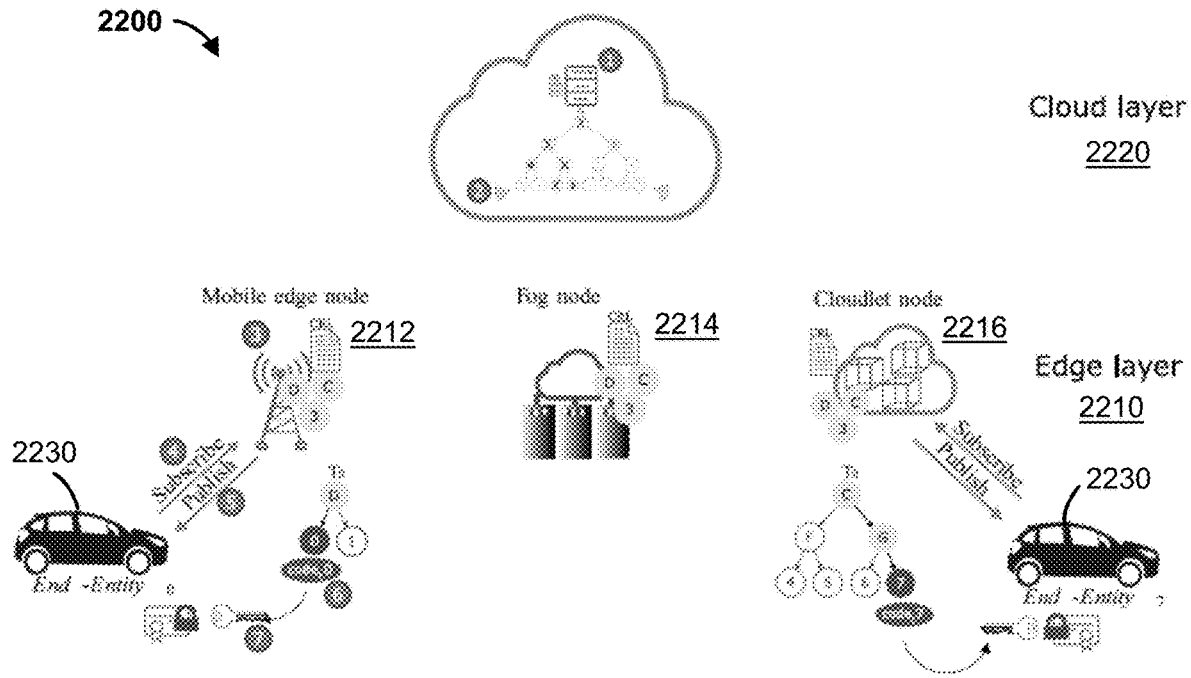

FIG. 22

| Use case | Edge nodes | Description |
|---|---|---|
| Enable uACPC in IoT devices | Fog | Fog nodes can provide uACPC services to EEs in an IoT domain where devices may not have internet access or may rely on non-IP communication (e.g., Bluetooth, ZigBee), thus enabling V2X in general IoT domains. |
| Reduce latency of the CRL update process; add geolocation context to the services | MEC | MEC nodes can cache and distribute CRLs to all EEs within the Radio Access Network (RAN), therefore serving in closer proximity. Optionally, since MEC is based on the RAN range connectivity of the mobile base stations, it can add geolocation context to its services. |
| Provide complete AC tree abstraction for EEs | Cloudlet | Cloudlet nodes can perform client-specific AC derivation based on the released nodes provided by the uACPC and the node address of interest, provided by the requesting EE. The EE can then obtain its required AC by merely requesting it from a node. Thus, cloudlet nodes can help enabling V2X credentials and services in resource-constrained devices. |

FIG. 23

PRIVACY-PRESERVING DELIVERY OF ACTIVATION CODES FOR PSEUDONYM CERTIFICATES

CROSS REFERENCE TO RELATED APPLICATIONS

The present application claims priority to U.S. Provisional Patent Application No. 62/952,049, entitled "UACPC: CLIENT INITIATED ACPC MODEL," filed on 20 Dec. 2019 and PCT/US2020/63359 application, entitled "PRIVACY-PRESERVING DELIVERY OF ACTIVATION CODES FOR PSEUDONYM CERTIFICATES," filed on 4 Dec. 2020, all of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to secure communications, including transportation-related communications among cars, trucks, trains, and possibly other vehicles, as well as pedestrians' smartphones, traffic lights, and other infrastructure.

BACKGROUND OF THE INVENTION

In recent times, there has been a surge in digital technologies embedded in physical objects, leading to what is today known as the Internet of Things (IoT). This trend has also reached the automotive industry, which has shown a growing interest in exploring interaction models such as Vehicle-to-Vehicle (V2V), Vehicle-to-Infrastructure (V2I), and Vehicle-to-Pedestrian (V2P), collectively referred to as Vehicle-to-Everything (V2X) communications. V2X enables several applications aimed at improving transportation safety, efficiency, and human to machine interaction. For example, with V2X, vehicles can exchange or communicate information (e.g., for velocity, direction, and brake status) that can help drivers keep a safe distance from other vehicles while maintaining a suitable speed.

Indeed, the U.S. Department of Transportation has initiated a "connected vehicles" program "to test and evaluate technology that will enable cars, buses, trucks, trains, roads and other infrastructure, and our smartphones or other devices to 'talk' to one another. Cars on the highway, for example, would use short-range radio signals to communicate with each other so every vehicle on the road would be aware of where other nearby vehicles are. Drivers would receive notifications and alerts of dangerous situations, such as someone about to run a red light as they [are] nearing an intersection or an oncoming car, out of sight beyond a curve, swerving into their lane to avoid an object on the road." U.S. Department of Transportation at https://www.its.dot.gov/cv_basics/cv_basics_what.htm. "Connected vehicles could dramatically reduce the number of fatalities and serious injuries caused by accidents on our roads and highways. [They] also promise to increase transportation options and reduce travel times. Traffic managers will be able to control the flow of traffic more easily with the advanced communications data available and prevent or lessen developing congestion. This could have a significant impact on the environment by helping to cut fuel consumption and reduce emissions."

While V2X technology and connected vehicles offer the promise of increased safety, traffic flow, efficiency, etc., the large scale deployment of such technologies also requires addressing some challenges, especially security and privacy concerns. In particular, V2X architectures are expected to (1) ensure that messages exchanged between vehicles are legitimate, banning misbehaving users, while (2) preserving the anonymity of honest users, so their movements cannot be easily tracked by other vehicles or by the system itself.

BRIEF DESCRIPTION OF THE DRAWINGS

FIGS. 3, 3A, and 3B illustrate communications among vehicles and other equipment in the example environment, according to some embodiments.

FIGS. 4, 5A, and 5B illustrate examples of digital certificates for message authentication, according to some embodiments.

FIG. 17 illustrates an example of node selection from a revoked vehicle list, according to some embodiments.

FIG. 18 illustrates an example algorithm for activation path computation, according to some embodiments.

FIG. 22 illustrates an implementation of uACPC with edge computing, according to some embodiments.

FIG. 23 is a table illustrating the use of edge computing for various use cases, according to some embodiments.

DETAILED DESCRIPTION OF SOME EMBODIMENTS

Figure 1:
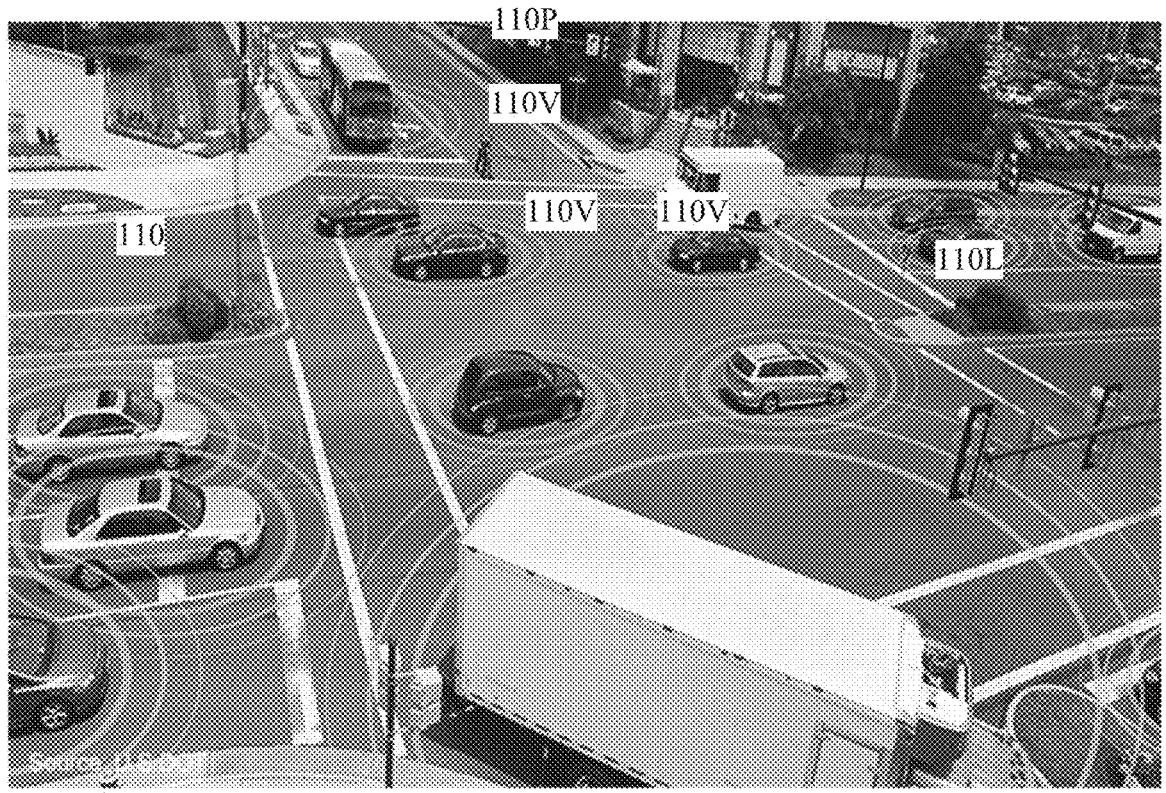
FIG. 1 illustrates an environment in which systems and methods of the present disclosure can operate.

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent to one skilled in the art, however, that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

With the adoption of Vehicle-to-everything (V2X) technology, security and privacy of vehicles are important. To avoid tracking while preserving vehicle/driver's privacy, modern vehicular public key infrastructure (VPKI) provision vehicles with multiple short-term pseudonym certificates. However, provisioning a large number of pseudonym certificates can lead to an enormous growth of Certificate Revocation Lists (CRLs) during its revocation process. One possible approach to avoid such CRL growth is by relying on activation code (AC)-based solutions, e.g., Activation Codes for Pseudonym Certificates (ACPC), where the vehicles are provisioned with batches of encrypted certificates, which are decrypted periodically via the ACs (broadcasted by the back-end system). When the system detects a revoked vehicle, it simply does not broadcast the respective vehicle's AC. As a result, revoked vehicles do not receive their respective AC and are prevented from decrypting their certificates. Consequently, the need to add such vehicles to the CRL is expunged.

According to some embodiments, systems and methods are provided for extending the distribution of ACs, in a privacy-preserving manner, to the unicast mode of communication. In this unicast ACPC (uACPC), the ACs are distributed by the back-end system via a unicast channel upon the receipt of the vehicle's (direct) request for its respective ACs. In addition, uACPC can leverage the edge computing architecture for faster and timely distribution of CRLs. In some embodiments, edge computing can bring low latency delivery of CRLs and higher availability for the distribution of ACs.

Example Environment

FIG. 1 illustrates an environment in which systems and methods of the present disclosure can operate. In some embodiments, the environment can be a Security Credential Management System (SCMS) infrastructure. The SCMS was developed in cooperation with the U.S. Department of Transportation (USDOT) and the automotive industry. FIG. 1 shows a busy intersection with various entities or objects, such as vehicles 110V (cars, trucks, and possibly other types, e.g., trains or bicycles), pedestrians 110P, roadside equipment 110L (e.g., traffic lights, along with hub or gateway for short and longer-range communications). Each of the objects or entities 110 (110V, 110L, 110P, etc.), each of which may be referred to as "end entities" or "EE," carries or incorporates equipment, such as smartphones, automotive information devices, or other computing devices. Using their respective computing devices, the objects or entities 110 communicate (e.g., wirelessly) to share information, coordinate, etc. This vehicular communications technology (also denominated Vehicle-to-Everything, or V2X) is a cornerstone for the development of Intelligent Transportation Systems (ITS).

Each vehicle 110V may, for example, broadcast its location, speed, acceleration, route, direction, weather information, etc. Such broadcasts can be used to obtain advance information on traffic jams, accidents, slippery road conditions, and allow each vehicle to know where the other vehicles are, and so on. In response, vehicle recipients of such information may alert their drivers, to advise the drivers to stop, slow down, change routes, take a detour, and so on. The traffic lights can be automatically adjusted based on the traffic conditions broadcast by the vehicles and/or other objects 110.

With the emergence of the Vehicle to Everything (V2X) communication technology, there is an inherent increase in vehicle safety, thus saving lives and fostering a safer driving experience. The V2X technology allows vehicles to communicate with multiple devices on-the-go and when stationary, thereby introducing an entirely new set of communication infrastructure, applications, services, etc. Furthermore, it is perceived as one of the building blocks that can propel the quicker adoption of autonomous vehicles and smart cities.

Figure 2:
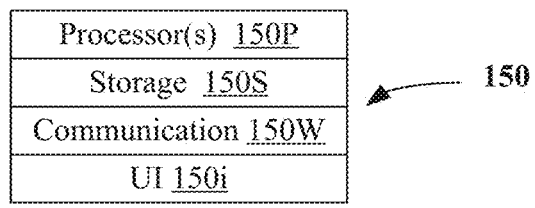
FIG. 2 is a block diagram of a computing device which can be used by any of the entities shown in FIG. 1, according to some embodiments.

FIG. 2 illustrates an embodiment of a computing device 150 which is used by the vehicles or other entities and objects, e.g., for communicating, coordinating, etc. in the environment of FIG. 1.

As shown in FIG. 2, computing device 150 includes one or more computer processors 150P coupled to computer storage (memory) 150S, and wireless communication equipment 150W for radio communications. Operation of computing device 150 is controlled by processor 150P, which may be implemented as one or more central processing units, multi-core processors, microprocessors, microcontrollers, digital signal processors, field-programmable gate arrays (FPGAs), application-specific integrated circuits (ASICs), graphics processing units (GPUs), tensor processing units (TPUs), and/or the like in computing device 150P.

Memory 150S may be used to store software executed by computing device 150 and/or one or more data structures used during the operation of computing device 150. Memory 150S may include one or more types of machine-readable media. Some common forms of machine-readable media may include a floppy disk, a flexible disk, hard disk, magnetic tape, any other magnetic medium, CD-ROM, any other optical medium, punch cards, paper tape, any other physical medium with patterns of holes, RAM, PROM, EPROM, EEPROM, FLASH-EPROM, any other memory chip or cartridge, and/or any other medium from which a processor or computer is adapted to read.

Processor 150P and/or memory 150S may be arranged in any suitable physical arrangement. In some embodiments, processor 150P and/or memory 150S may be implemented on the same board, in the same package (e.g., system-in-package), on the same chip (e.g., system-on-chip), and/or the like. In some embodiments, processor 150P and/or memory 150S may include distributed, virtualized, and/or containerized computing resources. Consistent with such embodiments, processor 150P and/or memory 150S may be located in one or more data centers and/or cloud computing facilities. In some examples, memory 150S may include non-transitory, tangible, machine-readable media that include executable code that when run by one or more processors (e.g., processor 150P) may cause the computing device 150, alone or in conjunction with other computing devices in the environment, to perform any of the methods described further herein The computing device or equipment 150 may include user interface 150i, e.g., such as present in a smartphone, an automotive information device, or of some other type device, for use by pedestrians, vehicle drivers, passengers, traffic managers, and possibly other people.

Figure 3A:
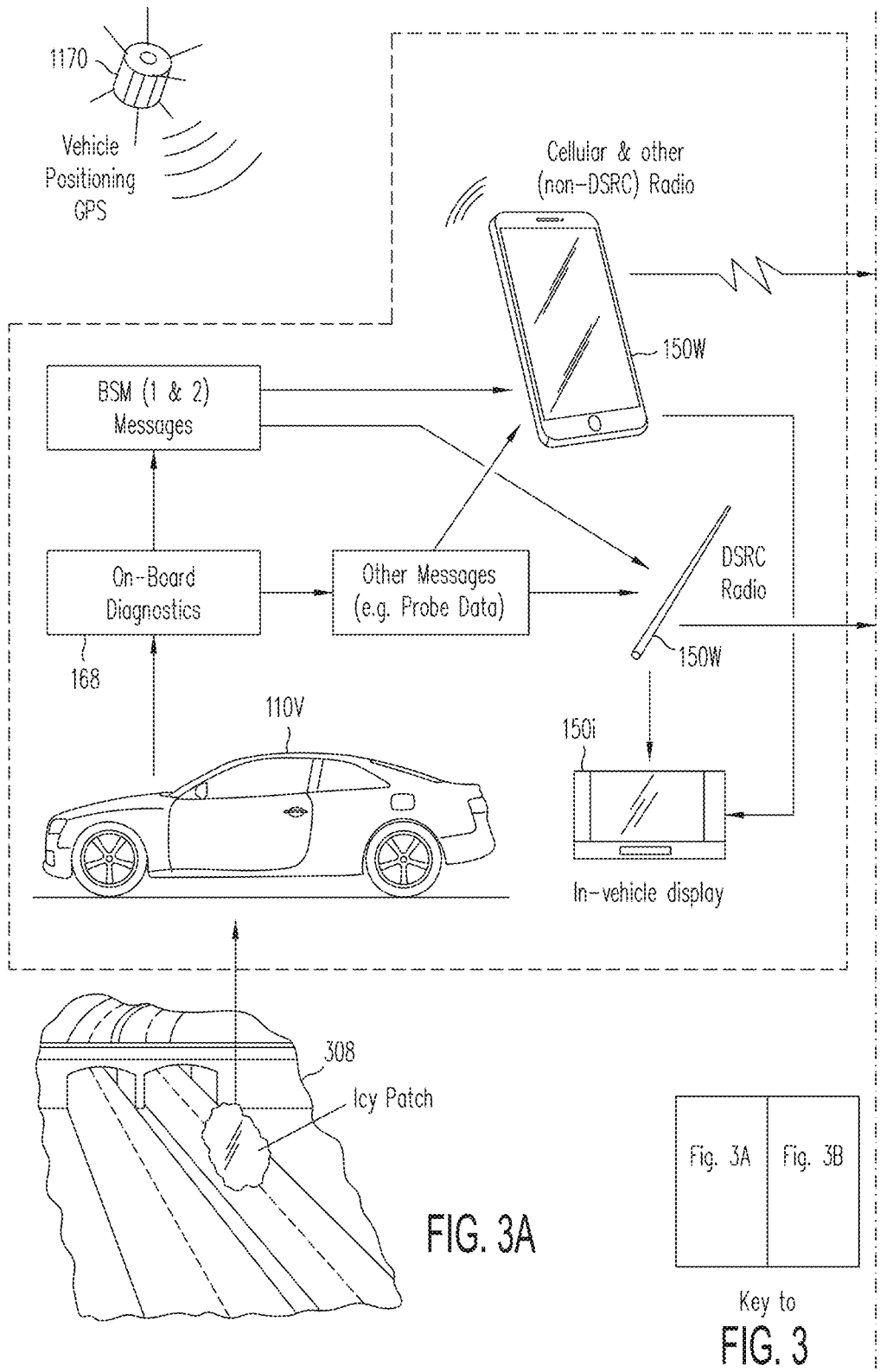
Figure 3B:
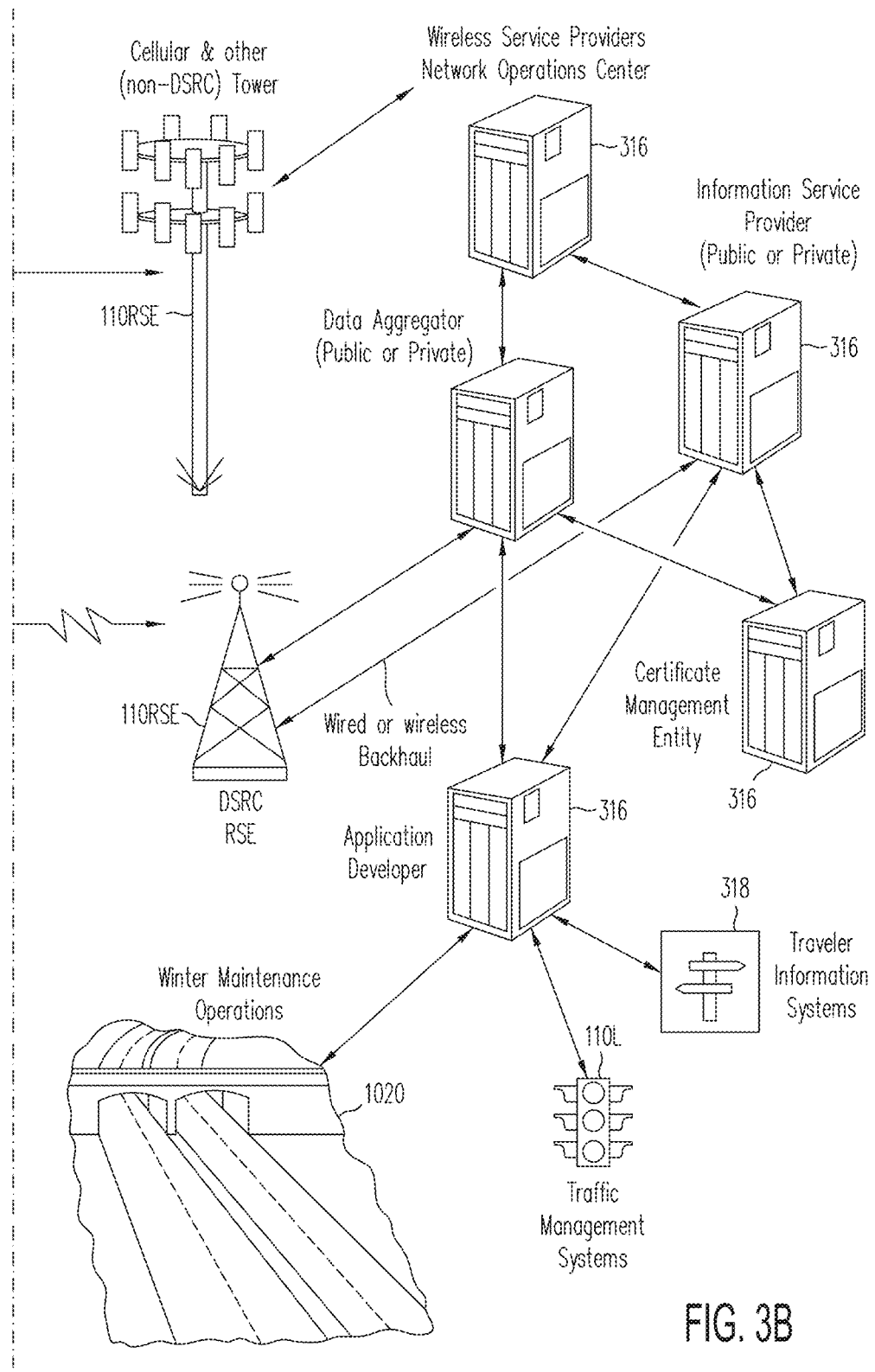

FIGS. 3, 3A, and 3B illustrate examples of communication schemes for entities or objects 110 or their computing devices 150 ("object 110," "user 110," and "equipment 150" may be used interchangeably herein when no confusion arises), interacting via V2X or connected vehicle technology. At scene 308, a vehicle 110V encounters an icy road patch.

The vehicle 110V includes On-Board Equipment (OBE) 304 with one or more sensors—such as accelerometers, brake monitors, object detectors, LIDAR, etc.—for sensing conditions within and around vehicles 110V, such as sudden braking, wheel spin, potential collisions, etc. Using these sensors, the vehicle 110V may, for example, detect the icy road patch at scene 308. The sensors supply information to the OBE's computing device or equipment 150 (FIG. 2) so that it can take action accordingly, e.g., by automatically applying brakes, adjusting steering, and/or notifying the user via a display 150i in case the user needs to react. The computing device 150 may comprise an on-board diagnostics module 168 for performing diagnostics or analysis, for example, on the information provided by the sensors.

Different pieces of equipment on the vehicle 110V communicate by exchanging Basic Safety Messages (BSM) and/or other messages with each other and other vehicles. The BSM messages are described in detail in Whyte et al., "A security credential management system for V2V communications," *IEEE Vehicular Networking Conference*, 2013, pp. 1-8, and CAMP, "Security credential management system proof-of-concept implementation—EE requirements and specifications supporting SCMS software release 1.1," *Vehicle Safety Communications Consortium, Tech. Rep.*, May 2016 (available: https:/www.its.dot.gov/pilots/pdf/SCMS_POC_EE_Requirements.pdf), both of which are incorporated by reference.

A vehicle or other object 110 can obtain its location, for example, by using GPS satellites 1170 or cellular triangulation. The vehicle 110V may also include communication equipment 150W, which, in some embodiments, can include a Direct Short Range Communications (DSRC) radio and non-DSRC radio equipment such as a mobile phone. The vehicle may thus communicate through a cellular system or other roadside equipment (RSE) 110RSE directly, i.e., without intermediate network switches. The RSE may act as a gateway to other networks, e.g., the Internet. Using the communication equipment 150W, vehicle 110 can communicate BSM messages and other information to other vehicles, entities, or objects 110 in the V2X or connected vehicle environment. Thus, vehicle 110V/150 may inform the other parts of the environment of the icy patch at scene 308. Likewise, another vehicle 110 may be located in scene 1020 and may alert other vehicles of winter maintenance operations at that scene.

A traffic management system 110L may comprise equipment—e.g., stoplights, crosswalk lights, etc. located in or near roads, highways, crosswalks, etc.—to manage or control traffic of vehicles, persons, or other objects and entities. Traffic management system 110L may include some of the same or similar equipment as vehicle 110V, including computing devices 150, sensors, user interfaces, communication equipment, etc.

Computer systems 316 process, aggregate, generate or otherwise operate on information sent to or received from vehicles 110V, traffic management systems 110L, and other objects or entities 110 in the V2X or connected vehicle technology environment, along with their respective computing devices 150. Also shown is a traveler information system 318. Computer systems 316 can be implemented in or incorporate, for example, one or more servers. These computer systems 316, for example, provide or support location and map information, driving instructions, traffic alerts and warnings, information about roadside services (e.g., gas stations, restaurants, hotels, etc.). The computer systems 316 may receive information from the various vehicles, entities, and objects 110 in the environment, process and communicate information or instructions throughout the environment to manage the objects, e.g., by adjusting signaling on traffic lights, rerouting traffic, posting alerts or warnings, etc.

This communication capability within the connected vehicle or V2X technology environment is potentially vulnerable to errors and abuse. A malicious user 110 (e.g., a vehicle operator or traffic manager) and/or defective equipment 150 may transmit false or incorrect information to other vehicles, so as to undesirably affect traffic. Further, in contrast to many communication systems, V2X applications may require the constant transmission of safety messages. Consequently, they require authentication of such messages, but in a privacy-preserving manner. In doing so, V2X application providers and eavesdroppers cannot link multiple messages to a single device, and thereby track it. Also, such messages should not contain any Personally Identifiable Information.

To protect the system from such misbehavior, the V2X communications should be authenticated, for example, using a vehicular public-key infrastructure (VPKI). VPKI solutions have been implemented in the Cooperative Intelligent Transport Systems (C-ITS), led by the European Telecommunications Standards Institute (ETSI), and the Security Credential Management System (SCMS), which is part of the IEEE 1609.2 standard. With a VPKI, each vehicle 110V or other equipment is provided with a private key (e.g., for signing a message) and a public key (e.g., for signature verification). The public key is distributed to the public, but the private key is kept secret.

VPKI issues multiple short-lived, pseudonym certificates to authorized vehicles. Each vehicle can then use its certificates to digitally sign its messages, so the authenticity of the conveyed information can be verified. A vehicle can also avoid tracking attempts by its peers if it periodically changes the pseudonym employed along the way: as a result, it should not be straightforward to link different messages to the same vehicle just by analyzing the corresponding certificates' contents.

To ensure that the messages exchanged between vehicles are legitimate, a vehicle may digitally sign each message using the vehicle's private key. The message recipient can verify the signature using the sending vehicle's public key. The public keys themselves are authenticated by means of digital certificates which certify that a given public key belongs to an authorized vehicle. The certificates are distributed by trusted computer entities called Certificate Authorities (CAs). Each certificate is signed by the CA, allowing the message recipient to confirm the certificate's authenticity by verifying the CAs signature.

If a device or entity misbehaves intentionally or unintentionally, its certificates can be revoked. In the VPKI model, in some embodiments, non-revoked devices keep their privacy, but revoked devices lose privacy until reinstated.

FIGS. 4, 5A, and 5B illustrate examples of digital certificates which can be used for message authentication in the connected vehicle or V2X technology environment.

Referring to FIG. 4, a digital certificate 160 is shown. Digital certificate 160 has a number of fields or parameters. In some embodiments, these include a certificate ID 161, a user ID 162 (e.g., a vehicle ID number or the user's email address), the vehicle's (or user's) public key 164, and possibly other parameters (called metadata), such as the certificate's validity period 165, an identification of the signature scheme, and maybe others. Certificate 160 also includes a signature 166 formed by a certificate authority (CA) over all the fields of the certificate except the signature itself. The CA may reside on or be implemented in computers 316 for example.

Digital certificate 160 can be issued to a vehicle 110V to authenticate the public key 164. The vehicle 110V attaches its certificate 160 to each message 170 transmitted by the vehicle. The message 170 includes message body or content 171, and a digital signature 172 generated by the vehicle using its private key. The message recipient uses the CA's public key to verify the signature 166 and thus authenticate the certificate 160 including the public key 164. The recipient then uses the public key 164 to verify the message signature 172 and thus authenticate the message. In some embodiments, the verification of the certificate's signature 166 and message signature 172 can also be combined (e.g., for better performance).

A disadvantage of a scheme or approach which uses certificates that include some form of identification (ID) is potentially compromising user privacy: if a vehicle's transmissions are intercepted, the vehicle can be tracked by tracking the certificate ID 161 or user ID 162 transmitted by the vehicle. More particularly, one important requirement of V2X and Intelligent Transportation Systems (ITS) technologies is to find an adequate balance between security and privacy: at the same time that messages exchanged between vehicles, infrastructure, pedestrians, etc. should be authenticated, dissuading misbehavior and preventing data forgery, the users' privacy should be preserved, so the system is not abused for mass surveillance purposes. This requirement calls for a privacy-preserving VPKI. In some embodiments, authorized vehicles are loaded with multiple pseudonym certificates, i.e., certificates that do not explicitly identify their owners. In some embodiments, such certificates have very small validity periods (e.g., 1 week), which may overlap (e.g., 100 certificates might be valid at the same time). Hence, vehicles can employ some strategy for rotating among pseudonyms when signing messages, thus avoiding long-term tracking.

Thus, according to some embodiments, to protect user privacy, the user can be issued multiple pseudonym certificates 160p (FIG. 5A) with random-looking strings ("pseudonyms") 164 instead of IDs 161 and 162. The vehicle then uses a pseudonym certificate instead of certificate 160 in message transmissions. Each pseudonym certificate provides a short-term identity to the EE or vehicle, which allows it to switch between these ephemeral certificates and thus avoiding the exposure of its long-term identity. The vehicle can automatically use different pseudonym certificates 160p for different messages 170 to avoid tracking.

FIG. 5A illustrates a pseudonym certificate 160p accompanying a message 170. The certificate is generated by a pseudonym certificate authority (PCA), also called authorization certificate authority (ACA) in some embodiments. The pseudonym 164, also denoted as U, acts as both the certificate ID and the public key. The certificate 160p may include validity period 165, an identification of the signature scheme, PCA signature 167, and maybe other parameters, similarly to certificate 160 of FIG. 4. Pseudonym certificate 160p may also include linkage value (lv) 234 used for certificate revocation as described below. (The linkage values may or may not be used for some embodiments of the present invention.)

The vehicle attaches one of its pseudonym certificates 160p to each message 170 transmitted by the vehicle. The message recipient uses the PCA's public key to verify the PCA signature 167 and uses the pseudonym 164 to verify the message signature 172 and thus authenticate the message 170. In some embodiments, the verification of the certificate's signature 167 and message signature 172 can be combined (e.g., for better performance). Such pseudonym certificates are used in Security Credential Management System (SCMS) and later extended in CAMP.

FIG. 5B illustrates a variation, which may be called "implicit certificate." Instead of a public key U, the pseudonym field 164 includes "credential" data (or "public key reconstruction" data), denoted as V, allowing anyone having the PCA's public key to derive the certificate's public key U. In some embodiments, U is not stored in the certificate 160p. See for example "Certicom. Sec 4 v1.0: Elliptic curve Qu-Vanstone implicit certificate scheme (ECQV). Technical report, Certicom Research, 2013. http://www.secg.org/sec4-1.0.pdf, incorporated herein by reference.

When a message recipient needs to verify the message signature 172, the message recipient first reconstructs the user's public key U from the pseudonym 164 (V) and the PCA public key and then uses the user's public key U to verify the signature. Since this process uses the PCA public key, this process not only authenticates the message 170 as coming from a user possessing the certificate 160p, but also verifies the certificate 160p as authenticated by PCA 210. A separate PCA signature 167 is therefore unnecessary and is omitted, reducing the certificate size.

It may be desirable to reduce the computation costs and the network bandwidth in provisioning and activating the certificates. Further, the use of certificates is complicated by the need to ensure that a dishonest, or "honest but curious," certificate management entities cannot easily compromise the system even if they collude. It may be desirable to reduce the security risks presented by the certificate management entities.

Certificate Revocation

If a vehicle misbehaves (maliciously or due to a malfunction), the vehicle's certificate (e.g., 160) should be revoked. In some embodiments, revocation can be achieved by having a trusted entity periodically distribute a list of revoked pseudonym certificates ("Certificate Revocation List," or CRL) to potential recipients of the vehicle's messages. In some embodiments, the CRL can be a list of identifiers for certificates that have not yet expired, but should not be considered valid anymore (e.g., because its owner's private key has been compromised). This list is signed by a trusted issuer (e.g., the authority that originally issued the certificate itself), so the authenticity of its contents can be verified.

While simple, this approach may have shortcomings when applied to the context of VPKIs. One refers to the asynchronous nature of CRLs, which may receive new entries and updates at any time. Traditional applications, such as web browsing, typically address this issue by directly contacting some authority and checking the current status of certificates (e.g., using the Online Certificate Status Protocol—OCSP). In V2X environments, however, such online verification would add too much overhead to vehicles, and may not even be possible due to limited connectivity. Hence, when CRLs are adopted, large delays (e.g., days) may be observed until revocation updates are delivered to all vehicles.

Another issue is that each vehicle is expected to carry from e.g., 20 to 100 pseudonym certificates for each week of operation. The CRL size is directly proportional to the number of revoked certificates or revoked vehicles. However, with the provisioning of multiple pseudonym certificates to the EEs or vehicles, the system's CRL tends to grow linearly. Such growth occurs because the batches of certificates (including the certificates valid in the future) remain in the CRL until their expiration. Therefore, if a regular CRL is employed, the number of CRL entries resulting from each vehicle revocation could be very large. For example, the CRL can be large if the number of revoked vehicles is large, or because a single vehicle may have multiple certificates corresponding to different validity periods. Further, a vehicle may have multiple certificates corresponding to the same validity period to make the vehicle difficult to trace by a malicious person, and this further increases the CRL size. Also, the CA will not issue a new certificate for use after the expiration of the revoked certificate's validity period 165. A large CRL takes much memory, network bandwidth, and searching time to determine if a given certificate is in the CRL. Also, a potential recipient device may be hard to reach, e.g., if it is powered down or is out of the network coverage area. Therefore, the CRL size should preferably be reduced.

Various proposals aim to deal with such growth of CRL size, improving the efficiency of CRL distribution.

For efficiency and reliability reasons, it is desirable to generate the pseudonym certificates in large batches, and to distribute the certificates to the vehicles well in advance of the certificates' validity periods 165. However, this policy potentially increases the CRL size because if a vehicle is misbehaving then the CRL may have to include the vehicle's certificates that have been issued to the vehicle but have not become valid yet. This can be avoided if the certificates are distributed "just-in-time," i.e., right before the certificate's validity period 165. This is the approach taken by C-ITS, which pre-loads vehicles with certificates covering only a short period (e.g., 3 months). As a result, vehicles are required to contact the VPKI quite often for renewing their certificates, and revoked vehicles can have their requests denied.

Another way to limit or reduce the CRL size is to use activation codes. When a vehicle receives a certificate, the vehicle cannot decrypt the certificate without an activation code. However, the activation code for each certificate is provided to the vehicle only shortly before the certificate's validity period. This scheme or technique, Issue First Activate Later (IFAL), is described in more detail in, for example, E. Verheul, "Activate later certificates for V2X—combining ITS efficiency with privacy," Cryptology ePrint Archive, Report 2016/1158, 2016, http://eprint.iacr.org/2016/1158; and V. Kumar, J. Petit, and W. Whyte, "Binary hash tree based certificate access management for connected vehicles," in Proc. of the 10th ACM Conference on Security and Privacy in Wireless and Mobile Networks, ser. WiSec'17. New York, NY, USA: ACM, 2017, pp. 145-155; both incorporated herein by reference. In IFAL, large batches of pseudonym certificates are generated and provided to the vehicles in advance, but the certificates are unusable until activated with activation codes. The activation codes are small and are typically provided to the vehicles "just in time," i.e., right before each certificate's validity period 165. A separate activation code is generated for each validity period 165, and is valid for all the certificates having the same validity period. Only "honest" (not misbehaving) devices 110 receive the activation code. With IFAL, the certificates are generated in batch, possibly long in advance of their respective validity periods, but if a certificate is revoked it does not have to be included in the CRL if the activation code has not been issued. The CRL size is therefore reduced.

As long as revoked vehicles do not receive their corresponding activation codes, the result of IFAL is analogous to what is obtained with C-ITS. Indeed, in both cases, CRLs are not strictly necessary, since revoked vehicles are naturally evicted from the system after a short time. Actually, the distribution of CRLs might be restricted to exceptional scenarios, such as if the VPKI itself is compromised: in this case, the certificates from affected authorities could be revoked altogether via CRLs.

The IFAL approach requires vehicles to periodically contact the V2X infrastructure in order to obtain the activation codes, but since activation codes can be very small, this process can be less cumbersome than the "just-in-time" delivery of small batches of certificates immediately before their corresponding validity periods. However, since an activation code can be used with any certificate for the corresponding activation period, the activation code must be distributed over a secure communication channel to be unavailable to revoked certificate holders.

Another problem in any pseudonym certificate infrastructure is the potential compromise of the certificate authority (CA) that issues pseudonym certificates. Even without colluding with any other entity, in IFAL the CA can link the pseudonym certificates to the corresponding device (to the corresponding device's enrollment certificate provided to the CA). Therefore, the users' privacy depends on CA's willingness to delete the linking information.

One technique that addresses some of the problems noted above is Binary Hash Tree based Certificate Access Management (BCAM), more details of which are described in Kumar et al. Like IFAL, the BCAM scheme distributes pertinent data, called device-specific values (DSVs), "just in time" to allow the vehicles to activate the certificates distributed in advance. But in contrast to IFAL, BCAM's DSVs depend not only on the certificates' validity periods 165 but also on the associated vehicles' IDs. A DSV for any vehicle cannot activate a certificate for any other vehicle, so the DSVs of the honest vehicles can be broadcast over insecure channels and cached by any device to facilitate their subsequent distribution. Also, while generating a separate DSV for each vehicle increases the computational and networking costs, the DSVs can be compressed using a hash tree.

Further, BCAM is designed to interoperate with the SCMS architecture, inheriting SCMS's ability to protect the privacy of honest users against a dishonest CA or any other non-colluding system entities. More particularly, the BCAM's DSVs are small pieces of information that are broadcast by a Certificate Access Manager (CAM). Each batch of certificates issued to a given vehicle is encrypted by CAM, and the decryption key can be computed by the vehicle from the DSV generated by the CAM from the vehicle's ID. Further, the DSVs of the honest vehicles can be compressed using the binary hash tree. If all the vehicles are honest, then CAM can broadcast only the tree's root to allow all the vehicles to decrypt the corresponding pseudonym certificates. A separate tree is created for each validity period. To revoke a misbehaving vehicle for a given validity period, the CAM will not transmit the tree nodes that would allow the misbehaving vehicle's DSV computation.

Compared to the original SCMS, BCAM creates a highly efficient revocation process, but also creates an extra point of collusion: CAM learns which batch of (encrypted) certificates belong to the same vehicle, so CAM can collude with the CA ("Pseudonym CA," or "PCA") to link those certificates together when they are used by the vehicle. In addition, in the certificate issuance process, the PCA encrypts the certificates to hide them from another SCMS entity (Registration Authority or RA), and then CAM encrypts the certificates again to prevent their activation without the DSV. This double encryption increases the computation costs and the network bandwidth utilization (due to the increased number of transmissions for doubly encrypting certificates versus a single encryption at the PCA).

In some embodiments, the two encryptions are replaced by one. Specifically, the CAM does not encrypt the certificate. Rather, CAM uses the DSV to generate a blinded activation code. The blinded activation code is used by the RA to generate encryption values given to the PCA to encrypt the certificate. The DSV will later be used to activate the certificate, i.e., the DSV will act as an (un-blinded) activation code. The DSV is thus a Device Specific Activation Code (DSAC). But the PCA does not know the DSV nor the blinded activation code, and the PCA cannot recover the DSV from the encryption values, nor link the different encryption values for a given vehicle to each other. On the other hand, CAM does not know the encryption values, and cannot link them to a vehicle or a DSV or a blinded activation code even if CAM and PCA collude. This scheme makes it harder for the PCA and CAM to link pseudonym certificates to a vehicle or to each other even if the PCA and CAM collude.

According to some embodiments, an Activation Codes for Pseudonym Certificates (ACPC) scheme can be employed. ACPC may contain or reduce the growth of CRL, while improving the bandwidth and computation requirements of the SCMS. The ACPC's approach avoids the growth of CRLs by encrypting certificates during the EE's or vehicle's pre-provisioning process. Consequently, the vehicles cannot decrypt their certificates and use them (e.g., for signing Basic Safety Messages) until they receive their decryption key, also known as the activation code (AC). Moreover, withholding the release of ACs enforces passive revocation of EEs by restricting the access to their certificates. Note that ACPC also supports CRLs and can be used to instantaneously revoke EEs if misbehavior cannot be tolerated until the end of the current activation period. Furthermore, such a CRL is effective only for the current activation period. If the EE is still misbehaving in the next activation period, the system can rely on the ACPC's passive revocation, where ACs are not released in the subsequent activation period. Such an approach has the advantage of avoiding the linear growth of CRLs.

ACPC may introduce efficiency and security improvements over BCAM and IFAL. Compared with the C-ITS approach, or analogous solutions based on short-period certificate preloading, an advantage of ACPC is that activation codes for non-revoked vehicles are considered public information. Therefore, such activation codes can be openly broadcast and then cached anywhere (e.g., vehicles, websites, or mobile phones). For example, users may download activation codes overnight using their mobile phones, and then transfer those codes via a local connection (e.g., Bluetooth) to their own vehicles. Conversely, the periodical request of pseudonym certificates requires vehicles to have bidirectional connectivity for establishing a secure connection with VPKI authorities, using their enrollment certificates for (mutual) authentication.

Besides this added flexibility, ACPC's activation codes (e.g., 16 bytes) are usually much smaller than actual pseudonym certificates (e.g., 117-bytes, or larger ones based on post-quantum cryptography), and can be used for decrypting multiple certificates. Since a single activation code can be employed to decrypt multiple certificates, the bandwidth savings can be substantial in practice. Thus, they potentially lead to a more bandwidth-efficient solution. For example, in C-ITS, vehicles are expected to download pseudonym certificates covering a 3-month (i.e., 13-week) period, which translates to up to 1300 certificates. For typical 117-byte pseudonym certificates, this means a bandwidth overhead of 152 KB, which is almost 10,000 times larger than a 16-byte activation code in ACPC. Nevertheless, the broadcast model for distributing activation codes does not take full advantage of such smaller sizes. Indeed, ACPC assumes the distribution of an activation tree whose size is proportional to the number of revoked vehicles in the system. Even though this strategy has the benefit of allowing activation codes to be computed by any non-revoked vehicle, with a single broadcast, the size of the broadcast message may grow large if many revocations occur in the system.

Another way to address the potential growth of CRLs—which can be used in e.g., SCMS—comprises inserting "linkage values" in every pseudonym certificate, in such a manner that all certificates belonging to the same vehicle can be identified with a single CRL entry. This approach ensures that CRLs grow with the number of revoked vehicles, rather than with the number of revoked certificates, and preserves the privacy of non-revoked vehicles (as long as some care is taken in computing such linkage values). Nevertheless, such benefits come with potential drawbacks:

Low flexibility: Revoking a vehicle also means that its privacy is rescinded, since its entire set of pseudonym certificates can then be linked together. Thus, the only way to reinstate a revoked vehicle into the system is to re-provision that vehicle with new certificates. In other words, there is no "unrevoke" mechanism for situations like a vehicle being wrongly revoked, or in which the revocation occurred due to a temporary error that has been patched.

CRL growth: If vehicles are provisioned with certificates for y years, an entry may linger in the CRL for the same amount of time. For y=1 to 3, as in the original SCMS, this means that CRLs may actually grow big because each entry may have to be repeatedly distributed during a few years. This negatively affects both the distribution and storage costs of such CRLs.

Processing overhead: Additional processing is required on the vehicle-side to check whether a received certificate matches a CRL entry. Specifically, suppose that vehicles carry $\sigma$ pseudonym certificates that are simultaneously valid, and that $n_r$ vehicles are revoked. Then, to check a certificate's revocation status, vehicles need to perform $2 \cdot \sigma \cdot n_r$ encryptions (or hashes, if certain optimizations are employed). Alternatively, the vehicle can pre-compute one lookup table (LUT) containing $n_r \cdot \sigma$ entries for each certificate validity period, and then keep such a LUT in fast memory for speeding-up verifications. This is one reason why it is estimated that highly resource-constrained vehicles will be able to handle no more than 10,000 CRL entries, a number easily reached if vehicles are loaded with certificates for y=3 years and more than 3,333 misbehaving vehicles are revoked per year.

Such limitations of CRLs are among the main motivations for the solutions proposed in ACPC and C-ITS, which aim to reduce the need for CRLs in V2X environments.

ACPC uses a broadcast channel to distribute activation codes (ACs). Broadcasting ACs does not pose any security concerns since ACs activate/decrypt only their respective certificates, which are linked to a specific EE or vehicle. On the contrary, it can cache and distribute ACs to the respective owners. Although ACPC was designed for the broadcast mode, in some embodiments, a unicast mode may be adopted or employed for distributing ACs in ACPC. The unicast mode for ACPC provides potential advantages, such as, for example: (1) expunging the need for caching of ACs; (2) higher availability and guaranteed delivery of ACs; and (3) on-demand delivery of ACs. When compared to broadcast, in the unicast mode each EE or vehicle initiates a secure connection to request its respective ACs. Although such an approach saves bandwidth, abiding by the current ACPC model, the EEs or vehicles can leak sensitive information (e.g., location and identity) due to the AC encoding algorithm that depends on the vehicles' identities. According to embodiments of the present disclosure, systems and methods of the present disclosure are provided to, among other things, prevent such privacy leakages in the unicast mode of ACPC.

In this enhancement to the conventional ACPC model, which can be referred to as "uACPC," the vehicle's privacy remains intact even on an authenticated unicast channel. Also, in some embodiments, an end-to-end anonymous authentication architecture may be provided to prevent the back-end infrastructure from tracking clients based on network-related metadata. When combining uACPC with an anonymous authentication protocol, a privacy-preserving AC distribution may be provided even in the unicast communication mode. Furthermore, uACPC can leverage edge computing technologies to accelerate the generation and distribution of ACs and CRLs in the unicast mode.

Security Credential Management System (SCMS)

Security Credential Management System (SCMS) is a vehicular public-key infrastructure (VPKI) design for protecting V2X—vehicle-to-vehicle (V2V) and vehicle-to-infrastructure (V2I)—communications. SCMS is described in further detail in Whyte et al., "A security credential management system for V2V communications," in IEEE Vehicular Networking Conference, 2013, pp. 1-8, and CAMP LLC, "Security Credential Management System Proof-of-Concept Implementation—EE Requirements and Specifications Supporting SCMS Software Release 1.1," May 2016; available at https://www.its.dot.gov/pilots/pdf/SCMS_POC_EE_Requirements.pdf, both of which are incorporated herein by reference. SCMS deals with revocable privacy while preventing any given certificate management entity from tracking devices 110/150 by the entity itself, i.e., without colluding with other system entities. By doing so, SCMS copes with the security needs of V2X while elegantly addressing a threat model in which the system's entities can be considered "honest-but-curious," i.e., they follow the correct protocols but may try to track vehicles if this can be done in an undetectable manner, as described in Khodaei et al., "The key to intelligent transportation: Identity and credential management in vehicular communication systems," IEEE Vehicular Technology Magazine, vol. 10, no. 4, pp. 63-69, December 2015, which is incorporated by reference. This is accomplished by combining (A) an efficient and privacy-preserving method for vehicles to obtain large batches of pseudonym certificates, and (B) an ancillary process for revoking the user's privacy in case of misbehavior, so multiple certificates belonging to the same user can be easily linked together.

General Notation

For convenience, the "Symbols" Table below includes a list of the symbols and general notation adopted in this disclosure for the relevant environment including V2X, connected vehicle, and/or SCMS.

TABLE

| Symbols | |
|---|---|
| Symbol | Meaning |
| U | A vehicle's public key, different for each pseudonym certificate, and used as a pseudonym, placed in pseudonym a certificate |
| u | The private key corresponding to U |
| s, S | Private and public caterpillar keys for signature |
| e, E | Private and public caterpillar keys for encryption |
| $\hat{s}, \hat{S}$ | Private and public cocoon keys for signature |
| $\hat{e}, \hat{E}$ | Private and public cocoon keys for encryption |
| x, X | Private and public unified caterpillar keys |
| $\hat{x}, \hat{X}$ | Private and public unified cocoon keys |
| β | Number of cocoon keys in a batch of pseudonym certificates generated in response to a request to generate the pseudonym certificates |
| la_id | ID of a Linkage Authority |
| l | Number of LAs (typically two) |
| $ls_i$ | Linkage seed |
| $plv_i$ | Pre-linkage value |
| σ | Number of certificates valid in each time-period |
| lv | Linkage value |
| Dec(K, str) | Decryption of bitstring str with key K |
| Sign(K, str) | Signature of bitstring str with key K |
| Verif(K, str) | Verification of signature on str with key K |
| Enc(key, str) | Encryption of a bit string str with key |
| Hash(str) | Hash of str |
| $b^n$ | Bitstring corresponding to the bit b repeated n times |
| \|str\| | The length of str, in bits |
| $str_1 \| str_2$ | Concatenation of bitstrings $str_1$ and $str_2$ |

The notation enc(key, str) denotes the encryption of a bit string str with key. An example encryption technique uses standard block ciphers such as the Advanced Encryption Standard (AES), as described in more detail in NIST, Federal Information Processing Standard (FIPS 197)—Advanced Encryption Standard (AES), National Institute of Standards and Technology, U.S. Department of Commerce, Gaithersburg, MD, USA, November 2001, available: http://csrc.nist.gov/publications/fips/fips197/fips-197.pdf. Similarly, the notation hash(str) denotes the hash of str, using some standard hash function such as SHA-2 or SHA-3, as described in more detail in NIST, Federal Information Processing Standard (FIPS 180-4)—Secure Hash Standard (SHS), National Institute of Standards and Technology, U.S. Department of Commerce, Gaithersburg, MD, USA, August 2015, DOI:10.6028/NIST.FIPS.180-4, and NIST, Federal Information Processing Standard (FIPS 202)—SHA-3 Standard: Permutation-Based Hash and Extendable-Output Functions, National Institute of Standards and Technology, U.S. Department of Commerce, Gaithersburg, MD, USA, August 2015, DOI: 10.6028/NIST.FIPS.202, both of which are incorporated by reference herein.

The length of a given string str in bytes is denoted |str|. The generator point of an elliptic curve group (written additively) is denoted by G. In some public-key cryptographic algorithms, the private key is an integer k, and the corresponding private key is k·G, as common in cryptosystems based on the Diffie-Hellman paradigm.

In SCMS, each device (110/150) receives two types of certificates: an enrollment certificate 160, which has a long expiration time T and identifies a valid device in the system; and multiple pseudonym certificates 160p, each having a short validity (e.g., a few days), in such a manner that σ≥1 pseudonym certificates may be valid simultaneously. For protecting its privacy, a particular vehicle may frequently change the pseudonym certificate employed in the vehicle's communications, thus avoiding tracking by nearby vehicles or by roadside units. In practice, it is useful to limit the value of σ to a small number to avoid "sybil-like" attacks (as described in detail in Douceur, "The Sybil attack," *Proceedings of 1st International Workshop on Peer-to-Peer Systems (IPTPS)*. Springer, January 2002 (Available: https://www.microsoft.com/en-us/research/publication/the-sybil-attack/), which is incorporated herein by reference), in which one vehicle poses as a platoon aiming to gain some advantage over the system (see Moalla et al., "Risk analysis study of ITS communication architecture," 3rd *International Conference and The Network of the Future*, 2012, pp. 2036-2040, which is incorporated herein by reference). For example, such a fake platoon could end up receiving preferential treatment from traffic lights programmed to give higher priority to congested roads.

Example SCMS Architecture

Figure 6:
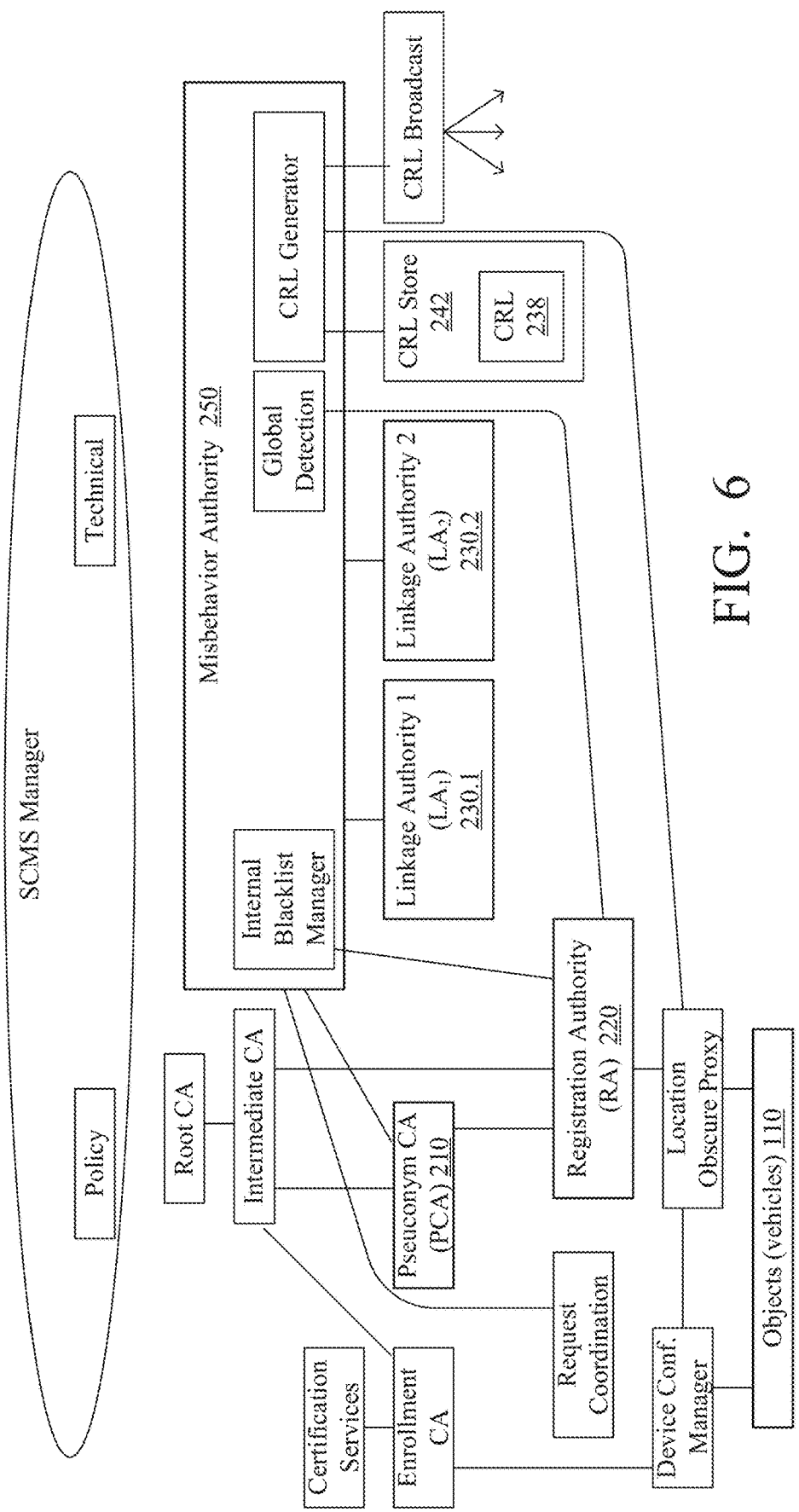
FIG. 6 is a block diagram illustrating a computer system architecture for digital certificate management, according to some embodiments.

FIG. 6 illustrates an exemplary computer system architecture environment for SCMS. SCMS was designed to allow the distribution of multiple pseudonym certificates to vehicles in an efficient manner while providing mechanisms for easily revoking them in case of misbehavior by their owners.

In SCMS, a Registration Authority (RA) 220 provides batches of pseudonym certificates 160p to authorized vehicles or objects 110/150. A batch is generated from a single request received from a vehicle, in the butterfly key expansion process. RA 220 validates the vehicle requests by the vehicles' enrollment certificates 160. In addition to an enrollment certificate, each request includes some public keys (other than 164) generated by the vehicle for the pseudonym certificate provisioning process. These public keys are labeled as 710 in FIG. 7 discussed below. RA 220 then shuffles together the keys 710 belonging to different users before individually sending them to a Pseudonym Certificate Authority (PCA) 210. As such, the PCA 210 cannot link a group of requests to the same object 110/device 150. The PCA 210, in turn, creates valid certificates 160p, and encrypts and signs them before delivering them to the RA for forwarding to the devices 110/150. Since the certificates 160p are encrypted, the RA cannot link a pseudonym certificate 160p to a device 110/150. Unless the PCA and RA collude, they are unable to link a certificate 160p to its owner 110/150.

Linkage Authority (LA) 230, or rather linkage authorities $LA_1$ and $LA_2$—also labeled as 230.1 and 230.2—generate random-like bitstrings that are combined to create a linkage value (lv 234 in FIGS. 5A, 5B) added to pseudonym certificates 160p so that the pseudonym certificates can be efficiently revoked. The lv values are different for different pseudonym certificates, but they can be linked together for a given enrollment certificate 160. See e.g., U.S. patent application No. 62/561,667, filed 21 Sep. 2017, incorporated herein by reference; U.S. patent application Ser. No. 16/136, 621, filed 20 Sep. 2018, incorporated herein by reference; and Marcos A. Simplicio Jr. et al., "A privacy-preserving method for temporarily linking/revoking pseudonym certificates in vehicular networks," https://eprint.iacr.org/2018/185.pdf, 2018, incorporated herein by reference.

Misbehavior Authority (MA) 250 obtains a misbehaving device's certificate 160p and uses the certificate's lv 234 and data obtained from the RA and PCA to revoke all of the same device's certificates 160p.

In some embodiments, each of RA 220, PCA 210, LAs 230, and MA 250 can be implemented with or incorporate one or more computing devices (e.g., computing device 150 or computer systems 316).

Butterfly Key Expansion

Figure 7:
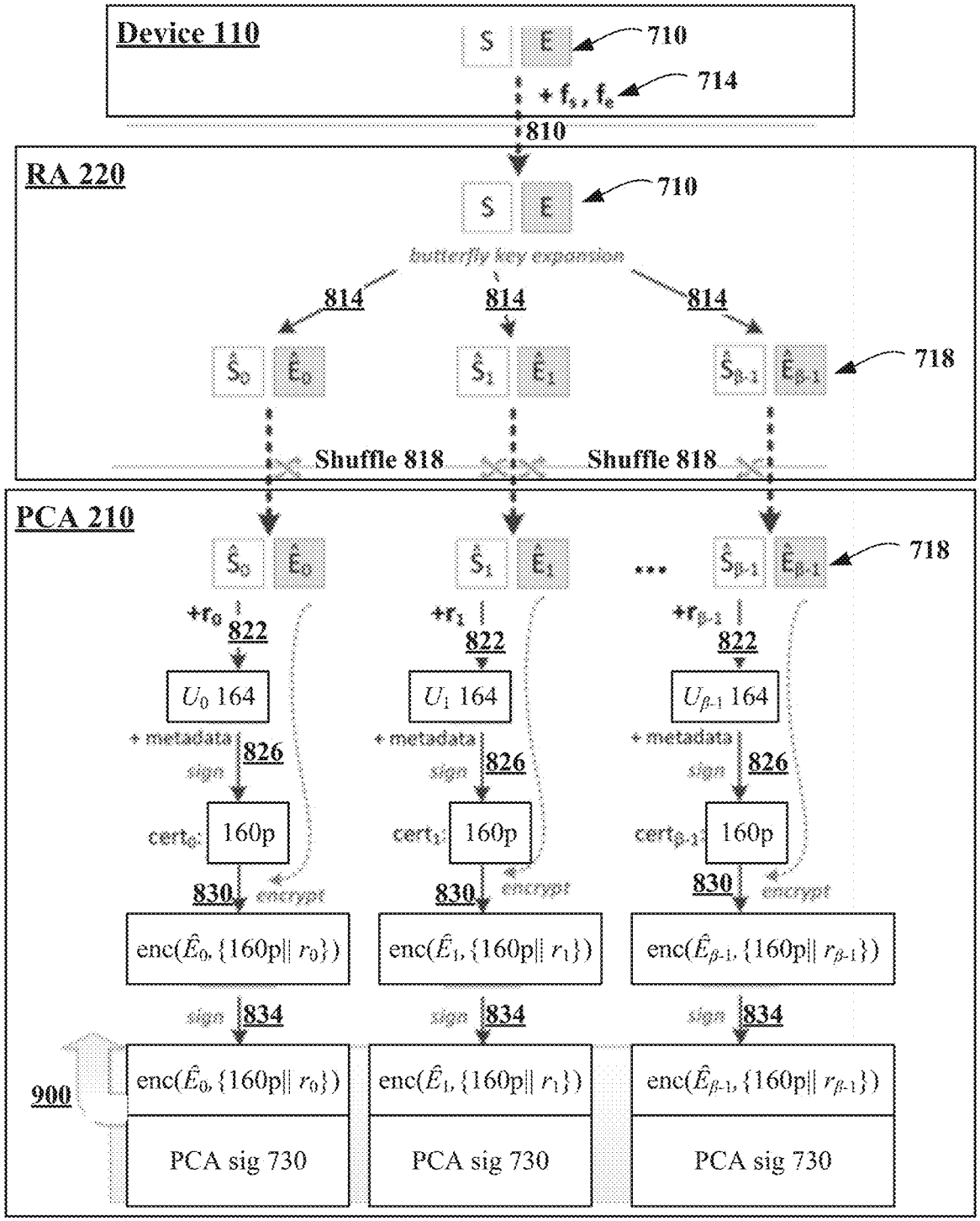
FIGS. 7 and 8 are flowcharts that illustrate processes for generating digital certificates.

The pseudonym certification provisioning process in SMCS provides an efficient mechanism for devices 110 to obtain arbitrarily large batches of (short-lived) certificates 160p with a small-sized request message. The process is illustrated in FIG. 7. First, the requesting device 110/150 generates two "caterpillar" private/public key pairs 710:

$$(s, S=s \cdot G) \text{ and } (e, E=e \cdot G)$$

The private keys s and e should be random. The keys are generated using elliptic curve cryptography. The keys (s, S) relate to the generation of pseudonyms 164 (FIGS. 5A, 5B), and are called "signature keys" because the pseudonyms 164 are used for message authentication via signature verification as described above. The keys (e, E) relate to pseudonym certificate encryption performed to hide the pseudonyms from the RA as described below; these keys are called "encryption keys".

At step 810, device 110 requests the RA to generate some predefined number β of pseudonym certificates 160p. The request sent to the RA includes the public caterpillar keys S and E, shown at 710. In addition to keys 710, the request includes data defining two suitable pseudorandom functions (PRF) 714, denoted $f_s$ and $f_e$. (In some embodiments, the function-defining data may be the seeds of these functions; the functions' outputs can be computed from the seeds. Alternatively, while less efficient, the function-defining data may include the entire description of the PRFs, including the description of the computational algorithms for the PRFs.)

The RA may receive such requests from different devices 110, and obtains #pseudonym certificates 160p for each device as follows. For each request, the corresponding keys S and E are employed by the RA, at step 814, for generating public cocoon keys 718. Specifically, at step 814, the key S is used in the generation of # public cocoon signature keys:

$$\hat{S}_i = S + f_s(i) \cdot G$$

for all i such that 0≤i<β. Similarly, at the same step 814, the RA uses the key E for generating β public cocoon encryption keys:

$$\hat{E}_i = E + f_e(i) \cdot G$$

Pairs of cocoon keys 718, i.e., $(\hat{S}_i, \hat{E}_i)$, from different devices 110 are then shuffled together by RA 220 (step 818) and sent individually or in batch to PCA 210 for the generation of the corresponding pseudonym certificates 160p. Each pair of cocoon keys is accompanied by the corresponding metadata, such as validity period 165 and data required for computation of linkage value (lv) 234; see FIGS. 4, 5A, 5B.

Figure 8:
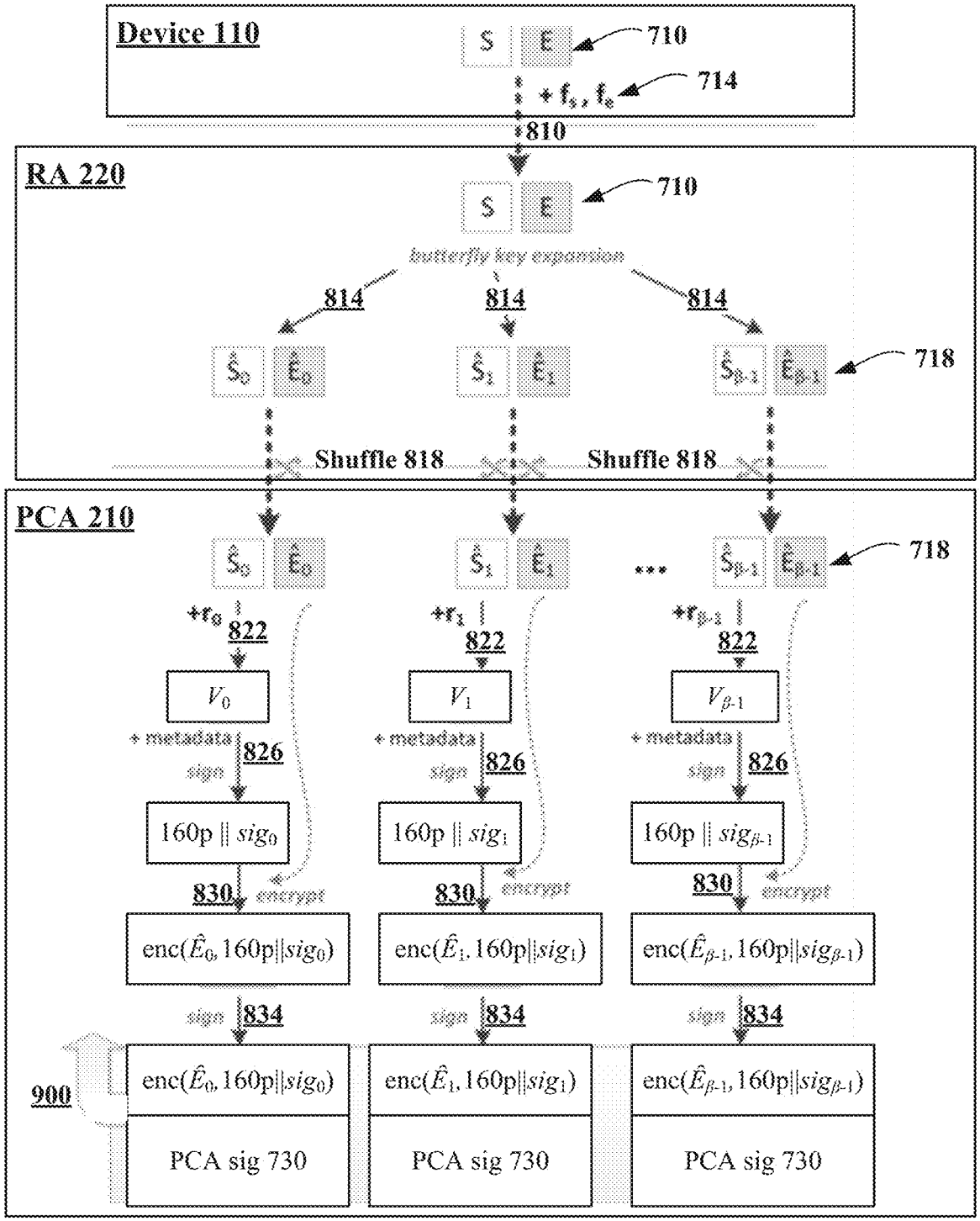

For each pair of cocoon keys $(\hat{S}_i, \hat{E}_i)$, the PCA can either create an explicit pseudonym certificate 160p (FIG. 5A) using the method of FIG. 7, or engage in an implicit certification process (FIG. 5B and Certicom) as illustrated in FIG. 8. The explicit or implicit certificate 160p is encrypted by the PCA and sent to the RA (step 900 in FIGS. 7, 8)). The RA "un-shuffles" the pseudonym certificates, and sends each pseudonym certificate to the corresponding (associated) device 110. Each device's β pseudonym certificates are sent to the device in batch.

For the explicit process (FIGS. 5A, 7), the PCA computes, at step 822, a random value $r_i$ and generates the certificate's public signature key (pseudonym) 164 according to the following equation (Eq. 1):

$$U_i = \hat{S}_i + r_i \cdot G \quad \text{(Eq. 1)}$$

At step 826, the PCA forms the certificate 160p, also shown as $\text{cert}_i$, by: (1) combining $U_i$ with the metadata, e.g., the certificate's validity period 165 and the linkage value (lv) 234; and (2) digitally signing the combination to form the signature 167 (FIG. 5A).

The PCA then encrypts the certificate 160p together with the value of $r_i$, using the corresponding cocoon key $\hat{E}_1$ (step 830). The encrypted package (certificate 160p and value $r_i$) is signed again by the PCA (step 834) using the PCA's private signature key. The signature is shown at 730.

The result, i.e., the encrypted and signed package, is sent to the RA (step 900). The RA forwards the result to the requesting device 110.

Only the requesting device 110 can decrypt the value:

$$\text{enc}(\hat{E}_i, 160p \| r_i)$$

(see step 834) because only the requesting device 110 knows the private key corresponding to the cocoon key $\hat{E}_i$. This private key is given by the following equation (Eq. 2):

$$\hat{e}_i = e + f_e(i) \quad \text{(Eq. 2)}$$

Therefore, only device 110 can learn the pseudonym $U_i$ (as part of certificate 160p) and compute the corresponding private signature key:

$$u_i = s + r_i + f_s(i) \quad \text{(Eq. 3)}$$

The device 110 can also verify the signature keys $u_i$, $U_i$ by checking that:

$$U_i = u_i \cdot G \quad \text{(Eq. 4)}$$

Device 110 also verifies the PCA signature 730 to prevent the Man-in-the-Middle attack by the RA as described below.

For implicit certificates 160p, this process is as follows (see FIG. 8). The cocoon key generation (steps 810, 814, 818) is the same as for the explicit certificates. Then at step 822, the PCA computes a random $r_i$, and computes the credential 164:

$$V_i = \hat{S}_i + r_i \cdot G \quad \text{(Eq. 5)}$$

Then at step 826, the PCA creates the implicit certificate 160p, also denoted $\text{cert}_i$, as:

$$\text{cert}_i = (V_i, \text{meta})$$

i.e., $$\text{cert}_i = V_i \| \text{meta}$$

where "meta" is the metadata (including validity period 165 etc.).

Also at step 826, the PCA signs this certificate to obtain the signature $\text{sig}_i$ as follows:

$$\text{sig}_i = h_i \cdot r_i + u_{PCA} \quad \text{(Eq. 6)}$$

where $h_i = \text{Hash}(\text{cert}_i)$, and $u_{PCA}$ is the PCA's private signature key.

The remaining steps of the certificate generation are similar to FIG. 7. Specifically, the PCA encrypts the certificate 160p together with the signature value of $\text{sig}_i$, using the corresponding cocoon key $\hat{E}_i$ (step 830). The encrypted package (certificate 160p and value $\text{sig}_i$) is signed by the PCA (step 834) using the PCA's private signature key. The signature is shown at 730. At step 900, the result (the encrypted structure and the signature 730) is sent to the requesting device 110 via the RA 220.

The device 110 verifies the PCA signature 730, decrypts the package $\text{cert}_i \| \text{sig}_i$, and computes:

$$h_i = \text{Hash}(\text{cert}_i) \quad \text{(Eq. 7)}$$

Device 110 then sets its own private signature key to:

$$u_i = h_i \cdot (s + f_s(i)) + \text{sig}_i \quad \text{(Eq. 8)}$$

whereas the corresponding public signature key takes the form:

$$U_i = u_i \cdot G \quad \text{(Eq. 9)}$$

The device 110 can then verify the validity of the public key $U_i$ by ascertaining that $$U_i = h_i \cdot V_i + U_{PCA} \quad \text{(Eq. 10)}$$

where $U_{PCA}$ is the PCA's public signature key corresponding to $u_{PCA}$.

Whichever certificate model is adopted, at step 834 of FIGS. 7 and 8, the encrypted PCA response is signed using the PCA's own private signature key $u_{PCA}$, aiming to prevent an "honest-but-curious" RA from engaging in a Man-in-the-Middle (MitM) attack. Namely, without this signature 730, a MitM attack by the RA could be performed as follows: (1) instead of $\hat{E}_i$, the RA sends to the PCA, at step 818, a fake cocoon encryption key $\hat{E}_i = z \cdot G$, for an arbitrary value of z; (2) at step 900, the RA decrypts the PCA's response using z, learning the pseudonym $U_i$ (FIG. 7) or $V_i$ (FIG. 8); and (3) the RA re-encrypts the certificate with the correct $\hat{E}_i$, sending the result to the device, which proceeds with the protocol as usual. But if the PCA generates signature 730 and device 110 verifies the signature 730 on the RA's response, the attack would fail because the RA cannot provide a valid signature 730 for the re-encrypted certificate generated in step (3).

Independently of the type of certificate adopted (explicit or implicit), the user's privacy is protected in this process as long as the RA and PCA do not collude. After all, the shuffling of public cocoon keys performed by the RA (step 818) prevents the PCA from learning whether or not any keys 718 belong to the same device. Unlinkability of public keys $U_i$ (FIG. 7) or $V_i$ (FIG. 8) to the devices for the RA, in turn, is also obtained because the latter does not learn the value of $U_i$ or $V_i$ randomized by the PCA using $r_i$.

Key Linkage

To avoid large certificate revocation lists (CRLs), in some embodiments, revocation can be done in such a manner that many certificates 160p from the same user can be linked together by inserting only a small amount of information into a CRL. For this purpose, each certificate 160p (FIGS. 4, 5A-B) receives a linkage value lv 234, computed by XOR-ing l prelinkage values $\text{plv}_i$ (where $1 \leq i \leq l$) provided by $l \geq 2$ different Linkage Authorities (LA). The generation of $\text{plv}_i$ by $LA_i$ is done upon request by the RA, as follows.

Figure 9:
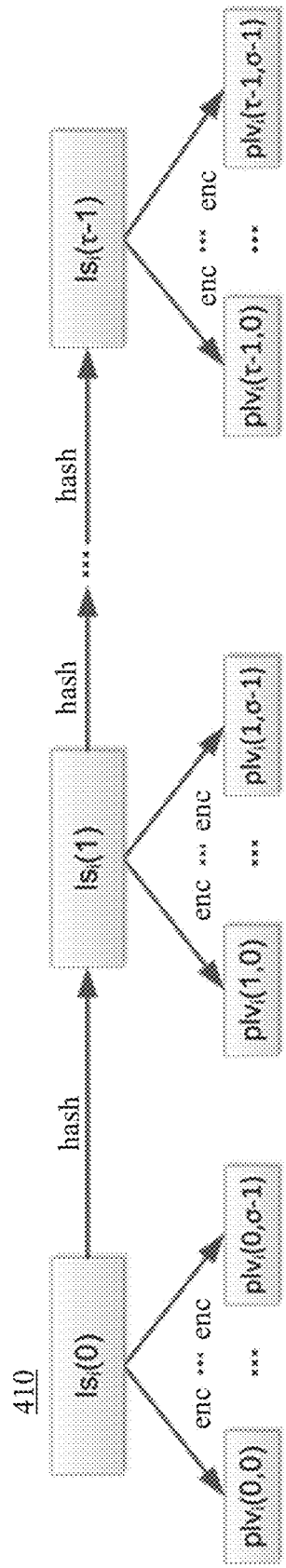
FIG. 9 illustrates a data structure used in certificate revocation schemes.

First, as illustrated in FIG. 9, $LA_i$ picks a random, 128-bit linkage seed $ls_i(0)$. Then, if the RA's request covers T certificate time-periods, $LA_i$ iteratively computes a τ-long hash chain $ls_i(t)=\text{Hash}(la\_id_i\|ls_i(t-1))$, where $la\_id_i$ is $LA_i$'s identity string and $1 \leq t \leq \tau$. See L. Lamport, "Password authentication with insecure communication," Commun. ACM, vol. 24, no. 11, pp. 770-772, 1981, incorporated herein by reference. Each $ls_i(t)$ is then used in the computation of a $\sigma$ pre-linkage values $plv_i(t, c) = \text{Enc}(ls_i(t), la\_id_i \| c)$, for $0 \leq c < \sigma$. In the CAMP reference cited above, the encryption is actually done using the Davies-Meyer construction; see B. Preneel, Davies-Meyer Hash Function. Boston, MA: Springer US, 2005, pp. 136-136, incorporated herein by reference. In particular, the cipher's input is XORed with the ciphertext produced as output. However, since this small difference is not relevant for our discussion, we omit the extra XOR in our notation. Finally, every $plv_i(t, c)$ is truncated to a suitable length, individually encrypted and authenticated using a key shared between the PCA and $LA_i$, and then sent to the RA. Even though authentication is not explicitly mentioned in Whyte et al., "A security credential management system for V2V communications," and CAMP, both cited above, authentication is important to prevent the RA from forging its own pre-linkage values and delivering them to the PCA as if they came from LAi, which would allow a dishonest RA to track devices. The RA simply includes this encrypted information, together with the corresponding cocoon keys, in the requests sent to the PCA, so the latter can compute the linkage values to be included in the resulting certificates. In the usual case, which consists of two LAs participating in this process, the linkage value for the c-th certificate valid in time-period t is computed as $lv(t, c) = plv_1(t, c) \oplus plv_2(t, c)$.

As a result of this process, whenever a device is identified as malicious by a Misbehavior Authority (MA), certificates still valid owned by that device can be revoked not only individually, but also altogether. This is accomplished via the collaboration of the PCA, RA, and LAs. Namely, the PCA can associate the lv informed by the MA to the original pseudonym certificate request received from the RA. The PCA then provides this information, together with the corresponding pre-linkage values $plv_i(t, c)$, to the RA. The RA, in turn, can (1) identify the device behind that certificate request, placing its enrollment certificate in a blacklist for preventing it from obtaining new pseudonym certificates, and (2) ask $LA_i$ to identify the linkage seed $ls_i(0)$ from which $plv_i(t, c)$ was computed. Finally, each $LA_i$ provides RA with $ls_i(t_s)$, where $t_s$ is the time-period from which the revocation starts being valid (usually, the current time-period or the one in which the misbehavior was first detected). The set of $ls_i(t_s)$ received from the LAs can then be placed in a CRL to be distributed throughout the system, allowing any entity to compute $lv(t, c)$ for time-periods $t \geq t_s$, linking the corresponding certificates to a single CRL entry. Consequently, current and future certificates owned by the misbehaving device are revoked and can be linked to that device; past certificates remain protected, though, preserving the device's privacy prior to the detection of the malicious activity.

In terms of complexity, this revocation process is such that, if the system involves l linkage authorities 230, each revoked device contributes with l pre-linkage values to the CRL. Hence, the CRL size grows linearly with the number of revoked devices, not with the number of revoked certificates. The main drawback of this gain in size is that checking whether a given certificate is in the CRL requires the verification of every CRL entry against that certificate's linkage value. More precisely, for each CRL entry published at time-period $t_s$, the verification of whether it covers a given certificate involves basically the computation of two components:

a) $ls_i(t_c)$: it takes $1 \cdot (t_c - t_s)$ hashes to compute $ls_i(t_c)$ from $ls_i(t_s)$, where $1 \leq i \leq l$ and $t_c$ is the time-period when the verification is performed. This cost may be reduced by means of pre-computation, i.e., if the device always keeps the updated version of the linkage seeds, $ls_i(t_c)$, besides the original ones provided in the CRL. Nevertheless, to cope with the lack of a system-wide time synchronization (see Verheul reference), devices may actually need to keep a slightly older linkage seed in memory; for example, by keeping $ls_i(t_c - \epsilon)$ for a small $\epsilon$, it is possible to compute $ls_i(t_c)$ with only $\epsilon$ hashes.

b) $plv_i(t_c, c)$: it takes I encryptions to compute $plv_i(t_c, c)$ from $ls_i(t_c)$ if the value of c for the certificate under verification is known; this is the case, for example, if the value of c is part of that certificate's metadata. Otherwise, the total cost would be up to $1 \cdot \sigma$ encryptions, since the certificate under analysis may be any out of a that are valid in the current time-period; with enough memory, however, the latency of this process can be reduced via the pre-computation of a look-up table with all a possible entries for each $ls_i(t_c)$ in the CRL. On the one hand, besides providing better performance, the first approach facilitates the construction of solutions resilient to the aforementioned sybil-like attacks; this can be accomplished by counting as valid only messages signed with certificates for a fixed value of c. On the other hand, this ability may also be abused to allow vehicle tracking if one or several applications decide to only accept a specific c; meanwhile, a bit of privacy is lost because different certificates known to have the same value for a are also deemed to belong to different vehicles. Therefore, mandating the disclosure of c in pseudonym certificates may become controversial and, in practice, it would probably be avoided in favor of look-up tables.

All in all, to reduce the costs related to the revocation verification, it is important to limit the total number of entries in the CRLs. Unfortunately, however, since each CRL entry covers $\tau$ time-periods, they may have to remain in the CRL for quite a long time. To address this issue, some embodiments described herein prevent revoked vehicles' certificates from being activated, so the corresponding entries on the CRL can be removed earlier.

Unified Butterfly Key Expansion Process (eSCMS)

Some embodiments of the present disclosure can be used with another system, called eSCMS, that improves the pseudonym provisioning process by unifying the generation of butterfly keys for encryption and signature. eSCMS is described in U.S. patent application Ser. No. 16/165,871, filed 19 Oct. 2018, incorporated herein by reference.

The butterfly key expansion (step 814) originally described in Whyte et al., "A security credential management system for V2V communications," cited above, is executed twice by the RA during the pseudonym certification provisioning process: once for the generation of the public signature keys and another for encryption keys. As a result, the device itself needs to send to the RA two caterpillar keys (S and E), as well as the corresponding PRFs ($f_s$ and $f_e$), for the computation of the corresponding cocoon keys ($\hat{S}_i$ and $\hat{E}_i$, where $0 \leq i < \beta$). In addition, since $\hat{S}_i$ and $\hat{E}_i$ are seen as independent keys by the PCA when issuing a certificate, the PCA needs not only to encrypt the certificate but also sign the resulting encrypted package to avoid manipulation by the RA. Even if an efficient signcryption algorithm is employed for this purpose—see e.g., Y. Zheng, "Digital signcryption or how to achieve cost (signature & encryption) <<cost(signature)+cost(encryption)," in Advances in Cryptology—CRYPTO'97: 17th Annual International Cryptology Conference. Berlin, Heidelberg: Springer Berlin Heidelberg, 1997, pp. 165-179, incorporated herein by reference—the extra signature leads to additional overheads: on the PCA, for the computation and transmission of such signature; on the RA, for its reception and re-transmission; and on the end devices, for its reception and verification, besides the verification of the certificate's signature itself.

It turns out, however, that the generation and usage of encryption and signature keys can be done in a unified manner. This leads to better efficiency in terms of processing and bandwidth usage, without loss of security or functionality. This alternate process is part of eSCMS.

In eSCMS (FIGS. 10A, 10B, 11A, 11B), the generation and usage of the caterpillar keys 710 is done in a unified manner, leading to better efficiency without loss of security or functionality. Specifically, in some embodiments, device 110 generates only one caterpillar key pair, (x,X) in FIGS. 10AB and 11A-B, instead of two key pairs (e,E) and (s,S). This caterpillar key pair (x,X) can have the same size as any one of (e,E) and (s,S), and is used to generate both the encryption and signature keys. Both the explicit and the implicit certificate models are eSCMS compatible.

Explicit Certificate Process

Figure 10A:
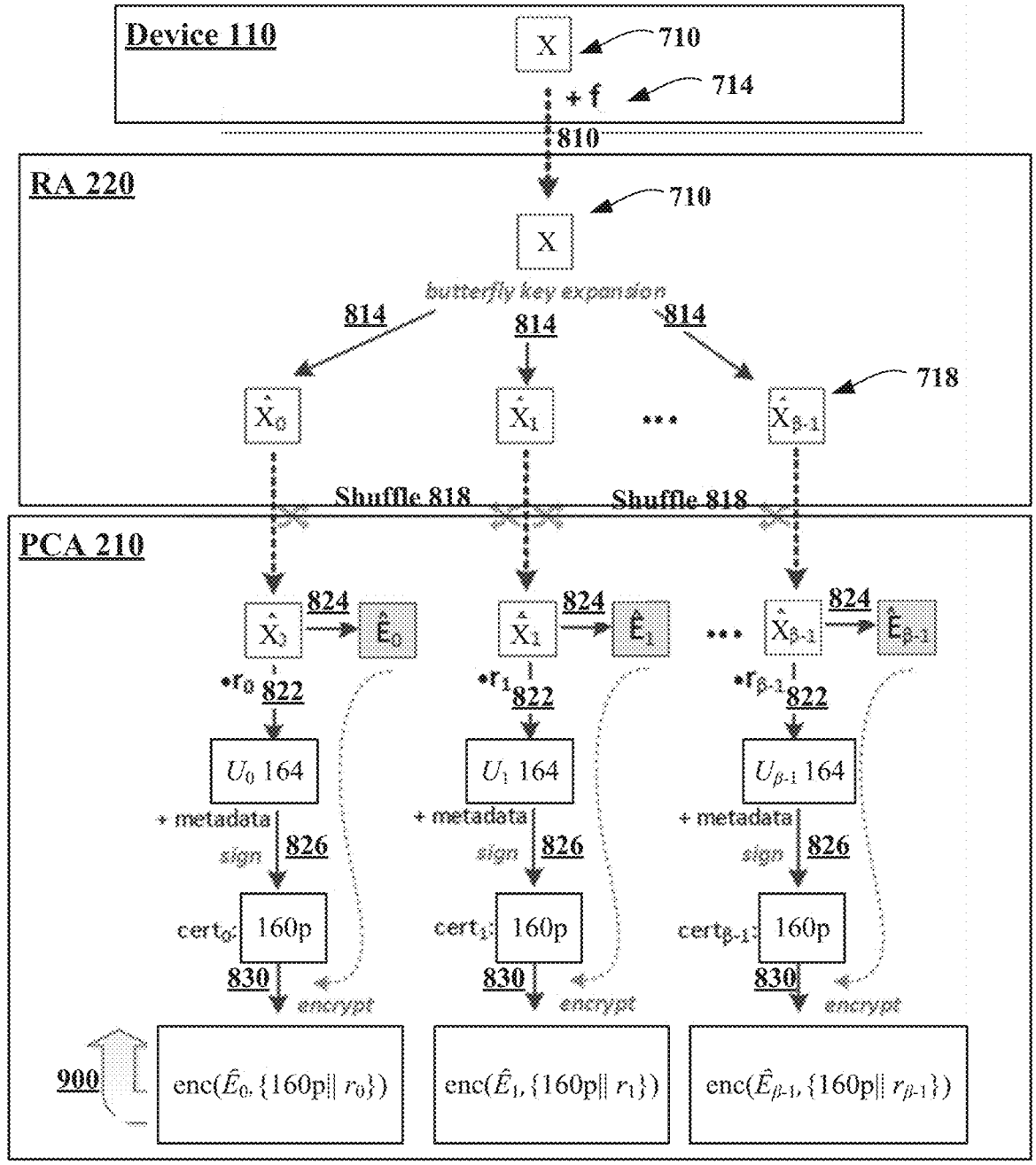
FIGS. 10A, 10B, 11A, 11B are flowcharts illustrating certificate issuance techniques used in some embodiments.
Figure 10B:
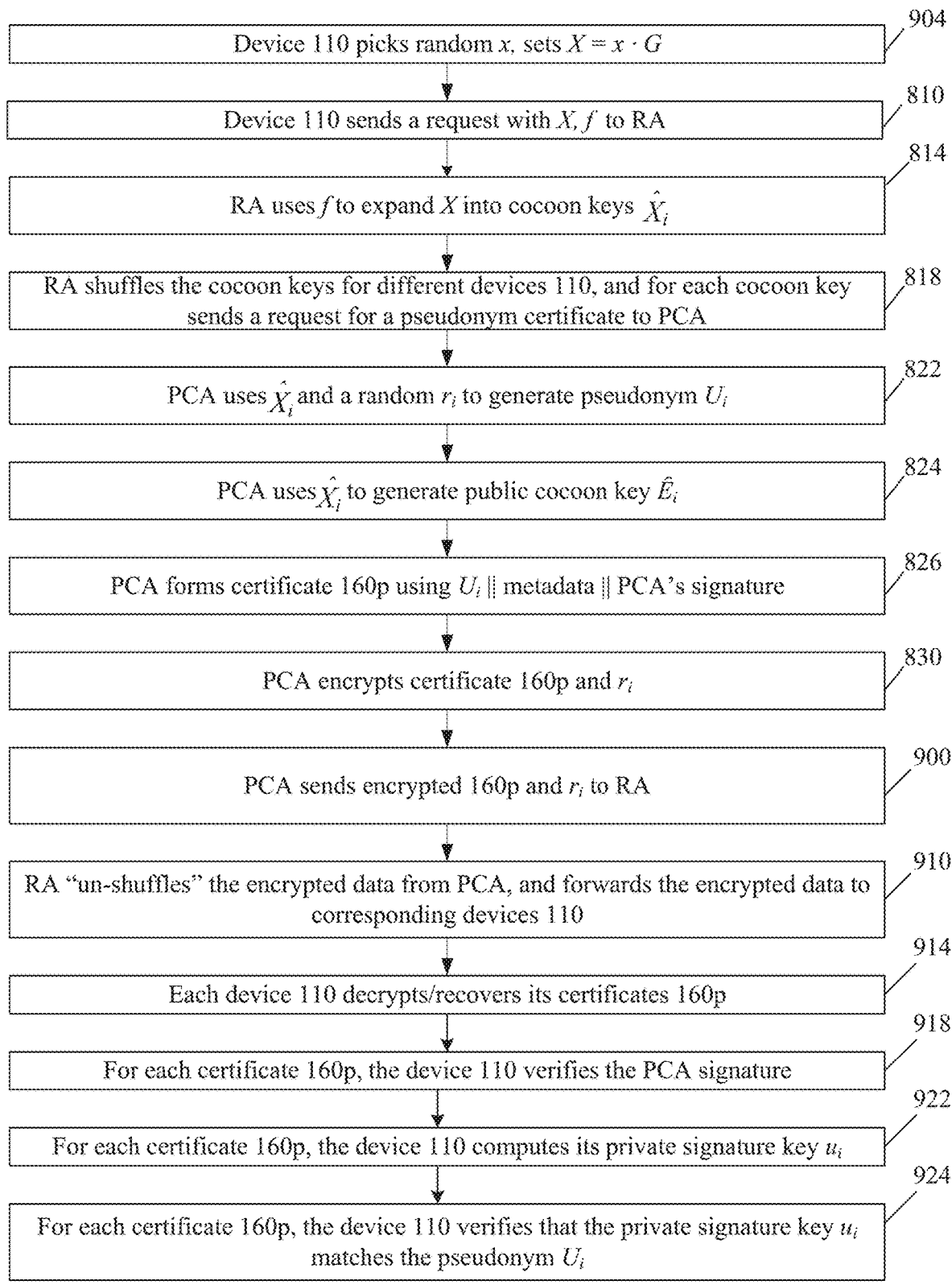

An example embodiment of an explicit certificate scheme—that can, for example, be used in eSCMS—is depicted in FIGS. 10A-B. At step 904, the requesting device 110 generates only a single caterpillar private/public key pair 710: (x, X=x·G). The private key x can be randomly generated. The public key X will be used by the PCA both for encrypting the certificate 160$p$ and for creating the public key or pseudonym 164 for the certificate as described below (step 824).

At step 810, the device 110 requests the RA to generate some predefined number β of pseudonym certificates 160$p$. The device request sent by the device to the RA includes a unique ID ("device request ID"), a unique device ID (e.g., VID), the public unified caterpillar key X, and data defining a suitable pseudorandom function (PRF) 714, shown simply as $f$. The function $f$ can be the same as $f_s$ or $f_e$ in SCMS. A copy of each device request is stored by the device in its memory.

At step 814, the RA generates β public unified cocoon signature keys for each device (similarly to SCMS):

$$\hat{X}_i = X + f(i) \cdot G \quad \text{(Eq. 11)}$$

At step 818, the RA shuffles these cocoon keys for different devices, and for each cocoon key $\hat{X}_i$ the RA sends a request ("RA request") for a pseudonym certificate 160$p$ to PCA 210. The RA requests for different devices 110 can be sent to the PCA in batch, but this is not necessary.

For each RA request, the RA generates a unique request ID ("RA request ID"), and creates a data structure ("RA request data structure") containing the RA request ID, the cocoon key index i (see equation (Eq. 11)), and the associated device request. The RA request ID is provided to the PCA with the RA request. Also provided are metadata, e.g., the certificate's validity period 165 and the linkage value (lv) 234. The device ID is not provided to the PCA, so the PCA cannot associate the RA request with the device. Also, the PCA cannot determine whether different RA requests are associated with the same or different devices.

For each cocoon key $\hat{X}_i$, the PCA can either create an explicit or implicit pseudonym certificate 160$p$. FIGS. 10A-B illustrate a process for explicit certificates. In either case, the explicit or implicit certificate 160$p$ will later be encrypted by the PCA and sent to the RA (step 900). Each encrypted pseudonym certificate will be accompanied by the RA request ID, allowing the RA to "un-shuffle" the pseudonym certificates, i.e., associate each encrypted package with the device, and send the encrypted package to the associated device. Optionally, each device's β pseudonym certificates can be sent to the device in batch.

For the explicit certificates, at step 822, the PCA generates a random value $r_i$, and generates the certificate's public signature key (pseudonym) 164 as a randomized function of cocoon key $\hat{X}_i$, i.e., as a function of $\hat{X}_i$ and $r_i$. For example, either one of the following equations (Eq. 12), (Eq. 12') can be used:

$$U_i = \hat{X}_i + r_i \cdot G \quad \text{(Eq. 12)}$$

$$U_i = r_i \cdot \hat{X}_i \quad \text{(Eq. 12')}$$

Also (step 824), the PCA generates a public cocoon encryption key $\hat{E}_i$. In some embodiments, $\hat{E}_i$ is set equal to $\hat{X}_i$, i.e.

$$\hat{E}_i = \hat{X}_i \quad \text{(Eq. 13)}$$

Other expressions for $\hat{E}_i$ can also be used. For example:

$$\hat{E}_i = \text{hash}(\hat{X}_i) \cdot G + \hat{X}_i \quad \text{(Eq. 13')}$$

The remaining steps may or may not be similar to FIG. 7, but the generation of the PCA signature 730 can be omitted. Specifically, in some embodiments, at step 826, the PCA forms the certificate 160$p$, also shown as cert$_i$, by: (1) combining $U_i$ with the metadata, e.g., the certificate's validity period 165 and the linkage value (lv) 234; and (2) digitally signing the combination to form the signature 167 (FIG. 5A).

At step 830, the PCA encrypts the package which includes (possibly consists of) the certificate 160$p$ and the value $r_i$. The encryption uses the corresponding cocoon key $\hat{E}_i$. An exemplary encryption scheme is ECIES (see *IEEE Standard Specifications for Public-Key Cryptography—Amendment 1: Additional Techniques*, IEEE Computer Society, 2004, incorporated herein by reference). Other encryption schemes can also be used.

The result, i.e., the encrypted package, is sent to the RA (step 900), together with the RA request ID received by the PCA at step 818. As noted above, signature 730 is omitted. The RA cannot decrypt the package.

The RA "un-shuffles" the data received from the PCA. To perform this operation, the RA matches the RA request ID accompanying each encrypted package with the RA request ID stored in the RA's memory (step 818). The RA forwards to each device 110 the encrypted package for that device (step 910). With each encrypted package, the RA sends to the device the corresponding i value defining the associated cocoon key; see equation (Eq. 11). The RA obtains the i value from the RA request data structure.

At step 914, for each certificate 160$p$, the associated device 110 computes the decryption key $\hat{e}_i$ corresponding to the encryption (cocoon) key $\hat{E}_i$. If $\hat{E}_i$ was set to equal $\hat{X}_i$ (equation (Eq. 13)), then:

$$\hat{e}_i = x + f(i) \quad \text{(Eq. 14)}$$

In the case of equation (Eq. 13'):

$$\hat{e}_i = \text{hash}(\hat{X}_i) + x + f(i) \qquad (\text{Eq. 14'})$$

using the same hash function "hash" as was used in equation (Eq. 13').

The device 110 uses the decryption key $\hat{e}_i$ to decrypt the package, and thus recovers the certificate 160p and the corresponding $r_i$. This decryption key works because, in the case of equations (Eq. 13), (Eq. 14), the encryption public key is:

$$\hat{E}_i = \hat{X}_i = x \cdot G + f(i) \cdot G$$

In the case of equations (Eq. 13'), (Eq. 14'), the decryption works because the encryption public key is:

$$\hat{E}_i = \text{hash}(\hat{X}_i) \cdot G + \hat{X}_i = \text{hash}(\hat{X}_i)G + x \cdot G + f(i) \cdot G$$

At step 918, the device verifies the PCA signature 167 using the PCA's public signature key $U_{PCA}$.

At step 922, the device computes its private signature key $u_i$ corresponding to $U_i$. If $U_i$ was computed as in equation (Eq. 12), then the private signature key is created as:

$$u_i = r_i + x + f(i) \qquad (\text{Eq. 15})$$

If equation (Eq. 12') was used, then the private signature key is created as:

$$u_i = r_i \cdot (x + f(i)) \qquad (\text{Eq. 15'})$$

At step 924, the device verifies that $$u_i \cdot G = U_i \qquad (\text{Eq. 16})$$

If any of the above checks or verifications fails, the device may reject the certificate 160p and/or all the certificates in the batch. The device may also inform pertinent authorities (e.g., misbehaving authority 250) about the error in order to trigger maintenance and/or security operations on malfunctioning or dishonest RA or PCA.

Implicit Certificate Process

Figure 11A:
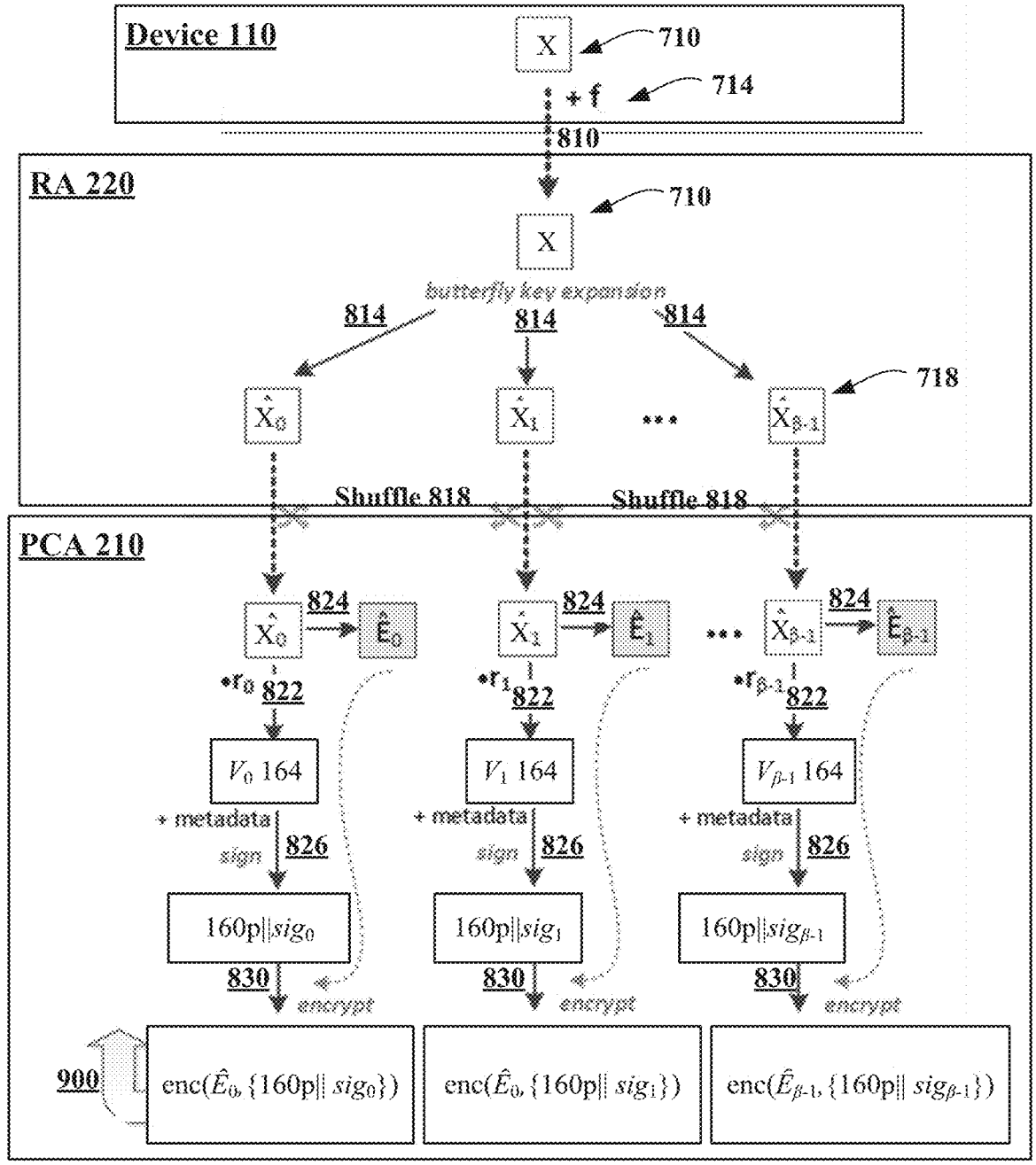
Figure 11B:
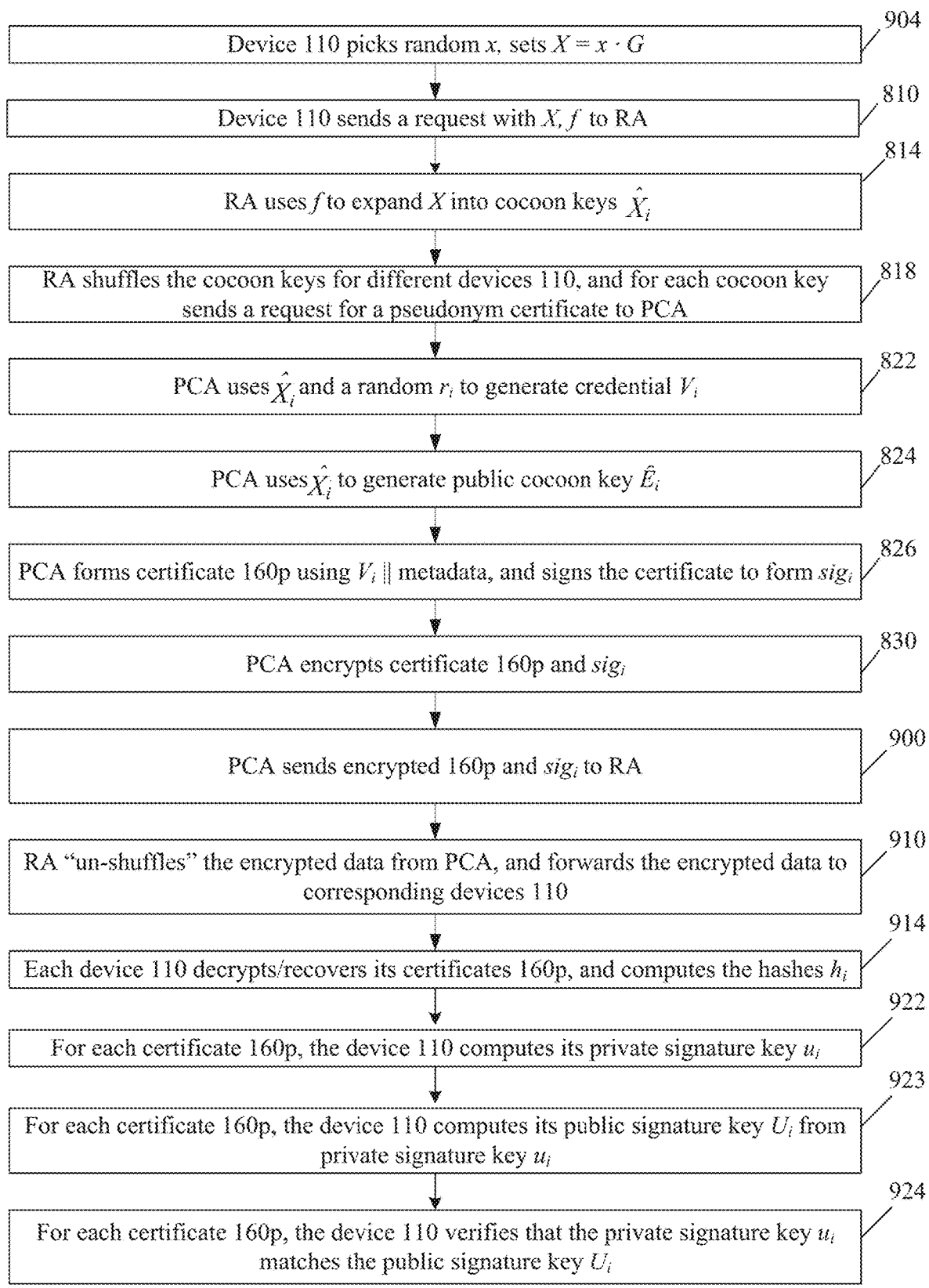

FIGS. 11A, 11B illustrate an implicit certificate scheme, according to some embodiments, which can be used, for example, in eSCMS. Steps 904, 810, 814, 818 are as in FIGS. 10A-B. Then at step 822, the PCA computes a random $r_i$, and computes a credential 164:

$$V_i = \hat{X}_i + r_i \cdot G \qquad (\text{Eq. 17})$$

At step 824, the PCA generates a public cocoon encryption key $\hat{E}_i$, possibly using the same process as for the explicit certificates, e.g., according to equation (Eq. 13) or (Eq. 13').

At step 826, the PCA creates the implicit certificate 160p, also denoted $\text{cert}_i$, as:

$$\text{cert}_i = (V_i, \text{meta}) \qquad (\text{Eq. 18})$$

i.e.

$$\text{cert}_i = V_i \| \text{meta}$$

where "meta" is the metadata (including validity period 165 etc.).

Also at step 826, the PCA signs this certificate to obtain the signature $\text{sig}_i$ as follows:

$$\text{sig}_i = h_i \cdot r_i + u_{PCA} \qquad (\text{Eq. 19})$$

where $h_i = \text{Hash}(\text{cert}_i)$.

At step 830, the PCA encrypts a package which includes (possibly consists of) the certificate 160p and the signature $\text{sig}_i$. The encryption uses the corresponding cocoon key $\hat{E}_i$. An exemplary encryption scheme is ECIES, but other schemes can also be used.

At steps 900 and 910, the encrypted package is sent to the requesting device 110 via the RA 220, possibly without being signed by the PCA (signature 730 is omitted), using the same process and data structures (including RA request data structures) as in FIGS. 10A-B. The RA cannot decrypt the package.

At step 914, the device 110 receives the encrypted package and the corresponding value i, computes the private key P, as in equation (Eq. 14) or (Eq. 14'), uses this key to decrypt the PCA's response package $\text{cert}_i \| \text{sig}_i$, and then computes:

$$h_i = \text{Hash}(\text{cert}_i) \qquad (\text{Eq. 20})$$

At step 922, the device sets its own private signature key to:

$$u_i = h_i \cdot (x + f(i)) + \text{sig}_i \qquad (\text{Eq. 21})$$

and computes the corresponding public signature key at step 923 as:

$$U_i = u_i \cdot G \qquad (\text{Eq. 22})$$

The device 110 can then verify the validity of the public key $U_i$ by ascertaining, at step 924, that $$U_i = h_i \cdot V_i + U_{PCA} \qquad (\text{Eq. 23})$$

where $U_{PCA}$ is the PCA's public signature key.

Other features of some embodiments are described in Marcos A. Simplicio Jr. et. al., "The Unified Butterfly Effect: Efficient Security Credential Management System for Vehicular Communications," 2018, Cryptology ePrint Archive: Report 2018/089, https://eprint.iacr.org/2018/089.pdf, incorporated herein by reference.

Activation Codes for Pseudonym Certificates (ACPC)

In SCMS and other CRL-based certificate revocation systems, the cost of checking whether a certificate is included in a given CRL grows linearly with the number of devices (e.g., vehicles) included in that CRL. Therefore, ensuring that the number of CRL entries remains small is beneficial not only to save bandwidth when distributing CRLs, but also to allow a faster and more energy-efficient verification of a certificate's revocation status. As already described, SCMS can use a Linkage Authority based mechanism for shortening the CRLs, which associates several certificates to the same entry (lv 234). But this mechanism also extends the lifetime of those entries in the CRL. The reason is that linkage seeds placed into a CRL can only be safely removed from the CRL after all certificates associated with those seeds are expired. Consequently, even if device revocation events occur at a low frequency, CRLs may actually grow big because the corresponding entries will remain in the CRL for a duration comparable to that of certificate batches (e.g., years).

To avoid this growth of CRLs while preserving the performance gains associated with the butterfly key derivation, an activation code scheme is provided, some embodiments of which are usable with SCMS or eSCMS.

More specifically, Activation Codes for Pseudonym Certificates (ACPC) is a solution for efficiently and securely integrating activation codes into SCMS. ACPC builds upon the fact that SCMS encrypts the issued pseudonym certificates, which is done to prevent any system authority from learning which certificates belong to the same user. ACPC adapts the certificate encryption procedure to include a small piece of (initially secret) data, the activation code, without which the corresponding decryption key cannot be computed. Each activation code is unique for each vehicle and allows the decryption of all certificates in a given activation period, which may be larger than each individual pseudonym certificate's validity. By revealing the activation codes for non-revoked vehicles some time before the start of an activation period, the system can gradually and controllably allow the decryption of the appropriate certificates. Hence, even if a large batch of pseudonym certificates is pre-loaded in a vehicle (e.g., during the manufacturing process), it would be unable to use those certificates after being revoked.

Figure 12:
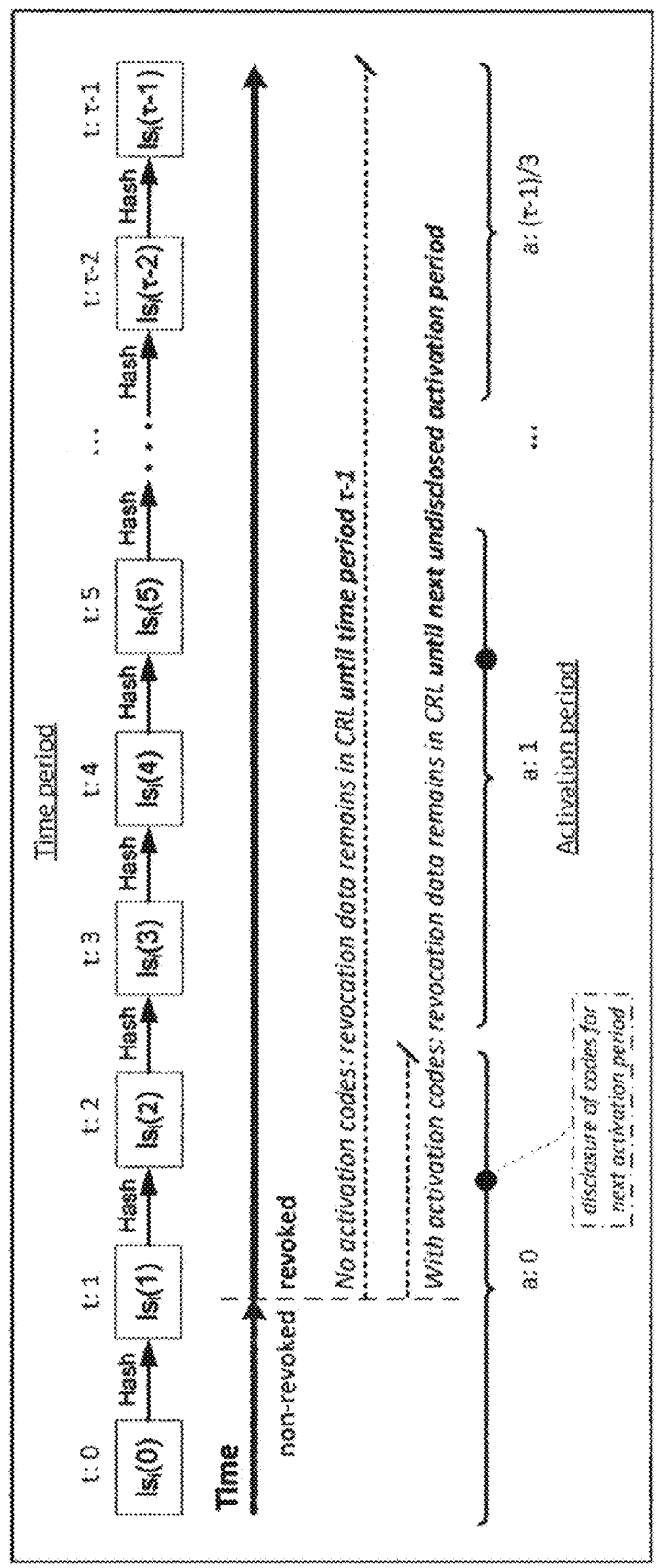
FIG. 12 illustrates a comparison of certificate revocation techniques including some techniques used in some embodiments.

In some embodiments, the activation code is a bitstring without which the pseudonym certificates previously acquired cannot be used (for example, cannot be decrypted). Each activation code corresponds to a certain activation period, which spans one or more certificate validity periods 165. This is illustrated in FIG. 12, for each activation period covering 3 validity periods. The $\tau$ validity periods are marked t:0 through t:$\tau$−1; the activation periods are marked a:0 through a:($\tau$−1)/3. If activation codes are not used, the revocation data remains in the CRL until the end of the last period $\tau$−1, i.e., until all the issued pseudonym certificates expire. If the activation codes are used, the revocation data remains in the CRL only until the end of the activation period, i.e., until all the issued and already activated pseudonym certificates expire.

The activation codes are derived by the vehicles (or other types of devices) from device-specific values (DSVs) periodically disclosed to non-revoked vehicles, before the start of the corresponding validity periods 165, to allow timely activation of the certificates. In some embodiments, each activation code is a DSV. Each DSV corresponds to a specific vehicle and activation period. Revoked vehicles do not receive their DSVs, and are prevented from obtaining activation codes for their certificates, at least until their revocation status is removed. As a result, identifiers (pseudonyms or credentials 164, and/or linkage values 234, as well as any information that allows their computation) of revoked certificates that cannot be activated do not need to remain in CRLs, reducing the CRL size. For example, certificates could be valid for 1 week, whereas the activation period could be set to 4 weeks and the activation codes could be disclosed 1 week before they are actually required. In this case, identifiers for certificates from revoked vehicles would have to remain in CRLs for at most 4 weeks, since after that those vehicles would not receive new DSVs.

Some embodiments of the ACPC scheme address the shortcomings of IFAL and BCAM in terms of performance and security, as discussed herein.

Generating Activation Codes: Binary Hash Trees

In ACPC, a Certificate Access Manager (CAM) is responsible for generating and distributing activation codes. Each CAM is expected to have a unique identifier cam_id. Some embodiments use binary hash trees 840 (FIG. 13) as described below. That is, activation codes are derived from a binary hash tree structure that provides a way to compress the decryption key.

Figure 13:
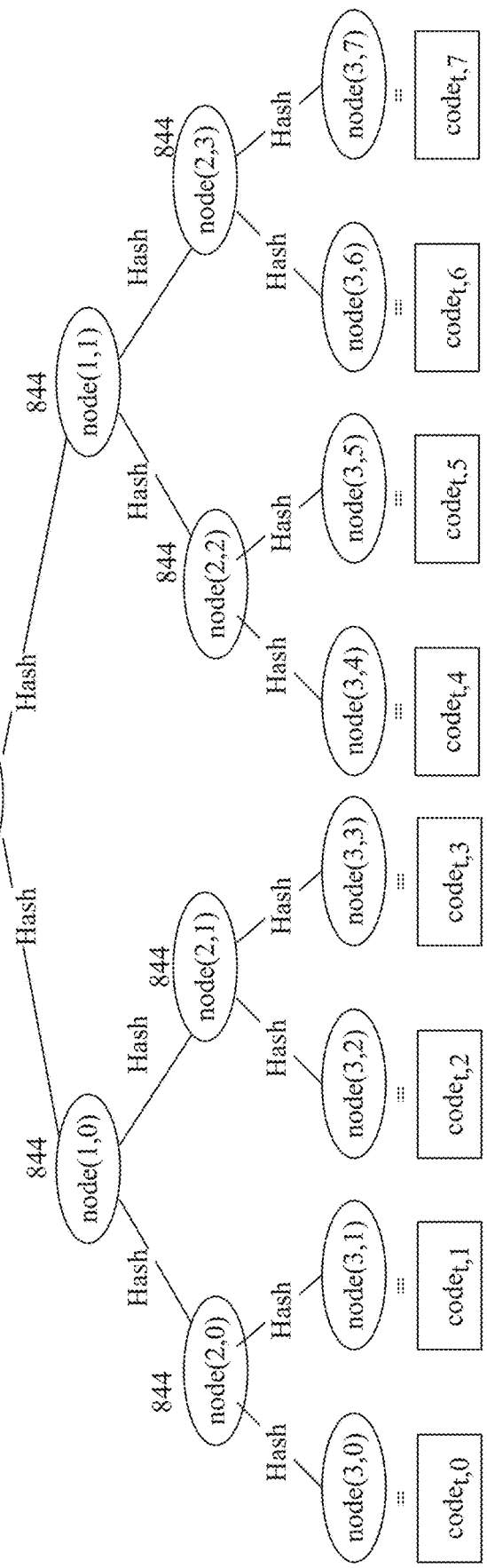
FIG. 13 illustrates a hash tree used in some embodiments.

Similarly to BCAM, some embodiments include one or more Certificate Access Managers (CAM) 838, shown in FIG. 13, each possibly having a different identifier cam_id. CAMs 838 are entities responsible for creating and distributing device-specific values (DSVs). A CAM can be implemented on one or more computer systems 316. To create and distribute the DSVs, CAM 838 creates, in its storage 150S (FIG. 2), a binary hash tree tree$_t$ (tree 840 in FIG. 13) for each time-period t, i.e., each validity period 165. In some embodiments, only one tree 840 is created for each activation period even if the activation period consists of multiple validity periods. If the activation period spans n+1 validity periods, then tree$_t$= . . . =tree$_{t+n}$.

The tree's nodes 844 are denoted node$_t$ (depth, count), or just node (depth, count) for brevity, where depth ≥0 and 0≤count ≤$2^{depth}$−1 indicates the node's position in the tree. The height of the tree matches the length of the vehicles' identifiers (VID), in bits. As a result, each leaf node$_t$ (depth, count) can be used as a DSV to represent a single vehicle 110 in the system: the vehicle with VID=count. For brevity of notation, we denote by code$_{t,VID}$ the leaf of tree$^t$ whose index corresponds to a given VID, i.e.

$$\text{code}_{t,VID} = \text{node}^t(|VID|,VID) \quad \text{(Eq. 24)}$$

In Kumar et al., for example, the suggested length of VID is 40 bits, which is enough to cover more than 1 trillion vehicles. The bit lengths do not limit the invention.

The hash tree allows compressing the DSVs for distribution to the vehicles: all the leaves of any sub-tree can be distributed by distributing the root of the sub-tree, so if all the leaves of a sub-tree correspond to honest vehicles then only the root of the sub-tree needs to be distributed. Each node of the tree is accompanied by its (depth, count) parameter, so the vehicles can compute the leaf values from the node; in the case of the root, for example, the (depth, count) parameter is (0,0).

In an exemplary embodiment, the nodes 844 are assumed to be k-bit long, yielding a k-bit security level (e.g., in modem deployments k could be 128). The tree 840 is built in the following manner. First, its root node$_t$ (0,0) is set to a random bitstring, unique for each activation period. Every other node 844 is then computed from its parent node combined with a "security string" I, a node-specific suffix. In other words, to compute activation codes, a CAM builds one binary hash tree tree$_t$ of depth D for each activation period t, using a pre-image resistant hash function Hash and suffix-free inputs. More precisely, as depicted in FIG. 13, let node$_t$ (d, c) denote the c-th node at depth d from tree$_t$, which can be uniquely enumerated as $2^d$+c (0≤d≤D, 0≤c<$2^d$). Also, let I=(cam_id∥t∥d∥c) be a unique suffix associated with node node$_t$ (d; c), where ∥ denotes concatenation. For a k-bit security level, each node node$_t$ (d; c) is assumed to be k-bit long; for example, some modem systems should adopt k≥128. Starting from a (pseudo)random root, the nodes of the activation tree are then computed as follows:

node$_t$(0,0)={0,1}$^k$ ▶ (pseudo)randomly picked
k-long bitstring node$_t$(depth,count)=Hash (node$_t$
(depth−1,[count/2])∥I)     (Eq. 25)

where the security string I is defined as $$I=(\text{cam\_id}\|t\|\text{depth}\|\text{count}) \quad \text{(Eq. 26)}$$

If the activation period spans multiple validity time-periods 165, then t can be set to the first time-period 165 covered by that activation period. This approach gives the system enough flexibility to increase or reduce the length of the activation periods without incurring the repetition of security strings. Such non-repeatable security strings are useful to thwart birthday attacks analogous to those described in E. Biham, "How to decrypt or even substitute DES-encrypted messages in 228 steps," Inf. Process. Lett., vol. 84, no. 3, pp. 117-124, November 2002, incorporated herein by reference.

The Table below shows suggested lengths for the fields that compose those security strings, leading to |I|=104. This length is large enough to support 40-bit long VIDs for $2^{24}$ time-periods, which means more than 300000 years if the time-periods are 1 week long. At the same time, it is unlikely to have any perceptible impact on the computation of activation trees 840, as long as the hash function's input fits its block size. For example, SHA-256 operates on 512-bit blocks, appending at least 65 bits to its input message (a bit '1' for padding, and a 64-bit length indicator); see NIST, Federal Information Processing Standard (FIPS 180-4)—SecureHash Standard (SHS), National Institute of Standards and Technology, U.S. Department of Commerce, National Institute of Standards and Technology, U.S. Department of Commerce (NIST), Gaithersburg, MD, USA, August 2015, DOI:10.6028/NIST.FIPS.180-4. Therefore, a single call to its underlying compression function is enough to process a 128-bit node value even when it is combined with a 319-bit or smaller security string.

TABLE

COMPONENTS OF THE SECURITY STRINGS EMPLOYED IN THE ACTIVATION TREES ACCORDING TO SOME EMBODIMENTS

| Field | Suggested length (bits) | Description |
|---|---|---|
| depth | 8 | Node's depth in the tree, starting at 0. Mandatory: \|depth\| ≥ lg(\|VID\|). |
| count | 40 | Node's index in the depth, starting at 0. Mandatory: \|count\| ≥ \|VID\|. |
| t | 24 | Time-period to which the tree is associated |
| cam_id | 32 | CAM's identifier |

The equations (Eq. 25) and (Eq. 26), and other tree-related particulars, are optional and do not limit the invention.

Issuing Certificates with Activation Codes

In some embodiments, the activation codes (ACs) are derived from the binary hash tree structure that provides a way to compress the decryption key. In particular, the recursive derivation from a release node would result in a Device-Specific Activation Code. Note that the release node can be the root of the tree if there is no revoked EEs or vehicles (which are recursively computed to the leaf nodes of the binary tree).

Each vehicle under the CAM's responsibility is associated with a leaf of the activation tree $tree_t$, so that leaf becomes the activation code for time-period t. In other words, if 2D vehicles should be supported by a CAM, so each vehicle receives a D-bit identifier vid, the activation code $code_{t,vid}$ for that vehicle would be simply $node_t$ (D, vid).

Then, where SCMS's key for decrypting a given certificate $cert_i$ would be $e_i$, ACPC makes it $e'_i = e_i + pr\:f$ ($code_{t,vid}$), where pr $f$ is a pseudorandom function. This is done in such a manner that only the CAM knows the actual value of $code_{t,vid}$ and, possibly, only the vehicle's hardware security module (HSM) can compute $e'_i$ from it. Each activation code $code_{t,vid}$ is then be coupled with all certificates from the same vehicle whose validity falls within activation period t. As a result, the disclosure of a single k-bit value is enough to decrypt all those certificates. Likewise, to prevent a vehicle whose identifier is vidr from decrypting its certificates, the CAM would simply not disclose $code_{t,vidr}$.

Figure 14A:
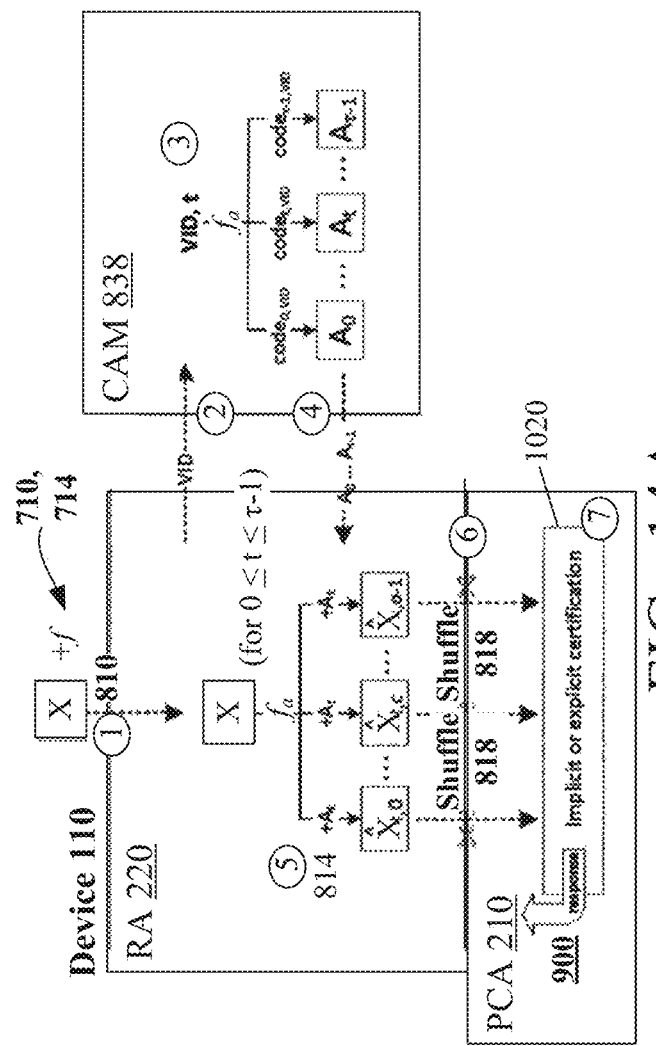
FIGS. 14A, 14B illustrate digital certificate management used in some embodiments.
Figure 14B:
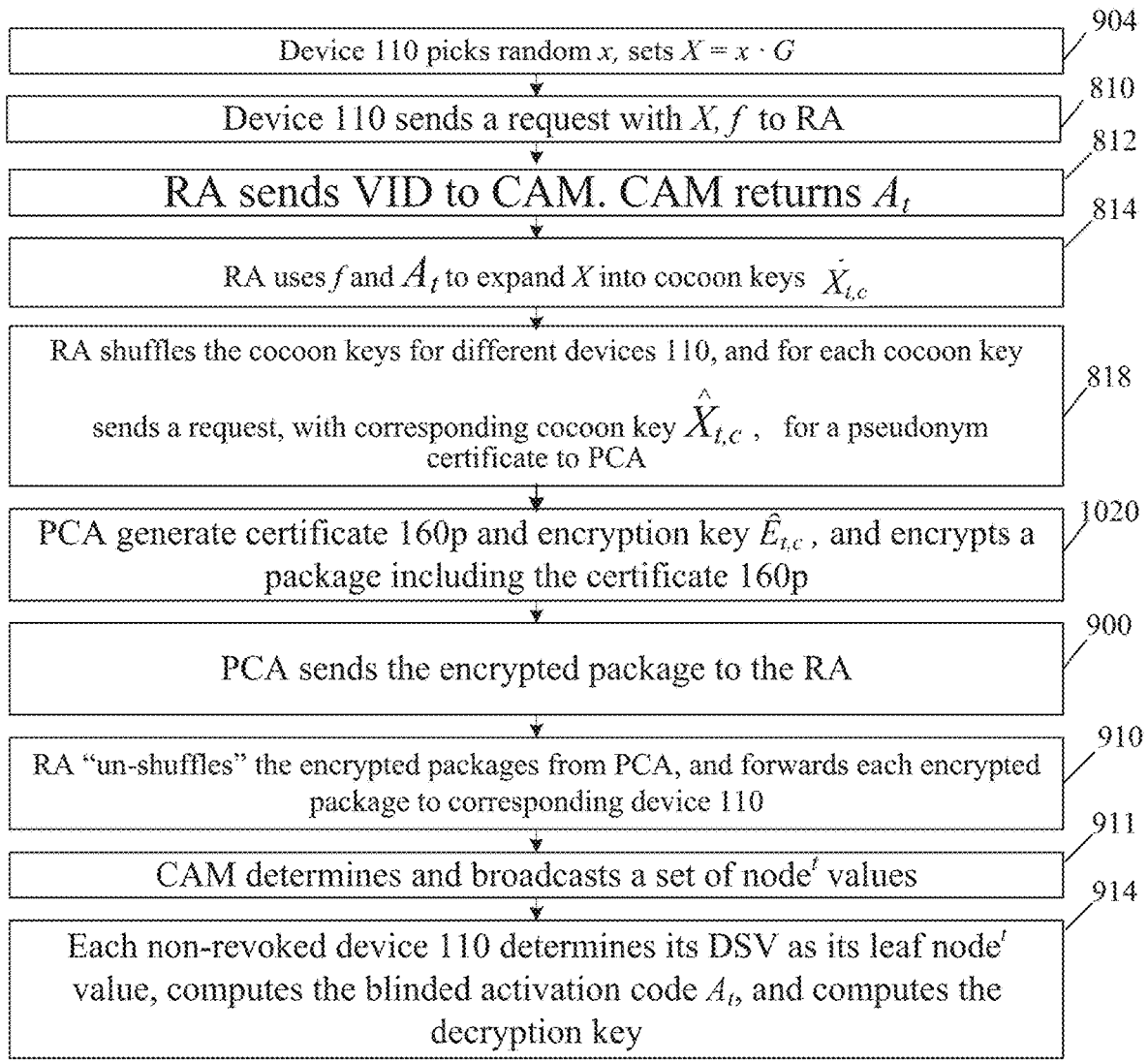

The binary hash trees 840 generated by CAM 838 are employed in the pseudonym certificate issuance process. One example is shown in FIGS. 14A and 14B. In FIG. 14A, the circled numbers 1 through 7 show the sequence of steps.

Steps 904, 810 are as in FIG. 10A-B or 11A-B; circled number 1 corresponds to step 810. Specifically, when a vehicle 110 (or other entity) with a given VID requests a batch of pseudonym certificates from the RA, the vehicle (through its device 110) provides the values (X, $f$) to the RA. Without loss of generality, we assume that the vehicle is requesting a batch of β=τ*σ certificates total, consisting of σ certificates for each of the τ time-periods (each time-period corresponds to a validity period 165).

Upon reception of the vehicle's request (step 812, corresponding to circled numbers 2, 3, 4), for each time-period, the RA sends the vehicle's VID and to the CAM, requesting the CAM to provide a blinded activation code A, for each time-period t from 0 to τ−1, inclusive. The CAM calculates (circled number 3) and returns (circled number 4) the blinded activation codes $A_t$ as follows:

$$A_t = f_a(code_{t,VID}, t, VID) \cdot G \quad \text{(Eq. 27)}$$

This blinded activation code, when viewed as a public key component, corresponds to the following private key component:

$$a_t = f_a(code_{t,VID}, t, VID) \quad \text{(Eq. 27')}$$

This operation uses a pseudorandom function $f_a$, which could be instantiated, for example, using a NIST-approved PRF construction and $code_{t,VID}$ as secret seed. As a result, $f_a$'s output is unpredictable because the activation tree's leaf $code_{t,VID}$ has not yet been disclosed by the CAM. The CAM also blinds this value by multiplication by the elliptic curve generator G, so this value cannot be learned by the RA from the CAM's response. In some embodiments, even though it may be assumed for simplicity that a single CAM participates in the generation of certificate batches, in practice multiple CAMs could be contacted by the RA during this process, thus improving the system's resilience against the possibility of a CAM being compromised.

At step 814 (circled number 5), the RA performs the butterfly key expansion, generating cocoon keys. This process is similar to eSCMS, with one important difference: the blinded codes $A_t$ are incorporated into the cocoon keys. More precisely, let $\hat{X}_{t,c}$ denote the c-th public cocoon key for the time-period t. This key is computed by the RA as:

$$\hat{X}_{t,c} = X + A_t + f(t \cdot \sigma + c) \cdot G \quad \text{(Eq. 28)}$$

for each 0≤c<σ and 0≤t<τ. This public key corresponds to the following private key:

$$\hat{x}_{t,c} = x + a_t + f(t \cdot \sigma + c) \quad \text{(Eq. 28')}$$

By using the pseudorandom function $f$ in the computation of cocoon keys $\hat{X}_{t,c}$, the RA ensures that they cannot be later correlated by the CAM or by the PCA, even for groups of keys computed using the same $A_t$. Therefore, this process preserves the unlinkability of pseudonym certificate requests, whether or not CAM and PCA collude.

At step 818 (circled number 6), as in the case of FIG. 10A-B or 11A-B, for each cocoon key $\hat{X}_{t,c}$, the RA generates an RA request, assigns to the request a unique request ID ("RA request ID"), and creates a data structure ("RA request data structure") containing the RA request ID, the cocoon key indices t and c, and the associated device request. The RA requests are shuffled together, the shuffling process is expected to include cocoon keys from different vehicles. The RA request is sent to the PCA with the RA request ID. Also sent with the request are metadata, e.g., the certificate's validity period 165 and the linkage value (lv) 234. The device ID is not provided to the PCA, so the PCA cannot associate the RA request with the device. Also, the PCA cannot determine whether different RA requests are associated with the same or different devices.

The PCA processing of each request can be as in FIG. 10A-B or 11A-B (steps 822-830), and is generally shown as step 1020 (circled number 7) in FIGS. 14A-B. The index i in FIGS. 10A-B and 11A-B corresponds to the pair (t,c) in FIGS. 14A-B.

More particularly, at step 1020, the PCA computes the public cocoon encryption key $\hat{E}_{t,c}$ as in equation (Eq. 13) or (Eq. 13'). Equation (Eq. 13) provides:

$$\hat{E}_{t,c} = \hat{X}_{t,c} \quad \text{(Eq. 13AC)}$$

Equation (19') provides:

$$\hat{E}_{t,c} = \text{Hash}(\hat{X}_{t,c}) \cdot G + \hat{X}_{t,c} \quad \text{(Eq. 13AC')}$$

The PCA also computes the vehicle's (implicit or explicit) pseudonym certificate, as at steps 822, 826 in FIGS. 10A-B, 11A-B.

The resulting certificates are concatenated with appropriate values ($r_i$ or $sig_i$ in FIG. 10A-B or 11A-B, where the index i corresponds to the (t,c) pair) to form a package which is then encrypted with $\hat{E}_{t,c}$ (step 830) before being sent back to the RA at step 900. The RA, in turn, un-shuffles the packages and relays them to the corresponding vehicle, without contacting the CAM again (step 910), as in FIG. 10A-B or 11A-B.

Since the PCA processing (steps 1020, 900) and subsequent RA processing (step 910) are identical to eSCMS, the processing costs and bandwidth usage at the PCA remain unchanged. In addition, the underlying security properties of eSCMS still apply, including the protection against MitM attacks performed by the RA.

As a result of this process, the certificate encrypted by $\hat{E}_{t,c}$ can only be decrypted if the vehicle also obtains the corresponding DSV=$code_{t,c}$. After all, in the case of equation (Eq. 13AC'), the decryption key is now computed as:

$$\hat{e}_{t,c} = \text{Hash}(\hat{X}_{t,c}) + \hat{x}_{t,c} \quad \text{(Eq. 29')}$$

where $\hat{x}_{t,c}$ is defined given by equation (Eq. 28').
so

In the case of equation (Eq. 13), the decryption key is:

$$\hat{e}_{t,c} = \hat{x}_{t,c} \quad \text{(Eq. 29)}$$

Moreover, for unified butterfly keys, the key $\hat{X}_{t,c}$ received by the PCA depends on $code_{t,VID}$, and so does the private signature key $u_{t,c}$ whether it is computed in the explicit or implicit model. More precisely, for explicit certificates we have, if the processing is as in equation (Eq. 12):

$$u_{t,c} = x + f_a(code_{t,VID}, t, \text{VID}) + f(t^*\sigma + c) + r_{t,c}$$

where $r_{t,c}$ is generated by the PCA at step such as 822 (FIGS. 10A-B) and sent (encrypted) to the vehicle at step 900.

If the processing is as in equation (Eq. 12'), then:

$$u_{t,c} = r_{t,c}(x + f_a(code_{t,VID}, t, \text{VID}) + f(t^*\sigma + c))$$

For implicit certificates, the private key is $$u_{t,c} = h_{t,c}(x + f_a(code_{t,VID}, t, \text{VID}) + f(t^*\sigma + c)) + sig_{t,c}$$

Therefore, to keep a vehicle with an identifier $VID_r$ from activating its certificates, it suffices to prevent the vehicle from obtaining its DSV=$code_{t,VID_r}$. In that case, the CRL entries for that vehicle's certificates do not need to remain in CRLs any longer than one or a few activation periods.

Distributing or Broadcasting Activation Codes

If the hardware security module (HSM) of revoked vehicles can be trusted, the CAM can broadcast a "soft revocation list" containing the IDs of revoked vehicles. Complying HSMs might then refuse to derive the decryption key for its certificates, even though the corresponding activation codes are released by the CAM. Nevertheless, assuming HSMs may be tampered with, the CAM would need to resort to a hard revocation approach. In this case, to ensure the distribution of activation codes for all non-revoked vehicles, while preventing all revoked nodes from obtaining theirs, the CAM leverages one essential property of binary hash trees: except for the root, any node can be computed if and only if its parent is known. Hence, if there is no revoked vehicle in a given activation period t, the CAM can disclose the activation tree's root $node_t$ (0,0). As a result, all vehicles would be able to decrypt their own certificates. Conversely, to revoke a vehicle whose identifier is $vid_r$, the disclosed activation tree should not include any ancestor of $code_{t,vidr}$. This is illustrated in FIG. 13, where the revocation of $vid_r=5$ (associated with leaf $node_t$ (3,5), marked with dashed lines) leads to the disclosure of shaded nodes $node_t$ (1,0), $node_t$ (2,3), and $node_t$ (3,4). The omission of all nodes going from revoked leaves and the root should be enforced for any activation period t after the revocation occurs, or until that vehicle is reinstated.

Since the released nodes consist of strictly public information, any channel that would be used for distributing CRLs can be employed for their distribution. For example, the CAM can use an actual broadcast channel (e.g., satellite-based), if available; in this case, vehicles would not need bidirectional communication with the system. Another possibility is to simply upload those activation codes to cache units (e.g., websites), from which they can be downloaded by any device. For example, users may download activation codes overnight using their mobile phones, and then transfer those codes via a local connection (e.g., Bluetooth) to their own vehicles. Also, vehicles and roadside units could also serve as caching units, so they can share the activation tree (e.g., via peer-to-peer protocols), following a vehicle-as-a-resource approach.

As shown in FIG. 14B at step 911, sometime before each validity period t (period 165), CAM 838 determines the leaf node indices (depth,count) of the valid vehicles (or other devices), and determines a minimal set of node indices (depth,count) from which the leaf node values (DSVs) can be computed for the valid vehicles via equations (Eq. 25) and (Eq. 26) but not by any revoked vehicle. The minimal set can be determined as in BCAM for example, each node index in the minimal set is a root of a subtree whose leaves correspond to only "honest" (valid) vehicles.

The CAM then distributes the $node_t$ (depth,count) values of the minimal set from the tree 840 corresponding to the relevant period t. These values can be distributed to only the non-revoked vehicles, or can be broadcast to all vehicles; there is no need for bidirectional connectivity between vehicles and CAMs. Each $node_t$ value is accompanied by its t and (depth,count) parameters. These values can be provided to an intermediate system (not shown) for caching; each vehicle can obtain these values from the intermediate system at a time convenient for the vehicle. [001%] As is clear from the above, the tree's nodes of the minimal set depend on which nodes are currently revoked/suspended, taking into account that every node of binary hash trees can be computed from its parent. For example, given the root of the tree, all of its leaves can be computed and, thus, all vehicles can obtain their corresponding activation codes. Hence, if no vehicle is revoked in time-period t, the CAM only needs to broadcast $node_t$ (0,0) to allow all certificates in the system to be activated. This leads to optimal performance when distributing activation codes.

When a vehicle needs to be revoked, however, the CAM does not reveal any of the nodes in the path between the corresponding leaf and the tree's root. This prevents the computation of that leaf by any device, including a non-revoked vehicle that might try to collude with a revoked device to allow the activation of the latter's certificates. For example, consider the tree shown in FIG. 13. To revoke the vehicle whose VID is 4, the CAM would have to broadcast only the following nodes: node (1,0), which enables the computation of leaves nodes (3,0) through (3,3); node (2,3), used to compute leaves node (3,6) and node (3,7); and the leaf node (3,5). More generally, and as mentioned in Kumar et al., when $n_r$ users out of $n_t$ are revoked the number of nodes included in the message broadcast by the CAM is on average $n_r \cdot \lg(n_t/n_r)$ for $1 \leq n_r \leq n_t/2$ (cf. Theorem 1 of W. Aiello, S. Lodha, and R. Ostrovsky, "Fast digital identity revocation (extended abstract)," in Proc. of the 18th Annual International Cryptology Conference on Advances in Cryptology (CRYPTO'98). London, UK, UK: Springer-Verlag, 1998, pp. 137-152), incorporated herein by reference. Hence, albeit more expensive than the scenario in which no revocation occurs, this approach is still more efficient than the individual delivery of each activation code. Actually, there are also efficient methods for encoding binary hash trees such as those hereby described, so the index of each node included in the broadcast message can be represented with less than |VID| bits, saving some bandwidth.

At step 914, each non-revoked device 110 computes its leaf value $code_{t,VID}$ (the DSV) from the values distributed by the CAM at step 911. This computation can be done according to equations (Eq. 25) and (Eq. 26).

Also at step 914, each non-revoked device 110 determines, for each encrypted certificate 160$p$, the decryption key per equations (Eq. 29) or (Eq. 29'). The device uses the decryption key to decrypt the certificate.

The remaining steps can be as in eSCMS, including the verification of the PCA signature formed at step 826, and determining the device's signature key $u_{t,c}$.

Security of the Certificate Issuance Process

In ACPC (embodiments of which are shown in FIGS. 14A-B), collusion between CAM and PCA (respectively RA) reveals as much information as the PCA (respectively RA) had available in eSCMS. Indeed, if we remove the influence of $A_t$ over the public cocoon keys computed as described in FIGS. 14A-B, the result matches the public cocoon keys in eSCMS. Therefore, a collusion with the CAM can only remove the entropy introduced by this entity, while still preserving eSCMS' security properties.

In particular, a vehicle's caterpillar private key x remains protected by the elliptic curve discrete logarithm problem (ECDLP) during the whole execution of the protocol. Hence, the RA, PCA and CAM are unable to recover the signature or decryption private keys derived from it, even if they collude. Unlinkability among certificates is similarly preserved, as long as the RA and PCA do not collude: the shuffling done by the RA still hides from the PCA any relationship between certificate requests intended for the same vehicle; meanwhile, the PCA's encrypted response prevents anyone but the appropriate vehicle from learning $cert_i$. Finally, since the (unified) butterfly key expansion process grants vehicles the ability to verify whether or not the received certificates were generated in a fair manner, MitM attacks (e.g., by the RA) are averted.

The aforementioned CAM's inability to create a new threat via collusion is not just a fortunate coincidence. Actually, the (unblinded) activation codes $code_{t,VID}$ are the only information that is initially kept secret by the CAM and, thus, that could be contributed in such collusion. Since those codes are periodically disclosed to allow vehicles to activate their certificates, though, such public disclosure should not negatively impact the system's security. Consequently, a "private disclosure" during a collusion is expected to have an analogous result.

Security of the Revocation Procedure

The security features discussed below do not limit the invention. The invention may cover embodiments that do not possess such features.

In some embodiments, the security of ACPC's revocation procedure relies on the first pre-image resistance of the hash function employed for the construction of activation trees 840, as well as the proper disclosure of its nodes by the CAM. In principle, this means that the choice of a secure hash function is enough to enforce revocation. At least this should be the case if it is assumed that the system's entities would gain nothing by illegitimately un-revoking vehicles, i.e., without authorization from the MA. Nonetheless, it is useful to evaluate what happens when one of the system's entities is compromised and, as a result, its capabilities are misused aiming to allow the activation of revoked devices.

On the one hand, a rogue/compromised CAM could disclose the roots of every activation tree to all vehicles, even revoked ones, allowing all certificates in the system to be activated. This would not give the attacker any advantage over the system, though, besides disrupting its ability to revoke devices efficiently. In particular, in consonance with the discussion in the preceding section, this would not grant the CAM or any other entity the ability to track devices. Consequently, it is unlikely that the CAM itself would go rogue and engage in such malicious activity. Furthermore, if the CAM's storage is somehow compromised, the leakage of codes can still be contained by keeping the revoked vehicles' data in CRLs, just like in the original SCMS or eSCMS. Hence, the attack would not result in any catastrophic security breach, but only nullify the performance gains provided by activation codes.

On the other hand, a security breach at the RA or PCA should not reveal any information about activation codes. The reason is that these entities never learn such codes, which are only known by the CAM. Nevertheless, if any of these entities go rogue or are compromised at a level that allows its behavior to be controlled by attackers, it can provide valid certificates to revoked vehicles independently of activation codes. Specifically, a dishonest PCA can always issue new pseudonym certificates for vehicles, including revoked ones, at least until the PCA itself is revoked. A compromised RA could act similarly, e.g., by requesting pseudonym certificates for a non-revoked $VID_d$, and then delivering those certificates to a revoked vehicle whose identifier is $VID_r \neq VID_d$. Such misbehavior is likely to go unnoticed because the certificates do not carry any VID on them. In addition, if $VID_d$ corresponds to a valid vehicle whose pseudonym certificates have not been requested yet, the CAM would not be able to notice the fraud by the RA. Actually, even if $VID_d$ has already been requested in the past, trying to prevent such attack by configuring the CAM to refuse a second request for the same $VID_d$ is likely to create management issues. For example, the processing of the initial request for $VID_d$ may naturally fail, so an honest RA would actually need to send a second request referring to the same $VID_d$. As another example, a dishonest RA might abuse this process by performing a "denial-of-certification" attack: the RA queries the CAM requesting the caterpillar keys for a non-revoked $VID_d$, but it does not execute the pseudonym certificate issuance process; future requests referring to $VID_d$, potentially by honest RAs, would then fail.

These observations indicate that, even if a rogue RA or PCA never gains access to activation codes, their roles in the system still enable them to provide valid certificates for revoked vehicles. Actually, a similar discussion also applies to the original BCAM protocol, in which a rogue RA or PCA could provision revoked vehicles with the PCA-encrypted certificates, before they are once again encrypted by the CAM. Nevertheless, ACPC's approach of ensuring that only the CAM is able to distribute activation codes was adopted because, even though this does not actually prevent such threats, it does reduce the system's attack surface. For example, suppose that RA and/or PCA store the (PCA-encrypted) certificates generated for the purposes of disaster recovery. In this case, a data breach disclosing the certificates issued for a vehicle that is now revoked does not create any security concern, since that vehicle remains unable to decrypt those certificates. To compensate this inability of using those certificates for disaster recovery for non-revoked devices, RA and PCA could then issue new pseudonym certificates, possibly revoking the old ones.

In some embodiments, the activation codes are available to the RA or PCA or both. For example, the blinded activation codes $A_t$ and corresponding $a_t$ may be computed by the RA from the activation codes.

In some embodiments, the trees 840 are not used; the CAM distributes the leaf node values or the $a_t$ values for example.

In some embodiments, vehicles may be equipped with a hardware security module (HSM), which might be deactivated via a "soft-revocation" mechanism. Instead of asking the CAM to omit nodes from the binary tree, the Misbehavior Authority could periodically issue a soft-revocation list (SRL) containing identifiers of revoked vehicles; as a result, the HSMs of vehicles listed in the SRL are expected to simply refuse to compute the decryption keys for the corresponding certificates. To enable this feature, the HSM may export a CAM-encrypted symmetric key k, which is included in the vehicle's request for pseudonym certificates. Then, the CAM can ensure that the HSM is the only entity capable of decrypting certificates by computing the blinded activation values as $f_a$ (k $code_{t,VID}$, t, VID)·G. The advantage of this approach is that it potentially leads to smaller messages broadcast by CAMs. After all, the (hard) revocation of vehicles forces the CAM to disclose multiple nodes of the revocation tree, rather than only its root. If, however, those vehicles are known to be soft-revoked due to a compliant HSM, the activation tree's root can be disclosed without negative impacts to the system's security.

Comparison with Other Approaches: IFAL and BCAM

When compared to IFAL, ACPC (FIGS. 14A-B) differs in at least two aspects. First, IFAL allows an "honest but curious" PCA to link several certificates to the same device; this privacy issue is absent in the solution hereby described if it is assumed, like in the original SCMS, that PCA and RA do not collude. Second, ACPC allows vehicles to obtain activation much more efficiently than IFAL's strategy, using binary hash trees to broadcast activation codes rather than requiring vehicles to individually request them.

Architecturally, ACPC shares similarities with BCAM, in particular, because both BCAM and ACPC use binary hash trees for the distribution of activation codes. Nevertheless, by integrating security strings into the activation trees, the nodes of those trees can be 128-bit long while still preserving a 128-bit security level, despite the number of revoked devices. When compared to BCAM, which uses 256-bit nodes, ACPC represents a 50% bandwidth gain for the distribution of activation trees.

In terms of processing, in some embodiments, the ACPC design leads to costs slightly higher than those obtained with BCAM. This happens because the symmetric encryption at the CAM and subsequent decryption at vehicles are replaced by the computation of one elliptic curve point, $A_t$, for each activation period. However, this saves bandwidth between the RA and the CAM, because these entities only exchange data that represent nodes from activation trees, rather than batches of certificates. Even more importantly, the fact that the CAM does not receive certificates from the RA prevents the former from learning which PCA encrypted certificates belong to the same device. In addition, it also reduces the attack surface by a rogue RA or PCA. Hence, the ACPC is able to protect the vehicle's privacy even if PCA and CAM collude or are compromised.

The ACPC solution provides an approach for issuing pseudonym certificates and distributing activation codes for previously issued pseudonym certificates, efficiently preventing revoked devices from using those certificates. When compared to other techniques, it brings advantages in terms of security and efficiency. Namely, it reduces the sizes of CRLs, such as those employed in solutions such as SCMS and eSCMS. It also reduces computational costs, especially in terms of bandwidth usage, when compared with solutions such as BCAM. Finally, it avoids the creation of points of collusion, so it is not possible for the PCA alone to violate the users' privacy (unlike IFAL), nor for the PCA and CAM to collude for this purpose (unlike BCAM). The solution is also suitable for non-pseudonym certificates.

Integrating Activation Codes into Other Certificate Issuing Process

Similar activation techniques can be used with SCMS (FIGS. 7, 8). For example, the RA may compute $A_t$ and $\hat{X}_{t,c}$ as described above for eSCMS, and determine the encryption key $\hat{E}_{t,c} = \hat{E}_i$ per equation (Eq. 13AC) or (Eq. 13AC'). The steps 822 through 900 can be as in FIG. 7 or 8. The activation can be as in FIG. 14B at steps 911-914.

Unicast Versus Broadcast Distribution of Activation Codes

In conventional ACPC, activation codes (ACs) for non-revoked EEs or vehicles are broadcast by the Certificate Access Manager (CAM), and then cached and redistributed by any interested device (e.g., vehicles, user's mobile phones, etc.). Indeed, the adoption of a binary hash tree as the underlying data structure is intended to facilitate the delivery of ACs via broadcast. In this scheme, instead of sending every individual AC to non-revoked EEs or vehicles, the ancestor nodes of those ACs are included in the broadcast message. In the case that no EE or vehicle is revoked in the system, broadcasting the root of the activation tree would enable all EEs or vehicles to compute their respective ACs. Hence, this approach not only saves bandwidth but also storage space on caching units. Besides, since all EEs would receive every release node from the broadcast channel, the process of obtaining ACs does not leak any privacy. In particular, an eavesdropper cannot learn an EE's VID by simply observing the release nodes from the activation tree. Finally, if a broadcast medium (e.g., radio or satellite-based) is available, EEs or vehicles would not require bidirectional connectivity with the system for getting ACs, potentially reducing the communication equipment costs.

Although the distribution of ACs can benefit from a broadcast model, solely relying on this approach may not be ideal. One reason is that some real-world deployments may not have a dedicated broadcast channel available, in which case unicast- or multicast-oriented channels may need to be used (e.g., a mobile network connected to the Internet).

Furthermore, one aspect of using binary hash trees for revocation is that the amount of data broadcast may grow with the number of revoked devices. More specifically, suppose that the activation tree supports N EEs or vehicles, out of which $n_r$ are revoked, then for $1 \leq n_r \leq N/2$, the broadcast message would include up to $n_r \cdot \lg(N/n_r)$ nodes of the tree. For a tree with relatively small depth, e.g., d=5, the broadcast messages are expected to grow until $n_r$ approaches N/2, and then decrease in size. However, since realistic scenarios are unlikely to display such a large percentage of misbehaving EEs under normal circumstances, the growth reversion is not expected to be observed in practice.

Handling this increased number of ACs can be challenging if the activation trees are broadcast periodically (aiming to facilitate the EE's access to their ACs and reduce dependency on caching units), rather than just once before the start of an activation period. In that case, handling the extra revocations would require the system to decide between (1) allocation of extra bandwidth for broadcasting additional nodes over time, thus keeping a constant transmission rate, and (2) reducing the rate in which ACs are periodically transmitted for maintaining the bandwidth constant. Unfortunately, the first approach may lead to an increased cost for maintaining the service over time, while the second approach may increase the delay in the distribution of ACs.

Therefore, according to some embodiments, a unicast mode may be used for the distribution of ACs. In particular, in some embodiments, the system itself may include the provisioning of ACs as a service, following in either a request-response approach (e.g., as in HTTP) or the publish-subscribe model (e.g., as in MQTT). This would lead to guaranteed delivery of ACs (even without caching) and higher service availability when the EEs or vehicles are on-line and can request their ACs directly, without waiting for the next broadcast retransmission. In such a scenario, it would be inefficient to send the entire activation tree to the requester (as it is interested in its own ACs rather than the entire tree). Conversely, to identify which AC it actually needs, an EE would have to reveal its VID in each individual AC request, potentially creating privacy issues.

Although revealing the VID alone may not be critical from a privacy perspective, VID in conjunction with sensitive metadata can lead to privacy loss. For instance, the back-end system (e.g., implemented at the CAM or otherwise) receiving AC requests would be able to match such identifiers with any other sensitive metadata gathered through other means (e.g., requesters' geolocation). Therefore, the privacy properties of the system would be periodically put at risk as part of the certificate activation procedure.

uACPC: Privacy-Preserving ACPC in Unicast Mode

A privacy-preserving AC distribution scheme preferably would prevent both attackers (e.g., eavesdroppers) and system authorities from simultaneously learning the EE's or vehicle's position and identifiers to avoid tracking. ACPC's usage of the broadcast channel innately provides this property. In contrast, an authenticated unicast channel would allow the SCMS components to determine a vehicle's or EE's identifier (VID) from the request itself. Instead of relying on a location obscurer proxy (LOP) to hide locations or having an EE requesting ACs for multiple VIDs (to hide its own identity), according to some embodiments, the uACPC of the present disclosure, dissociates the ACPC tree leaves from VIDs. More precisely, in some embodiments, EEs or vehicles are provisioned with one or more (pseudo) random VIDs or pseudonym identifiers. As a result, VIDs themselves become pseudonyms, i.e., they are not easily linkable to any given EE or vehicle. Each pseudonym identifier may be active for a corresponding activation period, and can be used to request ACs for the respective EE during that activation period. Upon request, ACs may be delivered to vehicles or EEs via unicast. As long as the entity responsible for assigning VIDs to EEs (i.e., the RA) does not directly participate in the unicast delivery of ACs, this uACPC approach enables a privacy-preserving activation of the pseudonym certificates.

Requirements and Attacker Model

In some embodiments, the uACPC approach may address one or more requirements in various areas including, for example, security, privacy, efficiency, and flexibility.

Security requirements (SR): In some embodiments, vehicles or EEs should sign their messages in such a manner that other EEs can:
- SR1: check the messages' authenticity;
- SR2: verify that they were generated by authorized entities;
- SR3: limit an EE's capability of engaging in Sybil attacks.

Such requirements are inherited from SCMS itself and are addressed similarly: by provisioning EEs with pseudonym certificates signed by trusted authorities (namely, PCAs), but limiting the number of simultaneously valid certificates.

Privacy requirements (PR): The privacy of each vehicle or EE preferably should be protected from eavesdroppers and system entities at all times, or at least as long as it does not misbehave, aiming to prevent tracking. This means that an EE's long-term identity should not be linked to its location during the following procedures:
- PR1: provisioning of (encrypted) pseudonym certificates;
- PR2: acquisition of ACs for decrypting those certificates;
- PR3: usage of pseudonym certificates on the field;
- PR4: in the case of misbehavior, however, authorities should be able to identify the owner of the corresponding pseudonym certificate.

As an extension to SCMS, the original ACPC already handles PR1, since a LOP is employed to hide the requesting EE's location; PR3, since the pseudonym certificates generated are unlinkable to their owners or to each other, assuming a suitable strategy for changing the pseudonyms employed in the field; and PR4, since the unlinkability property can be nullified via the cooperation among system authorities. PR2, on the other hand, is only fully satisfied if the distribution of ACs is done via broadcast, for hiding the vehicle's or EE's VID, or via unicast with a LOP, to hide the EE's location. The systems and methods described herein inherit such properties but also fulfill PR2 when ACs are distributed via any unicast/multicast channel, without relying on additional entities (e.g., LOPs).

Efficiency requirements (ER): The systems and methods should preferably minimize the computation effort on the EE's side, considering its limited processing, bandwidth, and storage capabilities. This requirement is somewhat fulfilled or met by the SCMS+ACPC butterfly key expansion with activating codes. Those solutions, in some embodiments, put most of the workload in the back-end instead of the EEs.

Flexibility requirements (FR): Support for explicit and implicit certificates; distribution of ACs via broadcast and unicast; support for caching of ACs; capability of handling intermittent EE connectivity to the system's services. This requirement can be fulfilled by the systems and methods of the present disclosure, in some embodiments, because they include unicast support, thereby adding more flexibility to the original SCMS+ACPC setup.

For purposes of an attacker model, in some embodiments, it is assumed that the back-end system entities do not collude and/or abuse their own capabilities. For example, RAs and PCAs do not request/issue pseudonym certificates for already revoked EEs, and CAMs do not covertly disclose ACs for decrypting revoked certificates. However, any system entity may try to subvert the protocols aiming to gain some capability it should not have, such as tracking vehicles. Note that this is the same attacker model adopted in SCMS and ACPC.

uACPC Protocol

Figure 15:
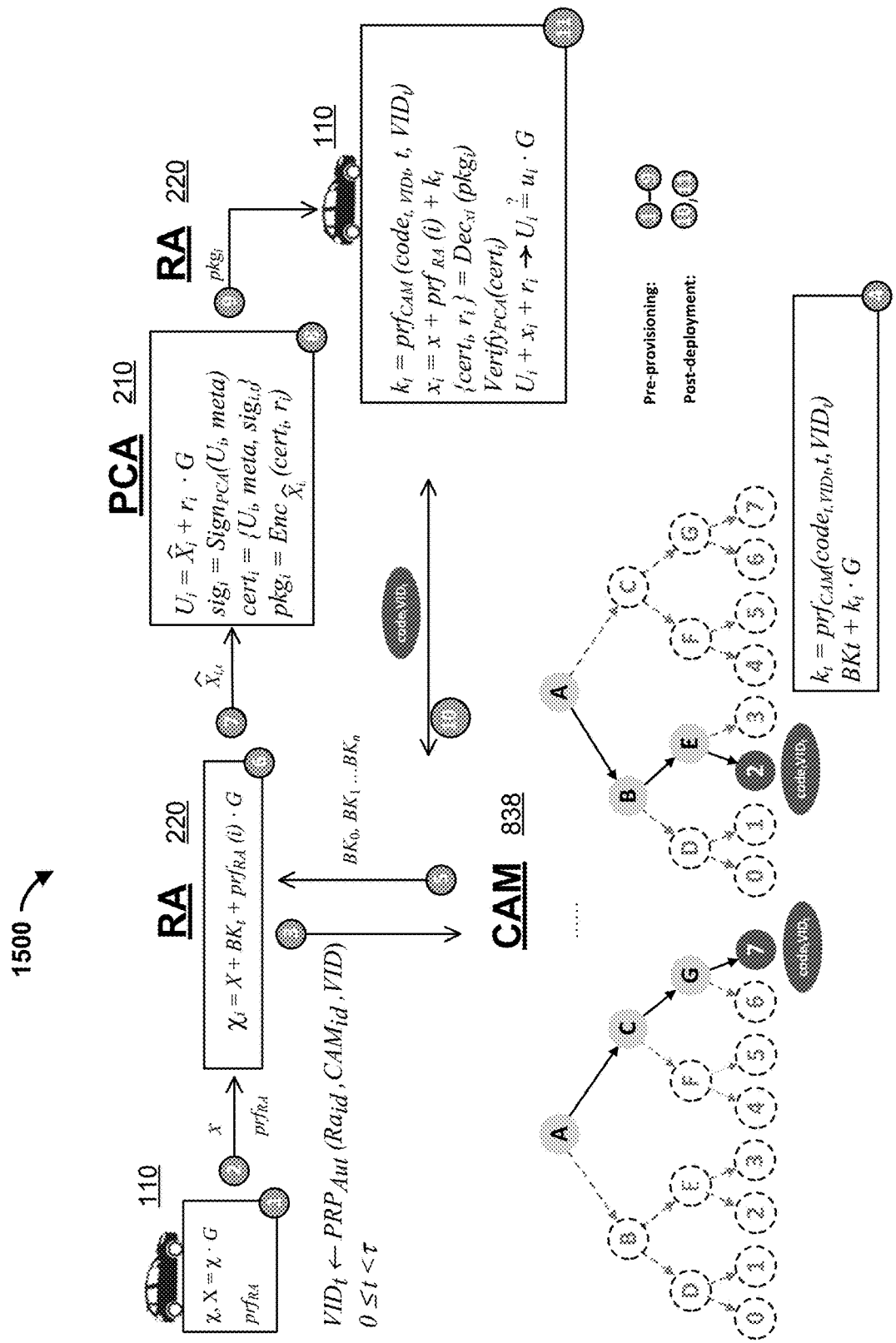
FIG. 15 illustrates a unicast ACPC (uACPC) protocol, according to some embodiments.

According to some embodiments, systems and methods are provided to implement a protocol for uACPC. FIG. 15 shows an example implementation 1500 of the uACPC protocol, according to some embodiments. Aspects of the uACPC protocol that differ from ACPC are discussed.

In one aspect, under the uACPC protocol, when requesting blinded ACs from the CAM, the RA does not use a fixed VID that matches a vehicle's or EE's long-term identifier. Instead, at a Process 3, one or more pseudorandom VIDs are generated or computed, for example, by the RA. In some embodiments, each pseudorandom VID may comprise a short-term identity $VID_t$ (or pseudonym identifier) for each activation period t to be covered by the pseudonym certificate batch. The RA then shuffles VID from different EEs and sends individual requests to the CAM for requesting the corresponding blinded ACs. This shuffling prevents the CAM from associating the different $VID_t$ to the same EE, just like the PCA should not distinguish between pseudonym certificate requests belonging to the same or distinct EEs. Note that, when assigning a $VID_t$ to a given EE, the RA should ensure that the same $VID_t$ has not been previously assigned to any other EE in the same activation period t. Otherwise, two or more EEs would be associated with the same AC and, thus, revoking one of them would revoke all the others. To prevent such VID repetition, the RA can employ a pseudorandom permutation (PRP), denoted $PRP_{Auth}$, using the CAM's identifier $CAM_{id}$ and the vehicle's or EE's long-term VID as input. For example, in some embodiments, $PRP_{Auth}$ can be built or derived using the Luby-Rackoff construction with an approved pseudorandom function and a secret key known only by the RA itself, as explained in more detail in Luby et al., "How to Construct Pseudorandom Permutations from Pseudorandom Functions," SIAM Journal of Computers 17(2):373-386, April, 1988, and NIST, SP 800-108—Recommendation for Key Derivation Using Pseudorandom Functions. National Institute of Standards and Technology, Gaithersburg, MD, USA, October 2009, https://doi.org/10.6028/NIST.SP.800-108, both of which are incorporated by reference herein. This avoids the need of keeping a database mapping each long-term VID to the ephemeral $VID_t$ and still allows the RA to recover any $VID_t$ whenever required (e.g., if the corresponding vehicle or EE needs to be revoked).

In another aspect, under the uACPC protocol, at Process 4, one or more blinded ACs are generated or computed, for example, by the CAM. In particular, in some embodiments, the CAM generates a unique blinded AC, $BK_t$, for each received $VID_t$ and activation period t, instead of a set of them. As a result, the blinded ACs for the same vehicle or EE are likely to be computed from leaf nodes in different positions in each activation tree treet.

In still another aspect, under the uACPC protocol, at Process 9, the vehicle or EE is informed of its $VID_t$, for example, by the RA. The RA needs to provide the list containing the τ pseudonyms $VID_t$ to the EE. In some embodiments, the RA bundles this information together with all responses from the PCA in $pkg_i$. In addition, the RA may include in its response a set of τ anonymous authorization tickets or tokens (ATs) that enable the EE to request the corresponding ACs from a third party, as described further below.

In another aspect, under the uACPC protocol, at Process 11, the vehicle or EE decrypts its pseudonym certificates. Different from the original ACPC, here the EE computes its AC as $k_{VID_t,t} = \mathrm{prf}_{CAM}(\mathrm{node}(t, d, VID_t))$, using $VID_t$ instead of its long-term identifier VID.

This procedure achieves privacy-by-design by decoupling a vehicle's or EE's actual VID from the ephemeral, pseudonymous $VID_t$ associated with it. Consequently, a vehicle or EE can request ACs from the CAM without the risk of being tracked. Even if the vehicle's location is leaked as a result of this request, the CAM would be unable to associate the request with any given entity or even link multiple requests to the same entity. Such privacy properties hold as long as the request itself does not leak any information about VID, which should be the case when the channel used for this purpose is not client-side authenticated. However, if only authenticated EEs are allowed to request ACs (e.g., for billing purposes), additional care should be taken to hide the requester's VID from the CAM.

Anonymous Client-Side Authentication

In some uACPC deployments, according to some embodiments, the unicast distribution of ACs may be part of a service available only to authorized subscribers. This subscription-based approach can be complementary to a broadcast distribution, so service providers would be motivated to act as caching units for helping in the distribution of ACs. To preserve the privacy of the subscribers (each corresponding to a respective vehicle or EE) in this scenario, a privacy-preserving client-side authentication mechanism can be used. Otherwise, the service provider could link some subscriber's long-term identity to the location where the request for an AC originated, thereby compromising the subscriber's privacy.

Figure 16:
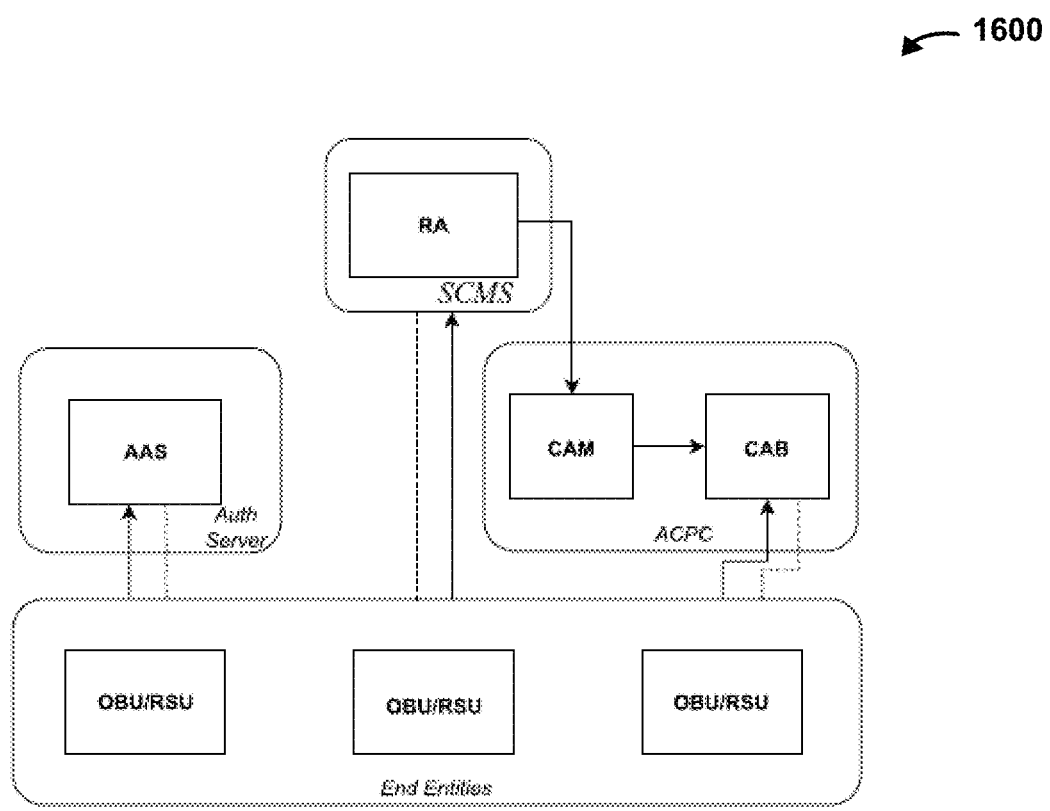
FIG. 16 illustrates an issuance process for uACPC's authentication tokens, according to some embodiments.

To avoid this issue, in some embodiments, systems and methods provide anonymous client-side authentication. That is, in some embodiments, if an EE needs n ACs for decrypting its batch of certificates, it is provisioned with n anonymous authorization tickets (ATs), signed by a trusted Anonymous Authentication Server (AAS). As a result, ACs can be obtained by EEs in such a manner that only the requested ephemeral pseudonym $VID_t$ is revealed. This scenario is illustrated in FIG. 16, which illustrates an issuance process 1600 for uACPC's authentication tokens, according to some embodiments. As shown in FIG. 16, three entities may play or serve in the AAS role—i.e., RA, CAM, or third party—represented by the dotted lines:

Registration Authority (RA): In some examples, the RA can create and deliver ATs as part of the pseudonym certificate provisioning procedure (namely, in Process 9 of FIG. 15). This may be the simplest approach for distributing ATs because: (1) vehicles or EEs already authenticate themselves toward the RA when requesting certificates, and (2) the RA already delivers the $VID_t$ associated with each vehicle or EE, so it is natural for the RA to create the number of ATs required for requesting the corresponding ACs. Thus, the RA remains as the sole entity that knows the link between each VID and the corresponding long-term VID.

Certificate Access Manager (CAM): In some examples, when the CAM delivers a blinded AC to the RA (Process 4 of FIG. 15), it can also include one suitable signed AT in its response. This is also a reasonably simple solution, given that the CAM can trust the EE authentication performed by the RA, so it does not learn the EE's actual VID. Therefore, such ATs can be used as anonymous authentication credentials toward the CAM even if this entity subsequently participates in the unicast delivery of ACs. In some embodiments, a Certificate Access Broadcast (CAB) service may be provided for distributing ACs and CRLs.

Third-Party (acting as AAS): It is also possible that some entity not directly involved in the pseudonym certificate provisioning procedure serves as the AAS to deliver ATs to EEs. A benefit of this approach is that such an entity can be generic enough to issue a variety of anonymous tickets for different services, some of which are not necessarily related to the delivery of ACs. However, it is reasonable to assume that some of such services will require the EE to contact the AAS directly, rather than via the RA. In this scenario, unlike the case where the CAM plays the role of AAS, the EE would be able to rely on neither the RA's indirect authentication nor its shuffling capabilities. Instead, the EE-AAS interaction should be such that (1) EEs authenticate themselves toward the AAS using their actual credentials, proving that they are allowed to request a given number of ATs, but (2) the AAS is prevented from later linking those ATs to the EE that originally requested them. An effective approach for accomplishing this goal is to use a (partially) blind signature, so the contents of the issued AT remains hidden from the AAS that signs it although the EE is fully authenticated.

In all cases, it is assumed that ATs do not need to specify their target $VID_t$, allowing EEs to use them to request any AC. This capability does not lead to any security issue: only ACs that are published can be obtained with an AT, i.e., requests for ACs associated with any revoked $VID_t$ are denied despite the validity of the enclosed AT.

Recovering Activation Paths from Revoked EEs

In the original ACPC, the CAM broadcasts the encoded activation tree to all vehicles or EEs so they can compute their ACs from the released node and the respective activation path. In particular, ACPC leverages the encoding/decoding algorithms from BCAM, which encodes the tree using non-revoked EEs as a basis. As a result, the EEs compute the activation tree structure to discover their respective activation paths and compute their ACs. Although the EEs only need to know their respective activation path in the tree, they decode the entire tree. Hence, this approach may lead to bandwidth and computation costs.

In contrast, uACPC of the present disclosure may be more suitable for unicast mode. Thus, in some embodiments, systems and methods are provided for computing activation paths using the revoked EE list and the respective leaf of interest. As a result, since each vehicle or EE is required to derive only the activation path necessary to compute its respective AC, the uACPC solution can save bandwidth and processing resources from vehicles or EEs.

To derive the activation path, the vehicles or EEs download the revoked EE list and discover the release nodes necessary to compute their respective ACs. FIG. 17 illustrates an algorithm 1700 to find or determine the release node needed by a vehicle or EE with identifier X, according to some embodiments. The input to algorithm 1700 includes the vehicle identifier $X \in VID_s$ and the list of revoked nodes RN. The output of algorithm 1700 is the released node of interest by X, rls. The released node of interest rls needs to be downloaded by the vehicle or EE in order to derive the AC based on the revocation list.

As an example, FIG. 18 depicts an application of the algorithm 1700 of FIG. 17. Referring to FIG. 17 and the example of FIG. 18, the revoked nodes r∈RN are identified by the following bitstrings: 000, 011, and 111. To find the released node required by the vehicle or EE with identifier X, e.g., X=001, the algorithm finds the revoked EE with the greatest or maximum number i of common prefix bits. In this case, revoked node 000 has two prefix bits in common with X=001, whereas revoked nodes 011 and 111 have one and zero, respectively. Therefore, the maximum number of common prefix bits between X (i.e., X=001) and each one of the revoked nodes (i.e., nodes 000, 011, and 111) is i=2. Lastly, by computing the i+1=2+1=3 (three) most significant bits of X, algorithm 1700 obtains the released node of interest by X, rls=001.

uACPC System Architecture Definition

In the anonymous authentication solution of the present disclosure, client authentication in the uACPC service infrastructure is anonymized to protect a vehicle's or EE's privacy when accessing different services. In particular, to prevent privacy leakage, each vehicle or EE may have multiple anonymous identities, e.g., anonymous authorization tickets (ATs). Additionally, in some embodiments, the anonymous authentication service can be combined with the pseudonym certificate approach of the uACPC to protect a vehicle's or EE's privacy over time. As a result, each vehicle or EE can use different identities for every service request to protect its privacy. For instance, any EE can use different identities for signing safety messages on the field, and a different one when requesting ACs. Therefore, tracking vehicles or EEs becomes harder once their identities change over time and when they access different services.

Since all vehicles or EEs may change their identities for every request, providing such anonymous identities becomes an on-demand service. Therefore, anonymous authentication can be an additional service in the system provided by the Anonymous Authentication Server (AAS). In some examples, anonymous authentication can be implemented as a micro service within the distributed system. The AAS must be able to verify the EEs' chain of trust upon receiving an authentication request. Anonymous identities, which are signed by the AAS, can be retroactively used to authenticate requests to the service itself. However, a bootstrap process is required to perform the EE's first-time authentication. Such a bootstrap process may rely on EE's chain of trust.

Figure 19:
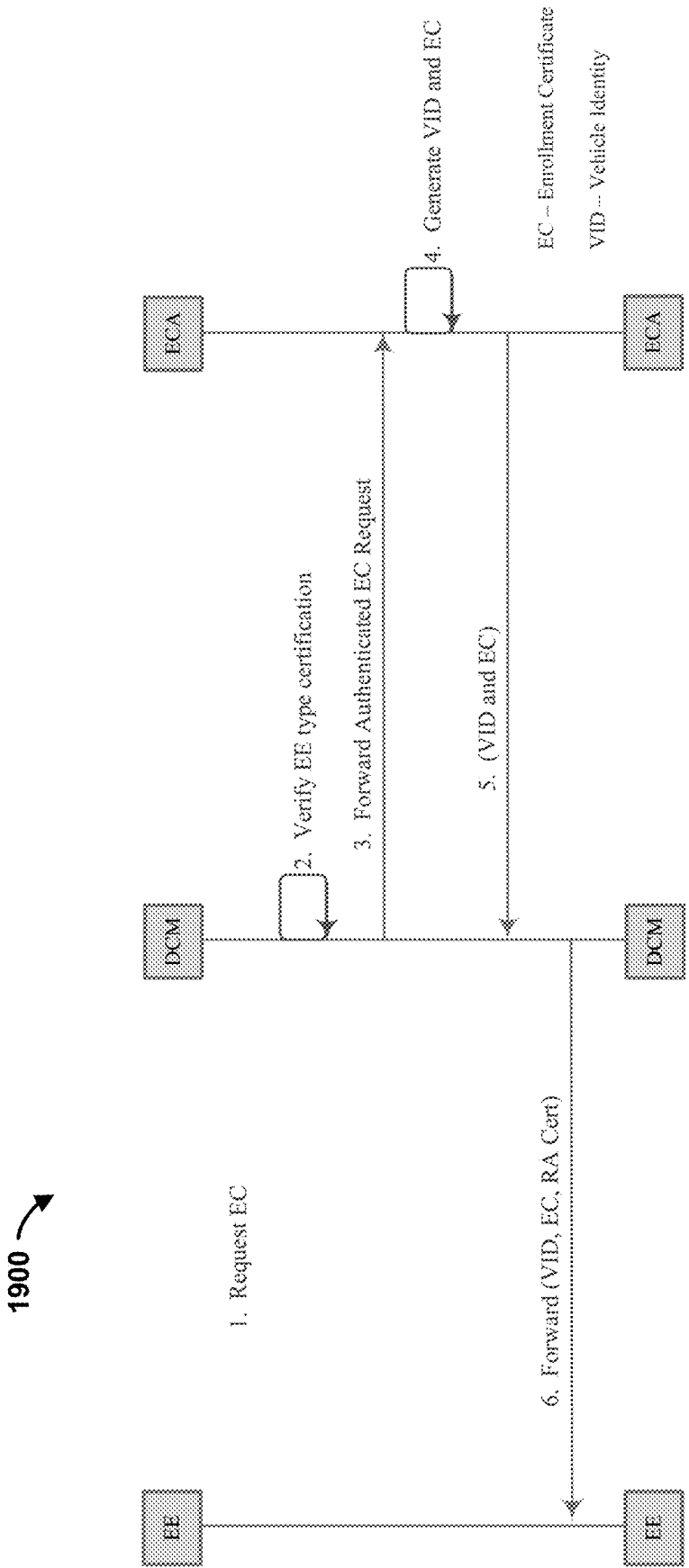
FIG. 19 illustrates an example enrollment phase, according to some embodiments.

In some embodiments, the first link in the EE's chain of trust can be the Enrollment Certificate (EC), which is issued by the Enrollment Certificate Authority (ECA) as part of the enrollment phase in the SCMS. FIG. 19 illustrates an example enrollment phase 1900, for SCMS with anonymous authentication, according to some embodiments. In FIG. 19, the numbers indicate the sequence of steps or processes for issuing an EC in some examples. Referring to FIG. 19, the EEs request their ECs through the Device Configuration Manager (DCM). The DCM may act as a proxy between the EEs and the ECA. After verifying the EE type certification, the DCM forwards the authenticated EC request to the ECA. In response, the ECA generates a VID for the EE and the EC, which are transmitted to the DCM. Furthermore, the DCM also appends the EE's VID and RA's public certificates to the ECA's response before forwarding it to the EE. In some embodiments, this provisioning can occur during the manufacturing process of the EE's device (onboard unit or roadside unit).

Figure 20:
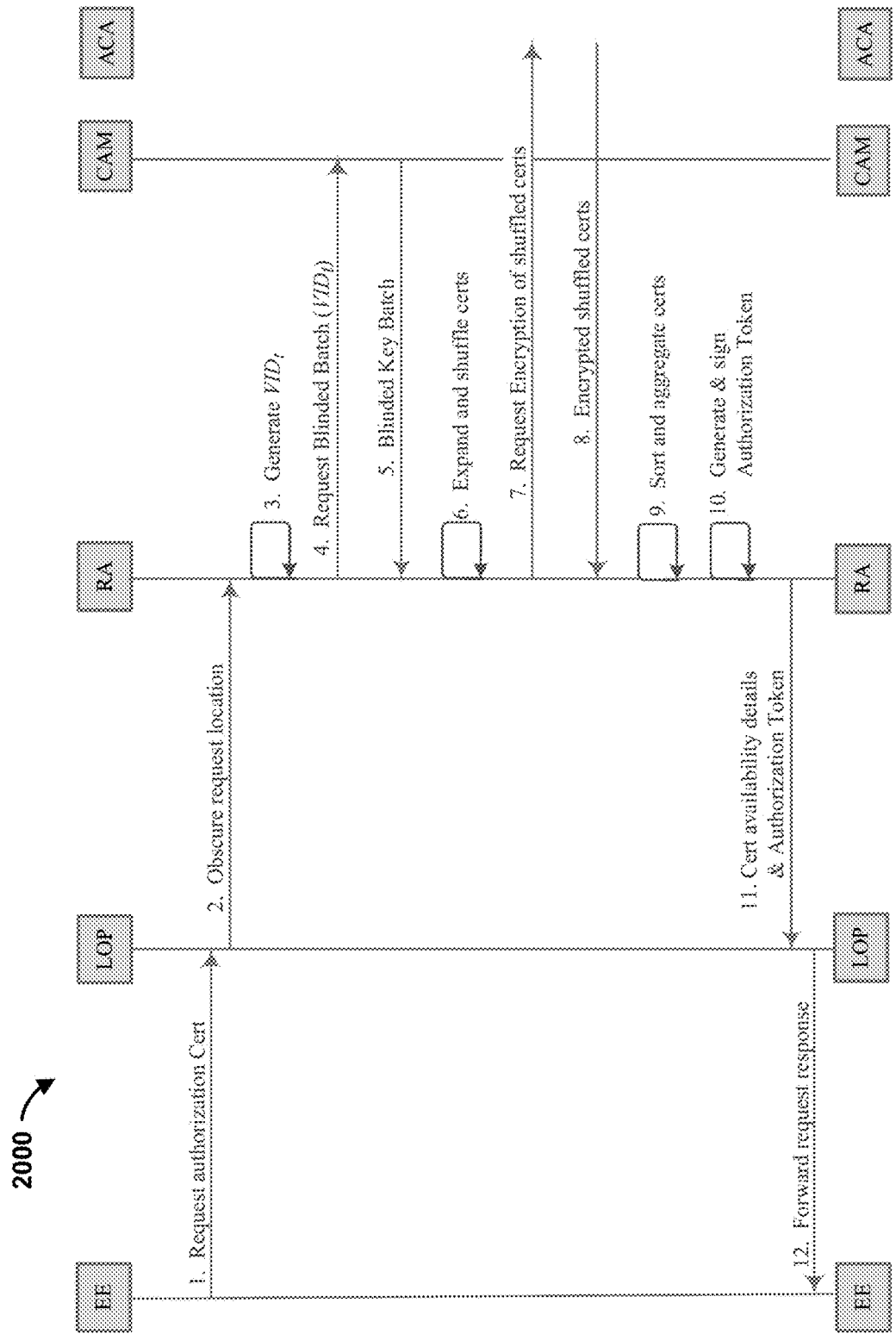
FIG. 20 illustrates an example authorization phase, according to some embodiments.

The EEs use the ECs obtained in the enrollment process during the subsequent uACPC authorization phase. FIG. 20 illustrates an example authorization phase 2000, for SCMS with anonymous authentication, according to some embodiments. That is, an example of the authorization certificate issuing process is shown in FIG. 20, where the numbers indicate the sequence of processes. As a result of this phase, the EEs receive multiple batches of encrypted certificates, which are used for V2X services (e.g., signing safety messages). In particular, they obtain such encrypted authorization certificates from the uACPC protocol (e.g., as described above). Indeed, the EEs need to decrypt (activate) their authorization certificates before using them. However, they can only activate their certificates after obtaining the corresponding ACs that are released by the uACPC for the current activation period.

Referring to FIG. 20, EEs start their authorization phase by making requests for authorization certificates to the RA. This request is routed via the LOP. The LOP obscures the request location, for example, hiding the EE's position, IP address, and related metadata, thereby preventing the RA and its infrastructure provider from accessing them. Upon receiving the request, the RA generates short-term identities ($VID_t$) for the respective EEs and further makes requests for the public versions of the ACs (blinded ACs) to the CAM. Consequently, the RA generates the authorization certificate request to the PCA (or ACA), e.g., following the cryptographic protocol depicted in FIG. 15.

Once the PCA receives the RA's request, it generates the EE's certificates and encrypts them. In some examples, the PCA uses an encryption key derived from the blinded AC, provided by the RA. The PCA then sends the encrypted batch of certificates back to the RA. In turn, the RA forwards the batches to the respective EEs and sends a signed authorization token or ticket (AT) to the EE. This signed token can then be used by the EE during its bootstrapping to the AAS. As previously stated, EEs cannot use these certificates until the release of the respective AC, which occurs during the activation phase.

Figure 21:
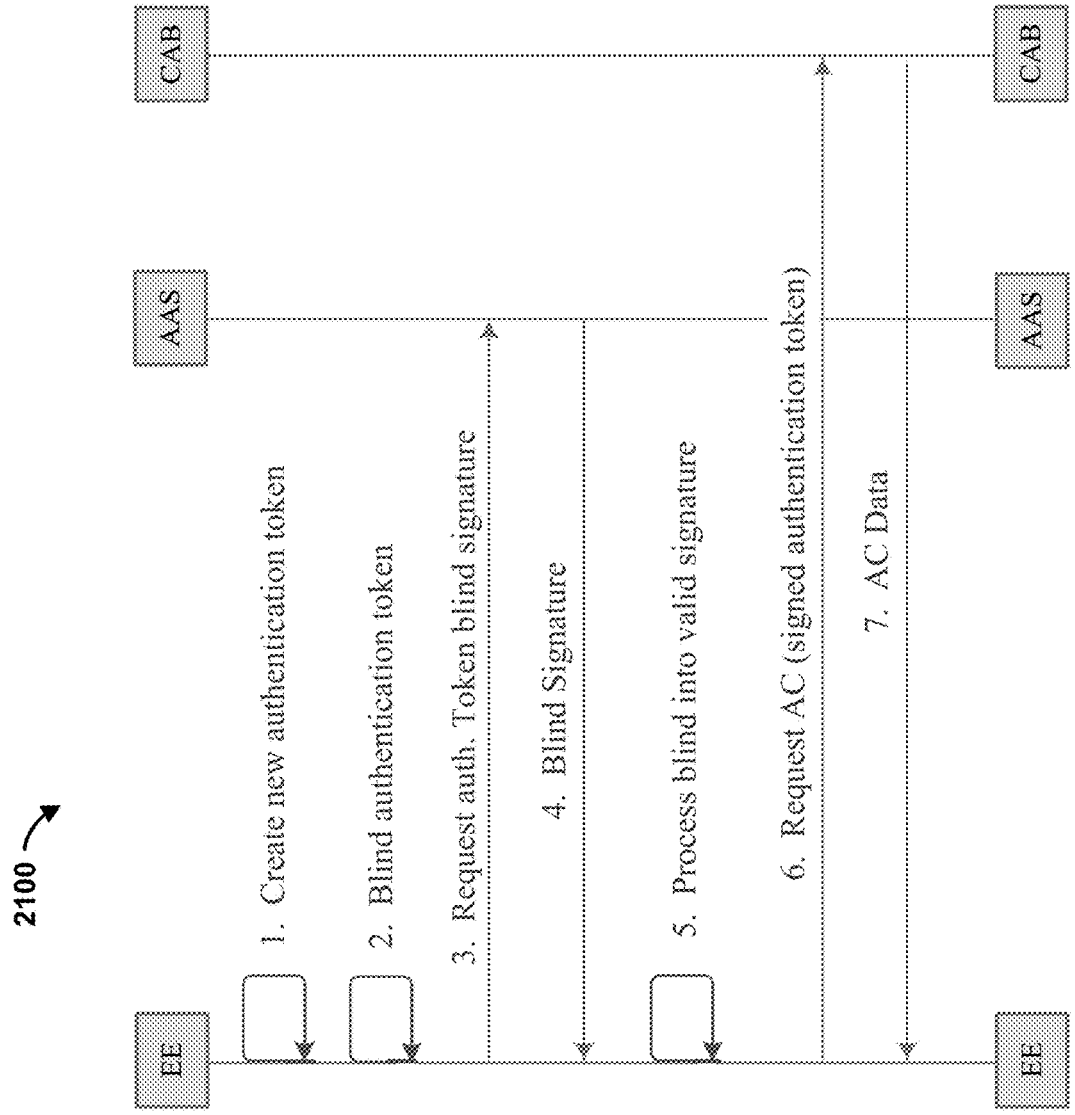
FIG. 21 illustrates an example activation phase, according to some embodiments.

Lastly, the activation phase is responsible for releasing the ACs to the EEs. FIG. 21 illustrates an example activation phase 2100, for SCMS with anonymous authentication, according to some embodiments. In FIG. 21, the numbers indicate the sequence of steps or processes in an example activation process. Referring to FIG. 21, activation begins with each EE authenticating itself to the AAS with the signed anonymous identity (e.g., anonymous authorization ticket (AT)) previously provided by the AAS itself. As an exception, on the first-time authentication, the EE may use an authorization token or ticket provided by the RA during the authorization phase. After authentication, the EE follows the anonymous authentication process described above to obtain an anonymous authentication token. Subsequently, the EE may use such a token to request any Certificate Access Broadcast (CAB) service (responsible for distributing ACs and CRLs). See FIG. 16.

Evaluation of Architectural Changes uACPC according to embodiments of the present disclosure improve the architectural design of ACPC, enhancing privacy, performance, and bandwidth usage of the system. Since these changes can be witnessed in different levels of the system, their practical outcomes can be analyzed. We start with the SCMS authorization phase, followed by how the authorization data is distributed in the activation phase, and lastly, how this data is consumed by the EE.

In some embodiments, uACPC adds a minor addition to the SCMS authorization phase. In particular, the RA generates one random authorization token per client served. As this change only encumbers the RA with a single additional signature per client, the complexity order remains unchanged.

Following the sequence of phases, in some embodiments, uACPC switches the data distribution model from broadcast to unicast. As a result, uACPC may provide a better fit to the emerging V2X communication capabilities. This change incurs in adjustments on both ends, server and client. The server, which previously broadcasted data on a given frequency, is now responsible for handling and serving on-demand requests from all EEs using unicast communication. The resulting overhead can be seen as a requirement for changing the communication model. Analogous to the server-side changes, the vehicles or EEs no longer passively listen for broadcasted service data, but rather actively request it from the server. This enables the EEs with the capability to perform custom service request on-demand. A connection-oriented communication, which may provide features such as update notifications, is not mandatory. Hence, EEs can reduce their resource usage by choosing a simpler communication method, thereby prioritizing resource savings over the Quality of Service.

For maintaining client anonymity on the system, in some embodiments, uACPC adds the anonymous token. For every anonymous token issued, the client generates a random identity and the system computes the corresponding token in a unicast transaction. Providing the anonymous token may incur overhead for both the system and the client. In particular, anonymous tokens are short-lived, thereby requiring the client to request a new token to authenticate itself after a certain time interval. However, the need for new tokens can be avoided either by requesting different services while the same token is valid or by maintaining a connection established during the validity period. Optionally, the clients can also request anonymous tokens whenever deemed necessary.

uACPC with Edge Computing

According to some embodiments, uACPC can be implemented at least in part with edge computing.

uACPC protects client anonymity at both service and communication infrastructure levels. The anonymous client can authenticate itself to any service or platform that trusts the AAS as an authentication authority. Such a privacy-preserving service facilitates the use and integration of solutions from different parties to improve the uACPC data distribution architecture. For instance, uACPC's critical requirements, such as CRL update delivery time, can be addressed by including distributed computing architectures to the system.

Similar to ACPC, uACPC aims to avoid large CRLs; however, for safety reasons, the delivery time of the CRLs to the EEs is still a critical requirement. If an EE is revoked (i.e., being added to the CRL), all other EEs must be aware of the revoked entities as soon as possible. The CRL distribution (e.g., an OTA update) delivers the most up-to-date CRL version to all SCMS clients. Similarly to the AC distribution, CRL updates are distributed by CAB.

Nevertheless, the challenge in distributing CRLs to EEs at near real-time rates arises from the connectivity between the service provider's cloud and the EEs. Although latency and bandwidth are usually perceived in logical networking terms (e.g., number of hops, routing paths, server load), they are, ultimately, constrained by the physical distance between the devices.

In such a scenario, edge computing arises as a new paradigm, bringing cloud computing resources closer to end devices. FIG. 22 illustrates an implementation 2200 of uACPC with edge computing, according to some embodiments. In particular, FIG. 22 shows a layered approach to uACPC with edge computing and its numbered steps. In such implementation, an edge layer 2210 is introduced as an intermediate layer between the cloud layer 2220 and end devices, e.g., vehicles or other EEs 2230. Such an edge layer 2210 leverages geographically distributed nodes to locally cache the data center's specific contents, and handle end devices' requests with minimal intervention from the cloud layer 2200. Consequently, the computation at the edge layer 2210 reduces the response times to the end devices' requests, while offloading processing from the cloud. Besides latency reduction, the proximity of the edge nodes to the end devices 2230 helps services to improve bandwidth consumption, and increase scalability. As a consequence, edge nodes can reduce the workload on the EEs 2230, improving their energy consumption.

In some embodiments, edge computing implementations can be seen from three main different categories, namely, Fog Computing, Mobile Edge Computing (MEC), and Cloudlet. As such, with reference to FIG. 22, the nodes for implementing edge computing can include, for example, the mobile edge node 2212, fog node 2214, and cloudlet node 2216 in the edge layer 2210. Fog computing (e.g., fog node 2214) may be a virtualization of processing and storage (as services) over heterogeneous decentralized devices in the network edge, where devices 2230 may not have IP connectivity. Therefore, by supporting non-IP communication (e.g., Bluetooth, ZigBee), it is possibly the closest edge node to the end device 2230. Meanwhile, MEC may implement processing and storage capabilities at the mobile base stations (e.g., mobile edge node 2212), thereby nearer to the subscribers. The cloudlets, in turn, can be implemented by clusters of dedicated devices (e.g., cloudlet node 2216) that emulate smaller and virtualized data centers, which are easier to deploy at a nearer proximity to the end devices 2230.

With further reference to FIG. 22, steps or processes 1 and 2—which includes generating the AC tree, releasing the AC nodes, and the CRL—occur within the cloud layer 2220. Subsequently, at the edge layer 2210, the corresponding edge nodes (e.g., mobile edge node 2212, fog node 2214, and cloudlet node 2216) mirror the data produced in the previous steps or processes. In step or process 3, the edge layer 2210 receives (from the cloud layer 2220) the required data to process an EE's request. Henceforth, the edge layer 2210 is able to offer system services to the requesting EE, as shown in step or process 4. The EE 2230 is then served in step or process 5 by the edge node, with lower latency and bandwidth consumption when compared to being served directly by the cloud. Steps or processes 6 and 7 comprise the EE's internal processing of uACPC data (e.g., deriving ACs or computing CRLs).

In this context, uACPC can leverage edge computing to improve different use cases, as described in the table of FIG. 23. The outlined use cases are not restricted to the specified edge node; however, they are assigned to the most suitable implementation, according to the capabilities of each technology.

Analysis and Results

According to embodiments of the present disclosure, systems and methods are provided for unicast ACPC (uACPC): a protocol that extends the original ACPC in the unicast mode of communication. uACPC abides by the privacy-by-design concept and avoids the disclosure of the EE's long-term identity from the SCMS components. In previous solutions, especially when using ACPC in the authenticated unicast channel, the infrastructure provider was able to track its clients despite not knowing their long term identities. In particular, the infrastructure provider can store metadata associated with client authentication (e.g., login-related information) and use such metadata to link different requests to a unique client. As a consequence, it can monitor a given client whenever connected to the system and, possibly, learn about that client's location. To prevent such a privacy breach, it is necessary to make the client's requests unlinkable. Hence, uACPC implements an anonymous authentication solution to prevent service infrastructure providers from tracking clients. Moreover, such anonymous authentication is not restricted to the current use case (i.e., distribution of ACs) and can be used in any distributed system to offer client anonymity and authentication simultaneously.

In uACPC, all system services are unable to identify the long-term identity of the clients and link different requests pertaining to the same client. Therefore, each service can verify the client's authenticity while the client maintains its privacy. Thus uACPC allows a client-initiated unicast delivery of ACs (and CRLs), while maintaining the EE's privacy. Such a client-initiated request has advantages over the original broadcast mode in certain use cases (e.g., when the transmission medium is not broadcast friendly).

An analysis and results of the uACPC implementation are provided below.

Privacy

The usage of blind signatures in some examples of uACPC protects the EE's privacy from service and infrastructure providers. Meanwhile, the change of identity on each activation period protects the EE's privacy from internal uACPC entities and authorities (e.g., RA, CAM). The combination of these two strategies provides privacy protection along the entire EE's life cycle. Security proofs show that a blind signature protects the message content and requester's identity from the signer. Furthermore, the SCMS pseudonym certificate strategy protects the EE's privacy during the usage of V2X applications (e.g., signing safety messages). In some embodiments, uACPC uses multiple short-term unlinkable identities ($VID_t$) by EEs, when requesting ACs in the unicast mode.

It is assumed the entities follow an honest-but-curious security model, as in the SCMS original proposal. Hence, the RA, the CAM, and the infrastructure provider are allowed to observe data flows, but they cannot collude and actively attack the system.

The RA can link the multiple $VID_t$ to a specific EE; however, it cannot track EEs when requesting ACs, as it does not have access to the EEs' data when they are performing such requests. In contrast, the CAM and the unicast communication provider have access to EEs' data during the request of ACs, but they cannot link such data to a specific EE, due to the unlinkability property of the blind signatures. It is preferable that the unicast infrastructure provider and the RA are kept as separate entities in the system, as in the original SCMS.

In some embodiments, privacy in uACPC is provided at least in part by the unlinkability between different requests from a specific client. Although uACPCP uses anonymous authentication and short-term identities in some examples to prevent system authorities from linking requests to a specific client, the communication infrastructure provider may still be able to track the client using network metadata (e.g., IP address). Hence, in some embodiments, network anonymization technologies (e.g., proxy, VPN) may be employed to prevent the infrastructure provider from accessing such client data.

The embodiments described above illustrate but do not limit the invention. For example, the techniques described for vehicles can be used by other mobile systems, e.g., pedestrians' smartphones or other mobile systems equipped with computer and communication systems 150. The term "vehicle" is not limited to terrestrial vehicles, but includes aircraft, boats, space ships, and maybe other types of mobile objects. The vehicle techniques can be also be used by non-mobile systems, e.g., they can be used on a computer system.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures typically represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

We claim:

1. A method for distributing activation codes to one or more of a plurality of entities in a vehicular public-key infrastructure in a privacy-preserving manner, the method comprising:
    receiving by a first entity of the plurality of entities a plurality of digital certificates for use in authentication operations with one or more of the other entities of the plurality of entities, wherein each digital certificate is to be activated by an associated activation code;
    wherein one or more pseudonym identifiers are generated for the first entity, wherein each pseudonym identifier can be used as an identifier for the first entity during a corresponding activation period, wherein each pseudonym identifier is not linkable to the first entity by some other entities in the vehicular public-key infrastructure;
    during a given activation period, making a request by the first entity for one or more activation codes using the pseudonym identifier corresponding to the given activation period; and
    receiving by the first entity via unicast communication the requested one or more activation codes, wherein the activation codes are generated by a certificate access manager.

2. The method of claim 1, wherein the certificate access manager is one of the entities for which each pseudonym identifier is not linkable to the first entity.

3. The method of claim 1, wherein the one or more pseudonym identifiers are generated by a second entity.

4. The method of claim 3, wherein the second entity does not directly participate in the unicast communication of the requested one or more activation codes to the first entity.

5. The method of claim 4, wherein the second entity comprises a registration authority.

6. The method of claim 1, wherein the corresponding pseudonym identifier used to make the request by the first entity for one or more activation codes is shuffled with one or more other pseudonym identifiers corresponding to other entities in the vehicular public-key infrastructure.

7. The method of claim 1, wherein each pseudonym identifier is generated by a pseudorandom permutation using at least one of an identifier of the certificate access manager and a long-term identifier of the first entity as input.

8. The method of claim 1, wherein the unicast communication is provided through an edge computing layer comprising one or more edge nodes.

9. The method of claim 1, wherein the unicast communication is offered as a service to entities in the vehicular public-key infrastructure, and wherein the first entity is provided with one or more anonymous authorization tickets for use in requesting the one or more activation codes under the service.

10. A system for distributing activation codes to one or more of a plurality of entities in a vehicular public-key infrastructure in a privacy-preserving manner, the system comprising:
    one or more processors and computer memory at a first entity of the plurality of entities, wherein the computer memory stores program instructions that when run on the one or more processors cause the first entity to:
    receive a plurality of digital certificates for use in authentication operations with one or more of the other entities of the plurality of entities, wherein each digital certificate is to be activated by an associated activation code;
    wherein one or more pseudonym identifiers are generated for the first entity, wherein each pseudonym identifier can be used as an identifier for the first entity during a corresponding activation period, wherein each pseudonym identifier is not linkable to the first entity by some other entities in the vehicular public-key infrastructure;
    during a given activation period, make a request for one or more activation codes using the pseudonym identifier corresponding to the given activation period; and
    receive via unicast communication the requested one or more activation codes, wherein the activation codes are generated by a certificate access manager.

11. The system of claim 10, wherein the certificate access manager is one of the entities for which each pseudonym identifier is not linkable to the first entity.

12. The system of claim 10, wherein the one or more pseudonym identifiers are generated by a second entity.

13. The system of claim 12, wherein the second entity does not directly participate in the unicast communication of the requested one or more activation codes to the first entity.

14. The system of claim 13, wherein the second entity comprises a registration authority.

15. The system of claim 10, wherein the corresponding pseudonym identifier used to make the request by the first entity for one or more activation codes is shuffled with one or more other pseudonym identifiers corresponding to other entities in the vehicular public-key infrastructure.

16. The system of claim 10, wherein each pseudonym identifier is generated by a pseudorandom permutation using at least one of an identifier of the certificate access manager and a long-term identifier of the first entity as input.

17. The system of claim 10, wherein the unicast communication is provided through an edge computing layer comprising one or more edge nodes.

18. The system of claim 10, wherein the unicast communication is offered as a service to entities in the vehicular public-key infrastructure, and wherein the first entity is provided with one or more anonymous authorization tickets for use in requesting the one or more activation codes under the service.

* * * * *